(12) United States Patent
Kang et al.

(10) Patent No.: US 12,248,337 B2
(45) Date of Patent: Mar. 11, 2025

(54) ELECTRONIC DEVICE HAVING FLEXIBLE DISPLAY AND OPERATION METHOD THEREOF

(71) Applicant: Samsung Electronics Co., Ltd., Suwon-si (KR)

(72) Inventors: Hyunggwang Kang, Suwon-si (KR); Minsoo Kim, Suwon-si (KR); Myunghoon Kwak, Suwon-si (KR); Moonchul Shin, Suwon-si (KR); Kibeom Kim, Suwon-si (KR); Teayoung Kim, Suwon-si (KR); Sanghyuk Park, Suwon-si (KR); Yangwook Kim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 18/074,983

(22) Filed: Dec. 5, 2022

(65) Prior Publication Data

US 2023/0103303 A1    Apr. 6, 2023

Related U.S. Application Data

(63) Continuation of application No. PCT/KR2021/005556, filed on May 3, 2021.

(30) Foreign Application Priority Data

Jun. 5, 2020   (KR) ........................ 10-2020-0068614
Jan. 14, 2021  (KR) ........................ 10-2021-0005507

(51) Int. Cl.
*G06F 1/16* (2006.01)
*G09F 9/30* (2006.01)

(52) U.S. Cl.
CPC .......... *G06F 1/1652* (2013.01); *G06F 1/1624* (2013.01); *G06F 1/163* (2013.01); *G09F 9/301* (2013.01)

(58) Field of Classification Search
CPC ...... G06F 1/1652; G06F 1/1624; G06F 1/163; G06F 1/1622
See application file for complete search history.

(56) References Cited

U.S. PATENT DOCUMENTS

2014/0211399 A1 * 7/2014 O'Brien ................ G06F 1/1652
29/592.1
2016/0357158 A1   12/2016 Kim
(Continued)

FOREIGN PATENT DOCUMENTS

CN    209627363 U    11/2019
CN    209859035 U  * 12/2019
(Continued)

OTHER PUBLICATIONS

International Search Report dated Aug. 6, 2021, issued in an International Application No. PCT/KR2021/005556.

*Primary Examiner* — James Wu
*Assistant Examiner* — Dakota M Talbert
(74) *Attorney, Agent, or Firm* — Jefferson IP Law, LLP

(57) ABSTRACT

An electronic device having a flexible display is provided. The electronic device includes a first housing, a second housing slidably coupled to a side of the first housing, a flexible display including a first area mounted on the first housing and a second area extending from the first area, a gear structure disposed within the first housing, and a mounting member rotatably coupled to the first housing and mounted on or separated from at least a portion of the human body, wherein the flexible display may be rotated and rolled according to rotation of the gear structure in a state in which
(Continued)

the first area is exposed to the outside, thereby exposing at least a portion of the second area to the outside.

18 Claims, 50 Drawing Sheets

(56) References Cited

U.S. PATENT DOCUMENTS

| | | | |
|---|---|---|---|
| 2017/0032168 A1 | 2/2017 | Kim | |
| 2018/0181733 A1 | 6/2018 | Shim et al. | |
| 2018/0356888 A1* | 12/2018 | Rihn | G01L 5/103 |
| 2019/0064882 A1 | 2/2019 | Xia et al. | |
| 2019/0317550 A1 | 10/2019 | Kim et al. | |
| 2020/0033913 A1 | 1/2020 | Yang | |
| 2022/0311844 A1* | 9/2022 | Lee | H04M 1/0268 |

FOREIGN PATENT DOCUMENTS

| | | | |
|---|---|---|---|
| KR | 101107127 B1 * | 1/2012 | |
| KR | 10-1480675 B1 | 1/2015 | |
| KR | 10-1534302 B1 | 7/2015 | |
| KR | 10-2016-0150437 A | 12/2016 | |
| KR | 10-2019-0004618 A | 1/2019 | |
| KR | 10-2019-0119719 A | 10/2019 | |
| KR | 10-2020-0013821 A | 2/2020 | |

\* cited by examiner

ELECTRONIC DEVICE HAVING FLEXIBLE DISPLAY AND OPERATION METHOD THEREOF

CROSS-REFERENCE TO RELATED APPLICATION(S)

This application is a continuation application, claiming priority under § 365(c), of an International application No. PCT/KR2021/005556, filed on May 3, 2021, which is based on and claims the benefit of a Korean patent application number 10-2020-0068614, filed on Jun. 5, 2020, in the Korean Intellectual Property Office, and of a Korean patent application number 10-2021-0005507, filed on Jan. 14, 2021, in the Korean Intellectual Property Office, the disclosure of each of which is incorporated by reference herein in its entirety.

BACKGROUND

1. Field

The disclosure relates to an electronic device having an extendable flexible display.

2. Description of Related Art

The term "electronic device" may mean a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, etc. For example, as electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function. Such electronic devices become compact enough for users to carry in a convenient way. The electronic devices may output stored information as voices or images.

A screen display area (e.g., display) equipped in the electronic device may output content, such as text or images, providing various pieces of visual information to the user. As entertainment functions or multimedia functions of electronic devices are greatly developed, users may prefer high-definition and large-screen display areas (e.g., large-screen displays).

The electronic device typically comes equipped with a flat display device and a battery and has an outer shape, such as a bar, folder, or sliding shape. As electronic communication technology develops and electronic devices come in compact size, electronic device which may be put on the user's wrist, head, or other body portions are commercially available. Recently, electronic devices are made more compact while providing various functions as are wearable electronic devices as well as mobile communication terminals, meeting customers' needs.

The above information is presented as background information only to assist with an understanding of the disclosure. No determination has been made, and no assertion is made, as to whether any of the above might be applicable as prior art with regard to the disclosure.

SUMMARY

Given its small size, the electronic device worn on the user's body part may have a limitation in increasing the size of the screen display area (e.g., display). For example, when the electronic device is made in reduced size, it may be difficult to install a large-screen display area, so that users receive various pieces of visual information through the display area of a small screen, rather than a large screen. Accordingly, the electronic device equipped with the display area of a small screen has difficulty in providing various pieces of information and suffer from deteriorated user convenience.

Aspects of the disclosure are to address at least the above-mentioned problems and/or disadvantages and to provide at least the advantages described below. Accordingly, an aspect of the disclosure is to provide an electronic device with a flexible display, which may rotate and/or extend the screen display area on the electronic device according to use.

Additional aspects will be set forth in part in the description which follows and, in part, will be apparent from the description, or may be learned by practice of the presented embodiments.

In accordance with an aspect of the disclosure, an electronic device with a flexible display is provided. The electronic device includes a first housing, a second housing slidably coupled to a side surface of the first housing, a flexible display including a first area disposed on the first housing and a second area extending from the first area, a gear structure disposed in the first housing, and a mounting member rotatably coupled to the first housing and configured to be separated from or mounted on at least a portion of a human body. The flexible display may be configured to be rotated and rolled as the gear structure is rotated in a state in which the first area is exposed to an outside to expose at least a portion of the second area to the outside.

In accordance with another aspect of the disclosure, an electronic device with a flexible display is provided. The electronic device includes a first housing including a first surface, a second surface facing in a direction opposite to the first surface, and a side surface surrounding a space between the first and second surfaces, a second housing detachably coupled to the side surface of the first housing and configured to be rotated along with the first housing, or slid away from or closer to the side surface of the first housing, a plurality of guide rails disposed in the first housing to guide the slide of the second housing, a flexible display including a first area disposed to face the first surface of the first housing and a second area extending from the first area, a gear structure including a rotation shaft disposed in the first housing, connected with a driving motor, and rotated according to rotation of the driving motor, a first gear portion disposed on the rotation shaft and rotated according to the rotation of the rotation shaft, and a plurality of second gear portions spaced apart from the first gear portion, and a mounting member including a third gear portion rotatably coupled with the first gear portion and configured to be separated from or mounted on at least a portion of a human body. The flexible display may be formed to rotate about the mounting member according to the rotation of the first gear portion in a state in which the first area is exposed to an outside. At least a portion of the flexible display may be formed to be rolled by rotation of the plurality of second gear portions to be drawn in or out from the second housing.

In accordance with another aspect of the disclosure, an electronic device with a flexible display is provided. The electronic device includes a first housing including a first surface, a second surface facing in a direction opposite to the first surface, and a side surface surrounding a space between the first and second surfaces, a second housing detachably coupled to the side surface of the first housing, rotated along with the first housing, or slid away from or closer to the side surface of the first housing, a plurality of guide rails disposed in the first housing to guide the slide of the second housing, a flexible display including a first area disposed to face the first surface of the first housing and a second area extending from the first area, a gear structure disposed in the first housing and including a rotation shaft, a first gear portion disposed on the rotation shaft, a second gear portion spaced apart from the first gear portion, and a plurality of third gear portions spaced apart from the first and second gear portions, and a mounting member including a fourth gear portion disposed between the first and second gear portions and rotatably coupled with the first gear portion or the second gear portion according to a slide of the rotation shaft, and separated from or mounted on at least a portion of a human body. An end of the rotation shaft may be connected with a driving motor, and another end of the rotation shaft may be connected with a rotation knob to slide or rotate the rotation shaft by an external force. A plurality of stopper members to restrict a slide of the rotation knob are formed on the rotation shaft. At least a portion of the second area of the flexible display may restrict the slide of the rotation shaft by the plurality of stopper members or, when rotating the rotation shaft by the rotation knob or the driving motor, be rolled by the rotation of the plurality of third gear portions to be drawn in or out from the second housing. When restricting the slide of the rotation shaft by the plurality of stopper members or rotating the rotation shaft by the rotation knob or the driving motor, the flexible display may be formed to rotate about the mounting member according to the rotation of the first gear portion. When restricting the slide of the rotation shaft by the plurality of stopper members or rotating the rotation shaft by the rotation knob or the driving motor, the flexible display may be formed to rotate about the mounting member according to the rotation of the second gear portion. At least a portion of the second area of the flexible display may be formed to be rolled by the rotation of the plurality of third gear portions to be drawn in or out from the second housing.

In accordance with another aspect of the disclosure, an electronic device is provided. The electronic device includes a housing, a flexible display having at least a portion exposed to an outside through the housing, a processor disposed in the housing and operatively connected with the flexible display, a mounting member to be coupled to or separated from the housing, a driving structure disposed in the housing and configured to adjust the exposed portion of the flexible display and/or rotation of the housing about the mounting member, a plurality of coupling portions disposed on two opposite ends of a strap of the mounting member to be coupled to or separated from each other, a sensor disposed on at least some of the plurality of coupling portions or at least a portion of the strap, and a sub processor disposed in the mounting member and operatively connected with the plurality of coupling portions and the sensor. Upon detecting the mutual coupling of the plurality of coupling portions, the sub processor may perform user authentication based on a sensing value detected through the sensor and transmit a result of the user authentication to the processor. The processor may control the driving structure based on the user authentication result received from the sub processor.

In accordance with another aspect of the disclosure, a method for controlling an electronic device is provided. The method includes performing user authentication based on a sensing value detected through a sensor disposed on at least some of the plurality of coupling portions or at least a portion of the strap upon detecting a coupling of the plurality of coupling portions disposed on two opposite ends of the strap of the mounting member, by a sub processor disposed in the mounting member to be coupled to or separated from the housing of the electronic device, transmitting the user authentication result to the processor disposed in the housing by the sub processor, and controlling the driving structure configured to adjust the exposed portion of the flexible display having at least a portion exposed to the outside through the housing and/or rotation of the housing about the mounting member based on the user authentication result received, by the processor.

By at least any one of the above-described means of the disclosure, the first and second housings and flexible display may be rotated according to rotation of the gear structure included in the electronic device, and the flexible display may be rolled and extended. Thus, the flexible display may provide a large-screen display area whose size has been extended according to the purpose of use, so that users may receive various pieces of visual information through the extended large-screen display area. The extended large-screen display area allows it easy to provide various pieces of visual information to the user while enhancing use convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
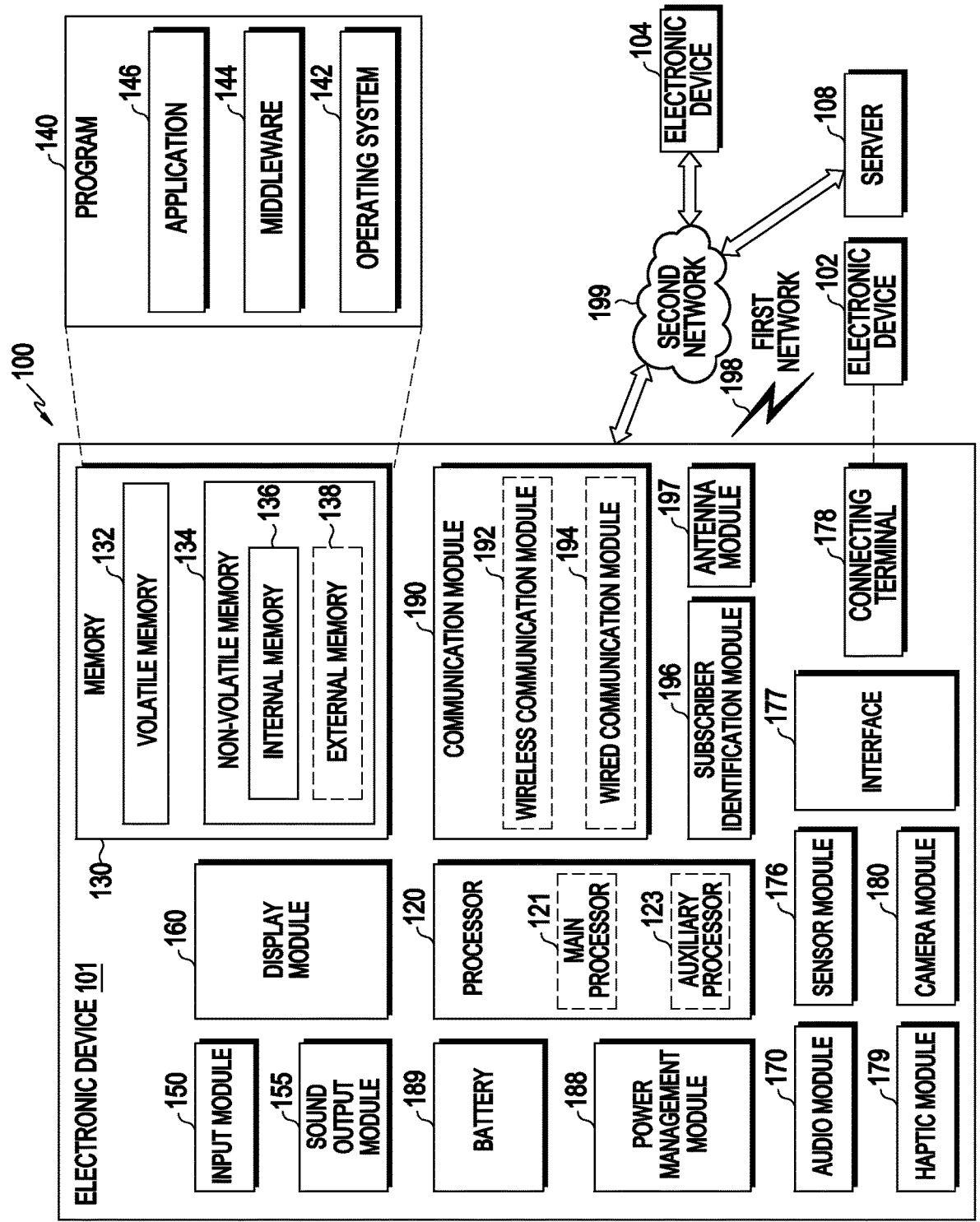
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
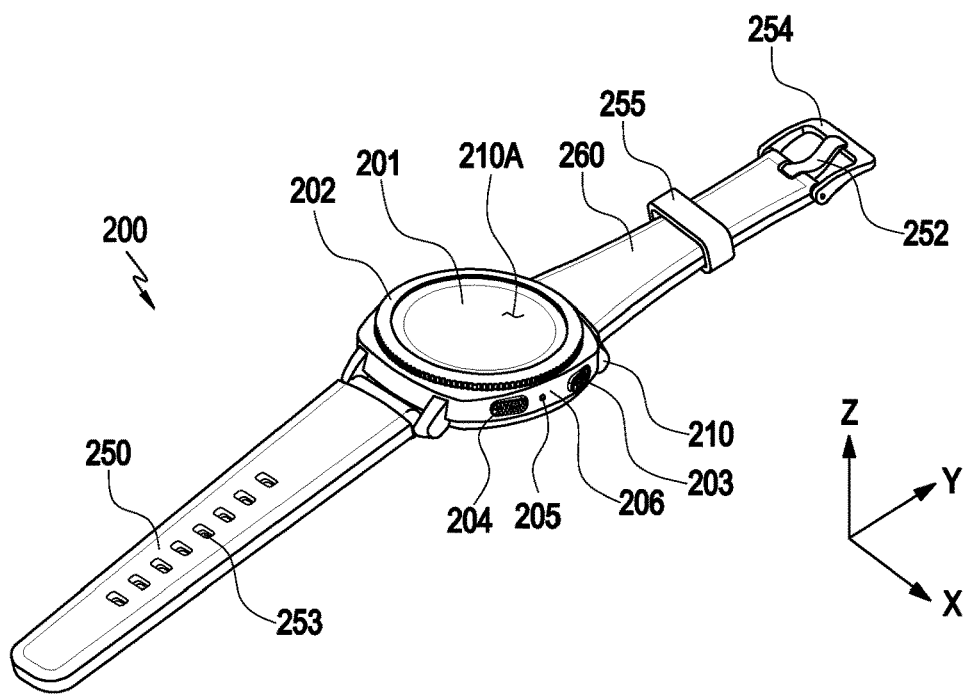
FIG. 2 is a front perspective view illustrating a mobile electronic device according to an embodiment of the disclosure.

FIG. 2 is a front perspective view illustrating a mobile electronic device according to an embodiment of the disclosure.

Figure 3:
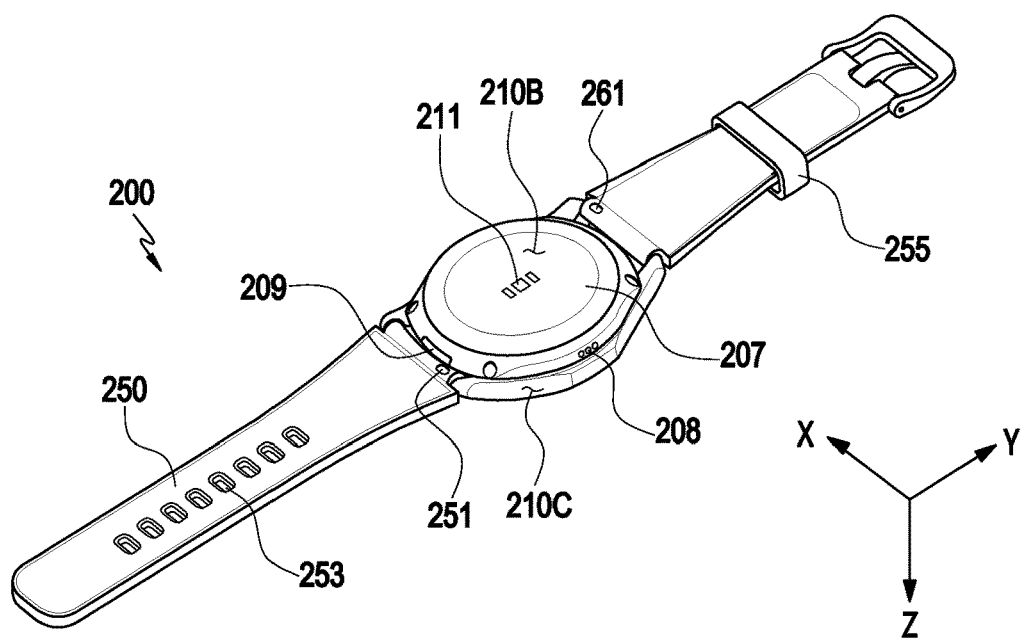
FIG. 3 is a rear perspective view illustrating the electronic device of FIG. 2 according to an embodiment of the disclosure.

FIG. 3 is a rear perspective view illustrating the electronic device of FIG. 2 according to an embodiment of the disclosure.

Referring to FIGS. 2 and 3, according to an embodiment, an electronic device 200 may include a housing 210 including a first surface (or front surface) 210A, a second surface (or rear surface) 210B, and a side surface 210C surrounding the space between the first surface 210A and the second surface 210B and binding members 250 and 260 connected to at least part of the housing 210 and configured to allow the electronic device 200 to be removably worn on the user's body portion (e.g., the user's wrist or ankle). According to another embodiment (not shown), the housing may denote a structure forming part of the first surface 210A, the second surface 210B, and the side surface 210C of FIG. 2. According to an embodiment, at least part of the first surface 210A may have a substantially transparent front plate 201 (e.g., a glass plate or polymer plate including various coat layers). The second surface 210B may be formed by a rear plate 207 that is substantially opaque. The rear plate 207 may be formed of, e.g., laminated or colored glass, ceramic, polymer, metal (e.g., aluminum, stainless steel (STS), or magnesium), or a combination of at least two thereof. The side surface 110C may be formed by a side bezel structure (or a "side member") 206 that couples to the front plate 201 and the rear plate 207 and includes a metal and/or polymer. According to an embodiment, the rear plate 207 and the side bezel plate 206 may be integrally formed together and include the same material (e.g., a metal, such as aluminum). The binding members 250 and 260 may be formed of various materials in various shapes. A uni-body structure or multiple unit links which is flexible may be formed of fabric, leather, rubber, urethane, metal, ceramic, or a combination of at least two thereof.

According to an embodiment, the electronic device 200 may include at least one or more of a display 330 (refer to FIG. 4), audio modules, a sensor module 211, key input devices 202, 203, and 204, and a connector hole 209. According to an embodiment, the electronic device 200 may exclude at least one (e.g., the key input devices 202, 203, and 204, connector hole 209, or sensor module 211) of the components or may add other components.

The display 330 may be exposed through a significant portion of the front plate 201. The display 330 may have a shape corresponding to the shape of the front plate 201, e.g., a circle, ellipse, or polygon. The display 330 may be coupled with, or disposed adjacent, a touch detection circuit, a pressure sensor capable of measuring the strength (pressure) of touches, and/or fingerprint sensor.

The audio modules may include a microphone hole 205 and a speaker hole 208. A microphone for acquiring external sounds may be disposed in the microphone hole 205. In some embodiments, a plurality of microphones may be disposed to detect the direction of the sound. The speaker hole 208 may be used for an external speaker or a receiver for phone talks. According to an embodiment, the speaker hole 208 and the microphone hole 205 may be implemented as a single hole, or speaker may be included without the speaker hole 208 (e.g., piezo speaker).

The sensor module 111 may produce an electrical signal or data value corresponding to the internal operation state or external environment state of the electronic device 200. The sensor module 211 may include, e.g., a biometric sensor module 211 (e.g., a heartrate monitor (HRM) sensor) disposed on the second surface 210B of the housing 210. The electronic device 200 may include a sensor module not shown, e.g., at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor.

The key input devices 203, and 204 may include a wheel key 202 disposed on the first surface 210A of the housing 210 to be rotatable in at least one direction and/or key buttons 203 and 204 disposed on the side surface 210C of the housing 210. The wheel key may have a shape corresponding to the shape of the front plate 201. According to another embodiment, the electronic device 200 may exclude all or some of the above-mentioned key input devices 202, 203, and 204, and the excluded key input devices 202, 203, and 204 may be implemented in other forms, e.g., as soft keys on the display 330. The connector hole 209 may receive a connector (e.g., a universal serial bus (USB) connector) for transmitting and receiving power and/or data to/from an external electronic device. Another connector hole (not shown) may be included for receiving a connector for transmitting and receiving audio signals to/from the external electronic device. The electronic device 200 may further include a connector cover (not shown) to cover at least part of, e.g., the connector hole 209 and preventing undesirable materials from entering the connector hole.

The binding members 250 and 260 may detachably be bound to at least portions of the housing 210 via locking members 251 and 261. The binding members 250 and 260 may include one or more of a fixing member 252, fixing member coupling holes 253, a band guide member 254, and a band fixing ring 255.

The fixing member 252 may be configured to allow the housing 210 and the binding members 250 and 260 to be fixed to the user's body portion (e.g., wrist or ankle). The fixing member coupling holes 253 may fix the housing 210 and the binding members 250 and 260 to the user's body portion, corresponding to the fixing member 252. The band guide member 254 may be configured to restrict movement of the fixing member 252 to a certain range when the fixing member 252 fits into one of the fixing member coupling holes 253, thereby allowing the binding members 250 and 260 to be tightly bound onto the user's body portion. The band fixing ring 255 may limit the range of movement of the binding members 250 and 260, with the fixing member 252 fitted into one of the binding member coupling holes 253.

Figure 4:
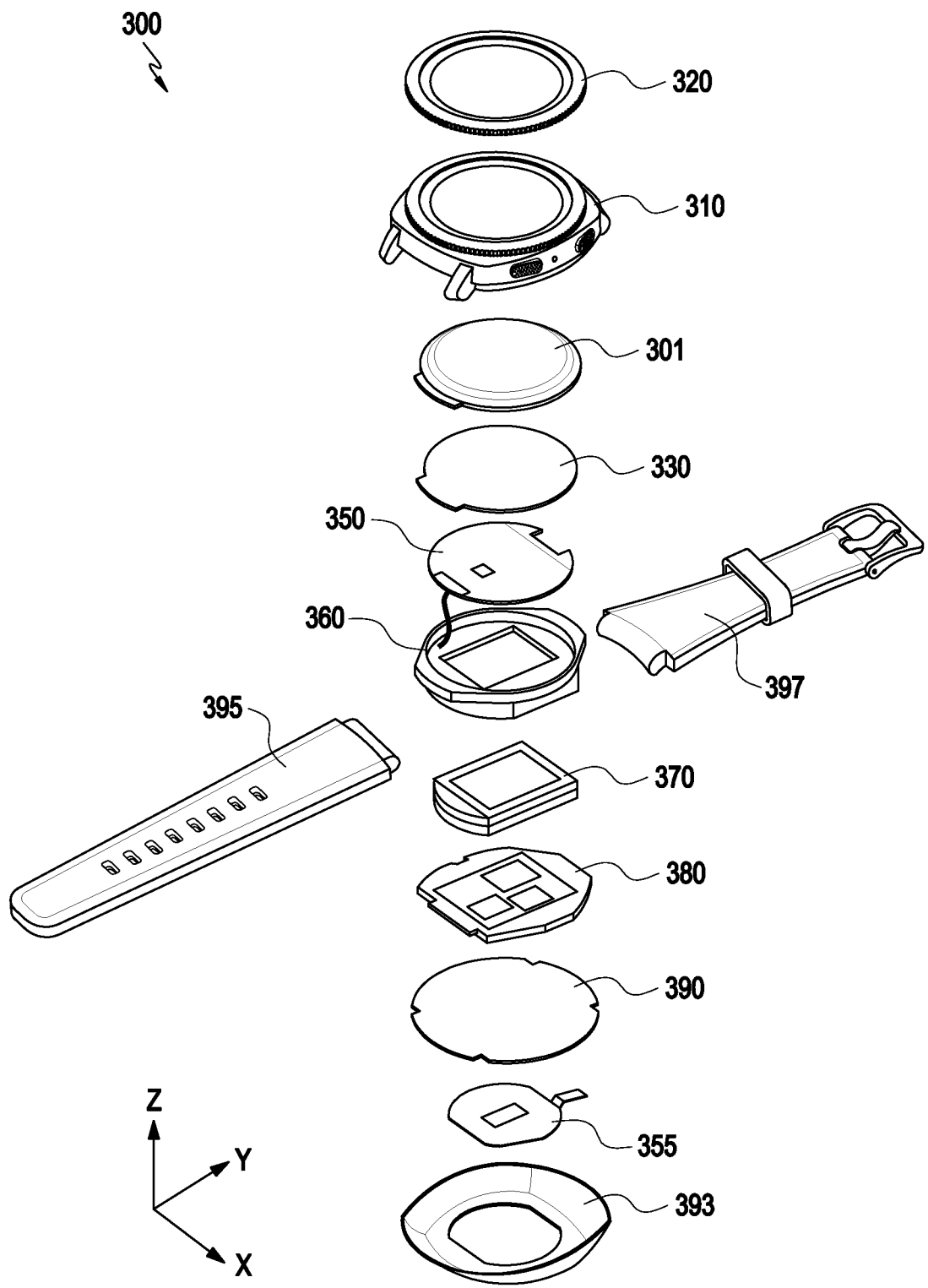
FIG. 4 is an exploded perspective view illustrating the electronic device of FIG. 2 according to an embodiment of the disclosure.

FIG. 4 is an exploded perspective view illustrating the electronic device of FIG. 2 according to an embodiment of the disclosure.

Referring to FIG. 4, the electronic device 300 may include a side bezel structure 310, a wheel key 320, a front plate 301, a display 330, a first antenna 350, a second antenna 355, a supporting member 360 (e.g., a bracket), a battery 370, a printed circuit board 380, a sealing member 390, a rear plate 393, and binding members 395 and 397. At least one of the components of the electronic device 300 may be the same or similar to at least one of the components of the electronic device 101 of FIG. 1 or 2 and no duplicate description is made below. The supporting member 360 may be disposed inside the electronic device 300 to be connected with the side bezel structure 310 or integrated with the side bezel structure 310. The supporting member 360 may be formed of, e.g., a metal and/or non-metallic material (e.g., polymer). The display 330 may be joined onto one surface of the supporting member 360, and the printed circuit board 380 may be joined onto the opposite surface of the supporting member 274. A processor, memory, and/or interface may be mounted on the printed circuit board 380. The processor may include one or more of, e.g., a central processing unit, an application processor, a graphic processing unit (GPU), a sensor processor, or a communication processor.

The memory may include, e.g., a volatile or non-volatile memory. The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 370 may be a device for supplying power to at least one component of the electronic device 300. The battery 277 may include, e.g., a primary cell which is not rechargeable, a secondary cell which is rechargeable, or a fuel cell. At least a portion of the battery 370 may be disposed on substantially the same plane as the printed circuit board 380. The battery 370 may be integrally or detachably disposed inside the electronic device 101.

The first antenna 350 may be disposed between the display 330 and the supporting member 360. The first antenna 350 may include, e.g., a near-field communication (NFC) antenna, a wireless charging antenna, and/or a magnetic secure transmission (MST) antenna. The first antenna 350 may perform short-range communication with an external device, wirelessly transmit/receive power necessary for charging, or transmit magnetic-based signals including payment data or short-range communication signals. According to an embodiment, an antenna structure may be formed by a portion or combination of the side bezel structure 310 and/or the supporting member 360.

The second antenna 355 may be disposed between the circuit board 380 and the rear plate 393. The second antenna 355 may include, e.g., a near-field communication (NFC) antenna, a wireless charging antenna, and/or a magnetic secure transmission (MST) antenna. The second antenna 355 may perform short-range communication with an external device, wirelessly transmit/receive power necessary for charging, or transmit magnetic-based signals including payment data or short-range communication signals. According to another embodiment, an antenna structure may be formed of a portion or combination of the side bezel structure 310 and/or the rear plate 393.

The sealing member 390 may be positioned between the side bezel structure 310 and the rear plate 393. The sealing member 390 may be configured to block moisture or foreign bodies that may enter the space surrounded by the side bezel structure 310 and the rear plate 393, from the outside.

Figure 5:
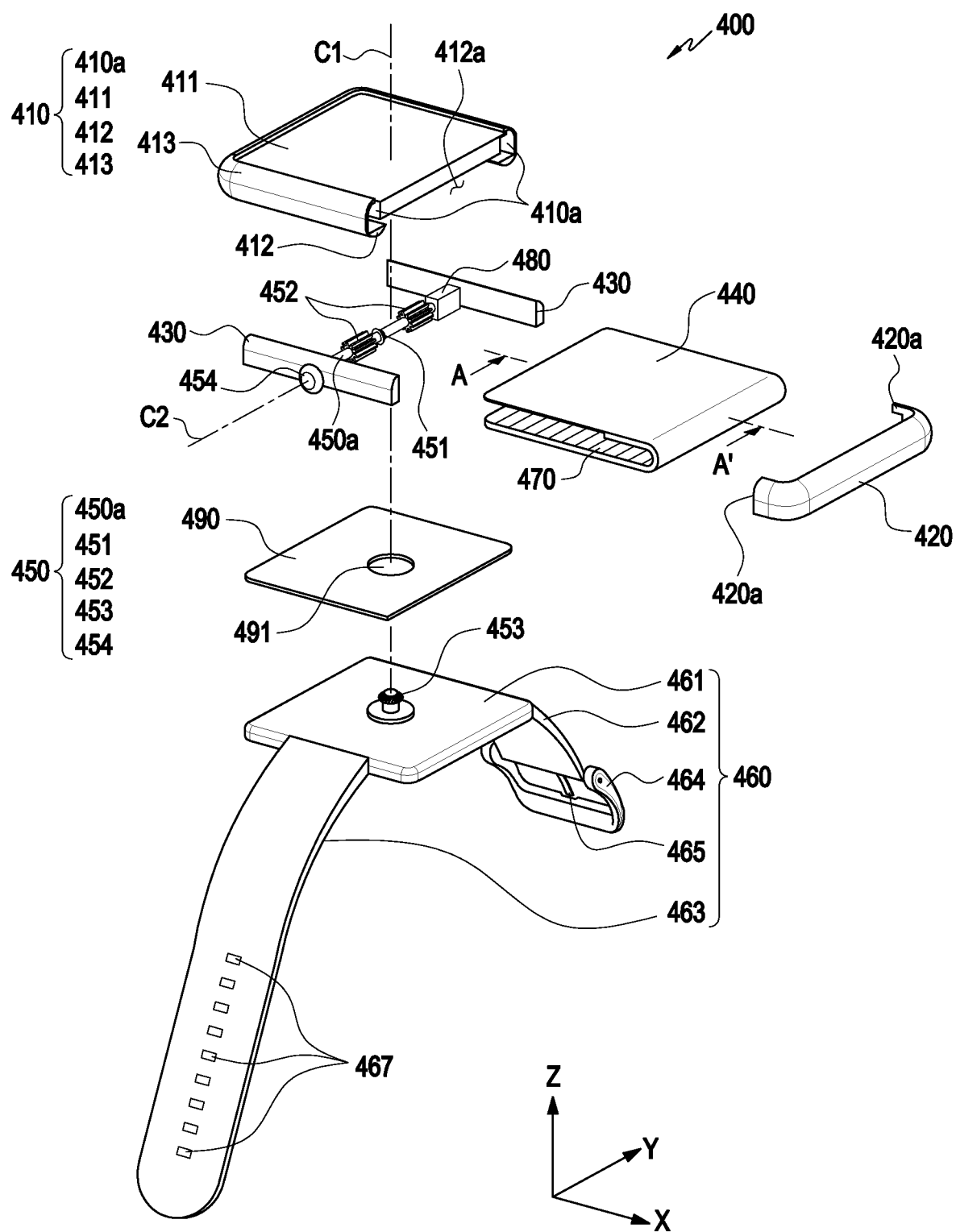
FIG. 5 is an exploded perspective view illustrating a configuration of an electronic device with a flexible display according to an embodiment of the disclosure.

FIG. 5 is an exploded perspective view illustrating a configuration of an electronic device 400 with a flexible display 440 according to an embodiment of the disclosure.

Figure 6:
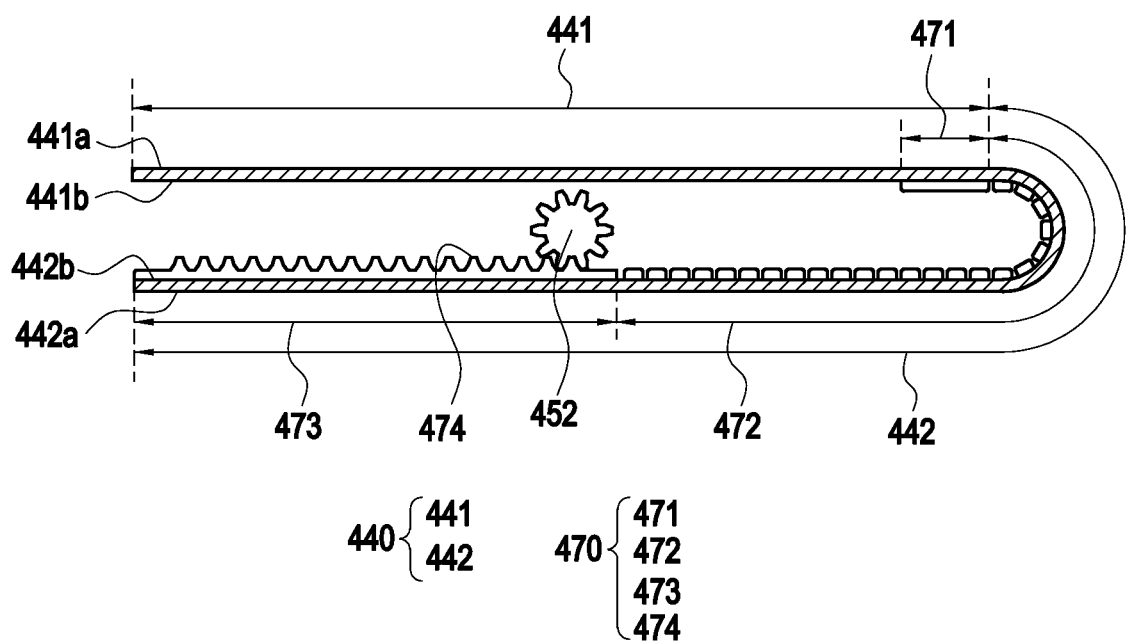
FIG. 6 is a cross-sectional view taken along A-A' of FIG. 5, illustrating a flexible display and a display supporting structure according to an embodiment of the disclosure.

FIG. 6 is a cross-sectional view taken along A-A' of FIG. 5, illustrating a flexible display 440 and a display supporting structure 470 according to an embodiment of the disclosure.

Figure 7:
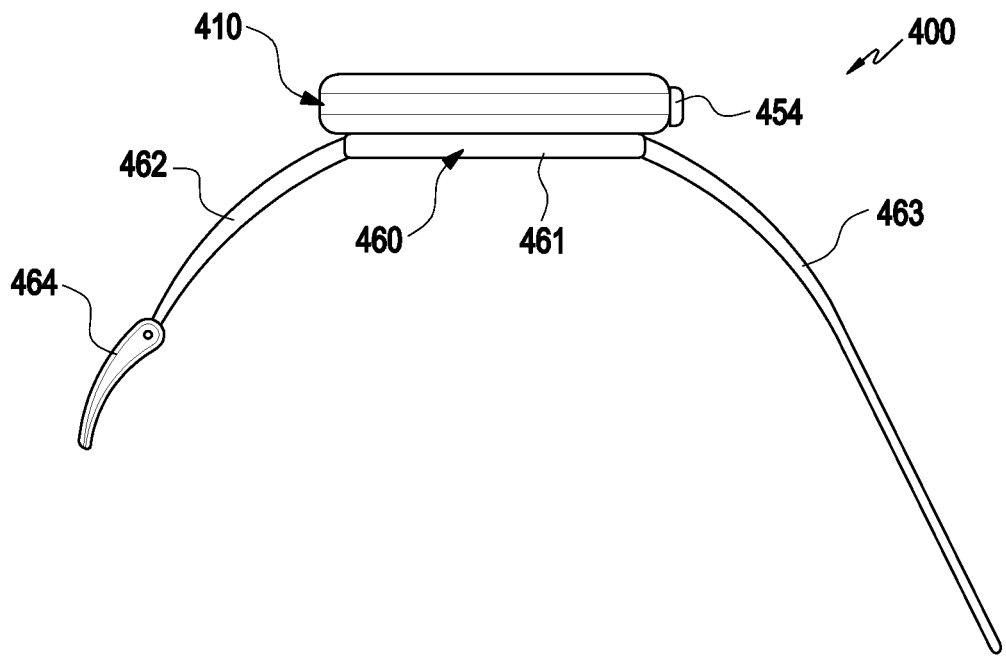
FIG. 7 is a side view illustrating an assembled state of an electronic device with a flexible display according to an embodiment of the disclosure.

FIG. 7 is a side view illustrating an assembled state of an electronic device 400 with a flexible display 440 according to an embodiment of the disclosure. According to various embodiments, the display supporting structure 470 may be an articulated structure, an articulated hinge structure, or a multi-bar type structure in which several bars are combined.

The electronic device 400 of FIGS. 5 to 7 may be at least partially similar to the electronic device 101 of FIG. 1 or may include another embodiment of the electronic device.

The electronic device 400 may include a watch-type wearable device that may be worn on a human wrist. In an embodiment, the electronic device 400 is described as being a watch-type wearable device as an example, but is not limited thereto. For example, the electronic device 400 may be variously applied as long as it is a wearable device that may be worn on the user's body other than the wrist of the user's body. For example, the electronic device 400 may include a wearable electronic device 400 worn on the user's eyes and used like glasses. According to various embodiments of the disclosure, the electronic device 400 is described as being a smart watch as an example.

Referring to FIGS. 5 to 7, according to various embodiments, an electronic device 400 may include first and second housings 410 and 420, a plurality of guide rails 430, a flexible display 440, a gear structure 450, and a mounting member 460. For example, the first housing 410 may include a first surface (e.g., front surface) 411, a second surface (e.g., rear surface) 412 facing in the opposite direction of the first surface 411, and a side surface 413 surrounding the space between the first and second surfaces 411 and 412.

According to an embodiment, the first surface 411 may face a first area 441 of the flexible display 440 to be described below, and a supporting member 490 supporting rotation ① of the first and second housings 410 and 420 may be disposed on the second surface 412. For example, an opening 412a may be formed in the second surface 412 to allow the supporting member 490 to be disposed thereon.

The second housing 420 may be slidably coupled to a side surface of the first housing 410 and may be detachably coupled to the side surface of the first housing and may rotate ① together with the first housing 410. For example, the second housing 420 may rotate (①) together with the first housing 410 and slide away from or closer to the side surface of the first housing 410. For example, when the second housing 420 slides away from the side surface of the first housing 410, the second housing 420 may be separated from the side surface of the first housing 410 while extending the flexible display 440. Further, when the second housing 420 slides closer to the side surface of the first housing 410, the second housing 420 may be coupled to the side surface of the first housing 410 while shrinking the flexible display 440.

According to various embodiments, various circuit devices, e.g., the processor 120 (e.g., application processor (AP), the memory 130, the interface 177 (e.g., an input/output interface or communication interface), the antenna module 197 and the wireless charging device (not shown), as described above in connection with FIG. 1, may be received in the first and second housings 410 and 420, and the battery 189 may also be received therein to secure power.

The plurality of guide rails 430 may be disposed in the first housing 410, guiding the slide of the second housing 420. For example, first ends of the plurality of guide rails 430 may be slidably fitted to the plurality of sliding recesses 410a formed on two opposite sides of the first housing 410. Second ends of the plurality of guide rails 430 may be fitted to a plurality of coupling recesses 420a formed on two opposite sides of the second housing 420. Accordingly, the plurality of guide rails 430 may be drawn in or out from the plurality of sliding recesses 410a to be able to slide the second housing 420.

The flexible display 440 may include a liquid crystal display (LCD), a light emitting diode (LED) display, an organic light emitting diode (OLED) display, or a microelectromechanical systems (MEMS) display, or an electronic paper display. The flexible display may be integrally provided with a touchscreen panel, functioning as a touchscreen.

Referring to FIG. 6, the flexible display 440 may include a first area 441 mounted on a first surface 411 of the first housing 410 and a second area 442 extending from the first area 441. For example, the first area 441 may include a first front surface 441a exposed to the outside and a first rear surface 441b which is opposite to the first front surface 441a. The second area 442 may include a second front surface 442a having at least a portion exposed to the outside and a second rear surface 442b which is opposite to the second front surface 442a.

According to various embodiments, the electronic device 400 may include a display supporting structure 470 facing the first rear surface 441b of the first area 441 and the second rear surface 442b of the second area 442. For example, the display supporting structure 470 may support rolling of the flexible display 440 to allow at least a portion of the second area 442 to be exposed to the outside while supporting the slide of the second housing 420 according to rotation of the gear structure 450.

According to an embodiment, the display supporting structure 470 may include first, second, and third hinge areas 471, 472, and 473, and the first hinge area 471 may face and be fixed to at least a portion of the first rear surface 441b of the first area 441. The second hinge area 472 may extend from the first hinge area 471 and, as the second housing 420 slides, the second area 442 may be curved to be drawn in or out from the second housing 420. The third hinge area 473 may extend from the second hinge area 472 and include a hinge gear 474 engaged with a plurality of second gear portions 452 included in the gear structure 450. For example, when the plurality of second gear portions 452 are rotated, the plurality of second gear portions 452 may slide the hinge gear 474 according to the rotations and, in this case, the third hinge area 473 along with the hinge gear 474 may slide. For example, if the third hinge area 473 slides, the second hinge area 472 may be curved while sliding the second housing 420 in the sliding direction ②. In this case, the second hinge area 472 may draw out at least a portion of the second area 442 from the second housing 420. Simultaneously, at least a portion of the second area 442 may be exposed to the outside. For example, the second area 442 may be extended from the first area 441, and the first area 441 and at least a portion of the second area 442 may be exposed to the outside.

Figure 8:
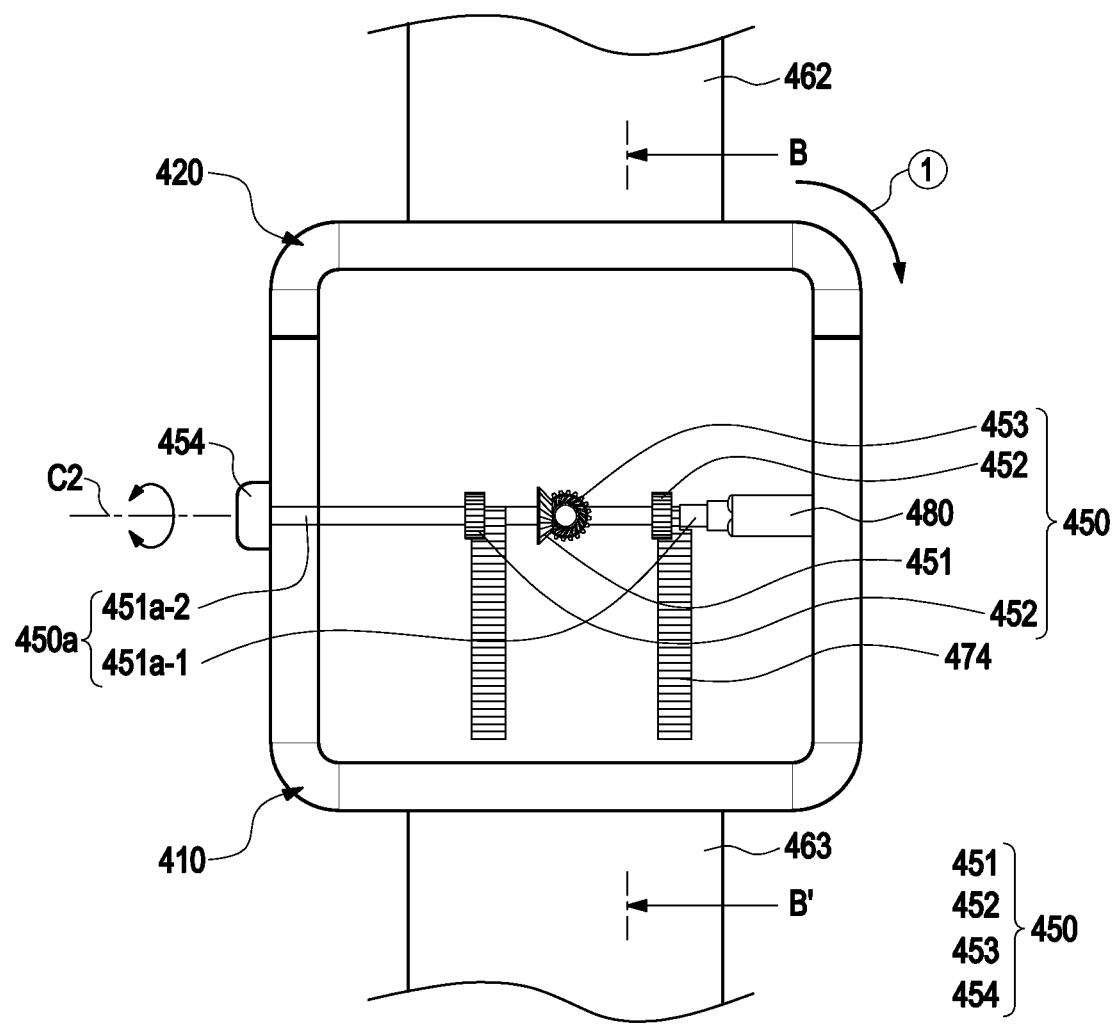
FIG. 8 is a plan view illustrating a pre-operation state of an electronic device with a flexible display according to an embodiment of the disclosure.

FIG. 8 is a plan view illustrating a pre-operation state of an electronic device 400 with a flexible display 440 according to an embodiment of the disclosure.

Figure 9:
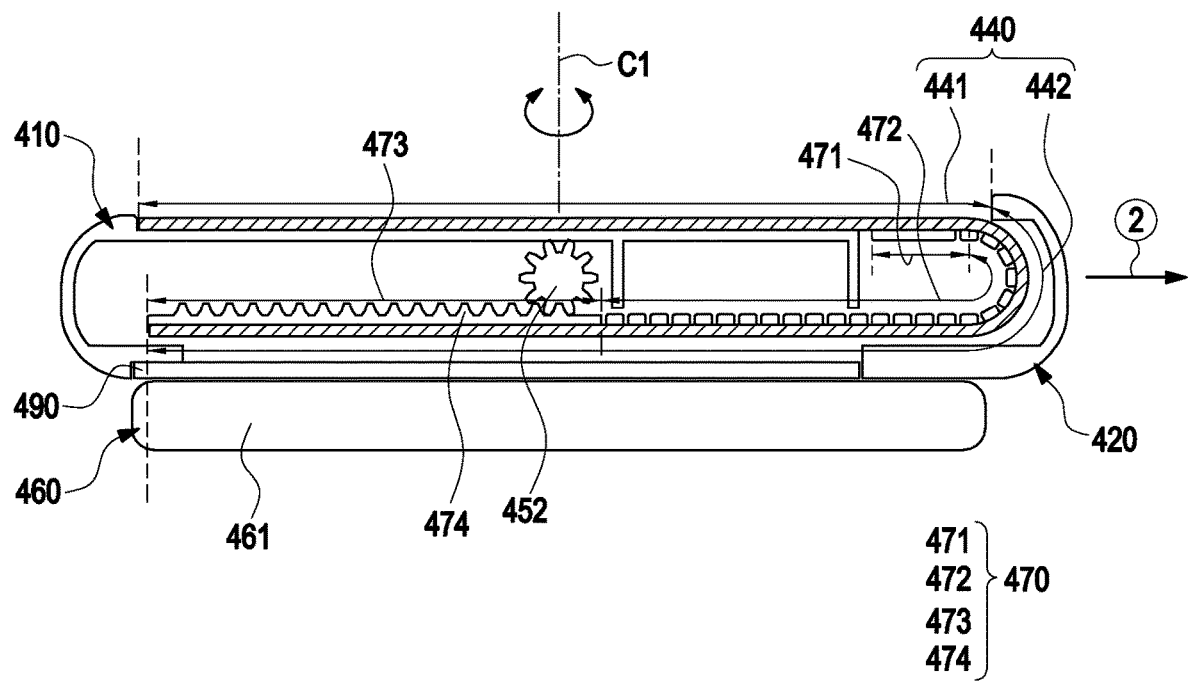
FIG. 9 is a cross-sectional view taken along B-B' of FIG. 8, illustrating a pre-operation state of an electronic device with a flexible display according to an embodiment of the disclosure.

FIG. 9 is a cross-sectional view taken along B-B' of FIG. 8, illustrating a pre-operation state of an electronic device 400 with a flexible display 440 according to an embodiment of the disclosure.

Figure 10:
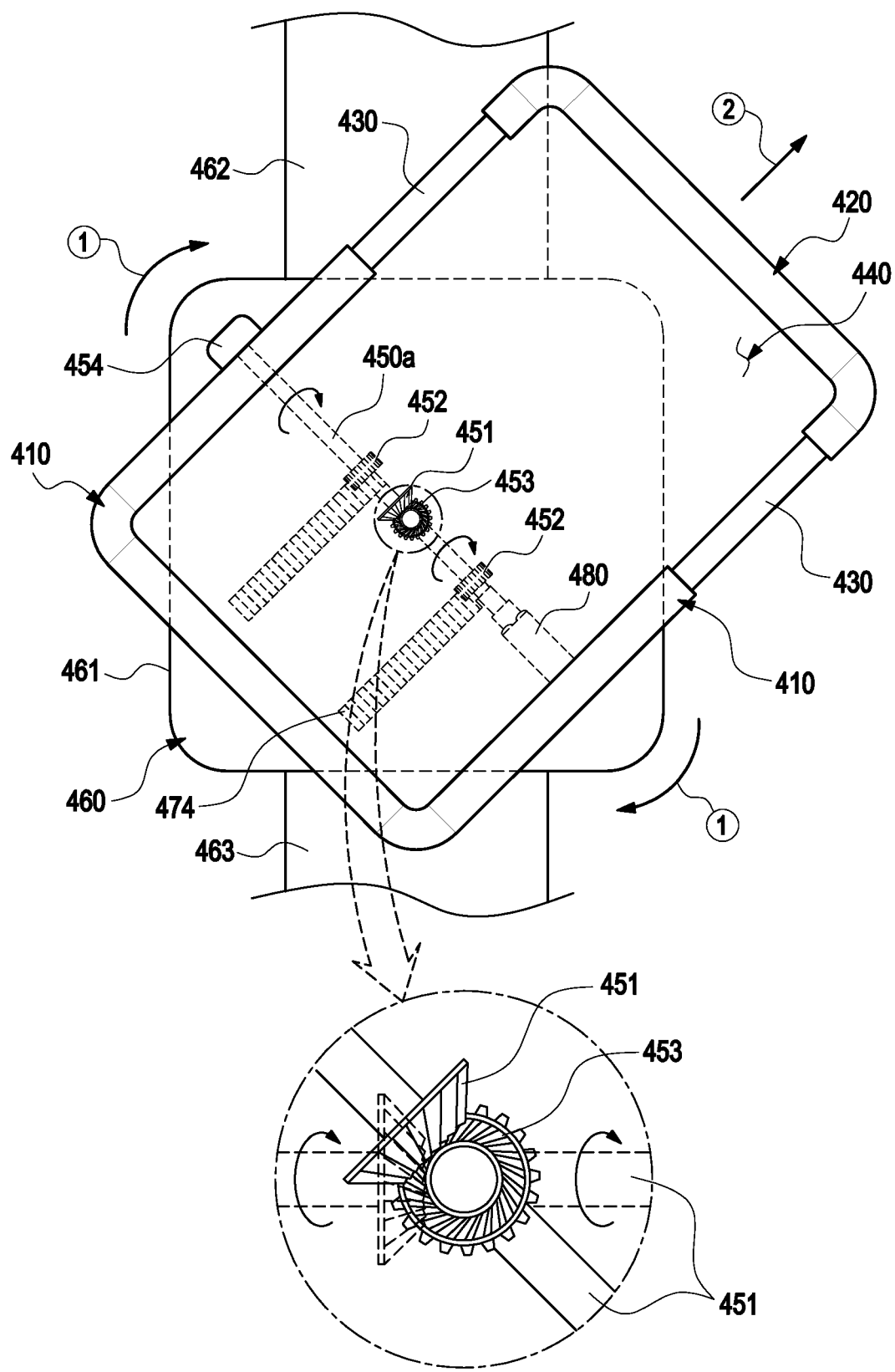
FIG. 10 is a plan view illustrating an operational process of an electronic device with a flexible display according to an embodiment of the disclosure.

FIG. 10 is a plan view illustrating an operational process of an electronic device 400 with a flexible display 440 according to an embodiment of the disclosure.

Figure 11A:
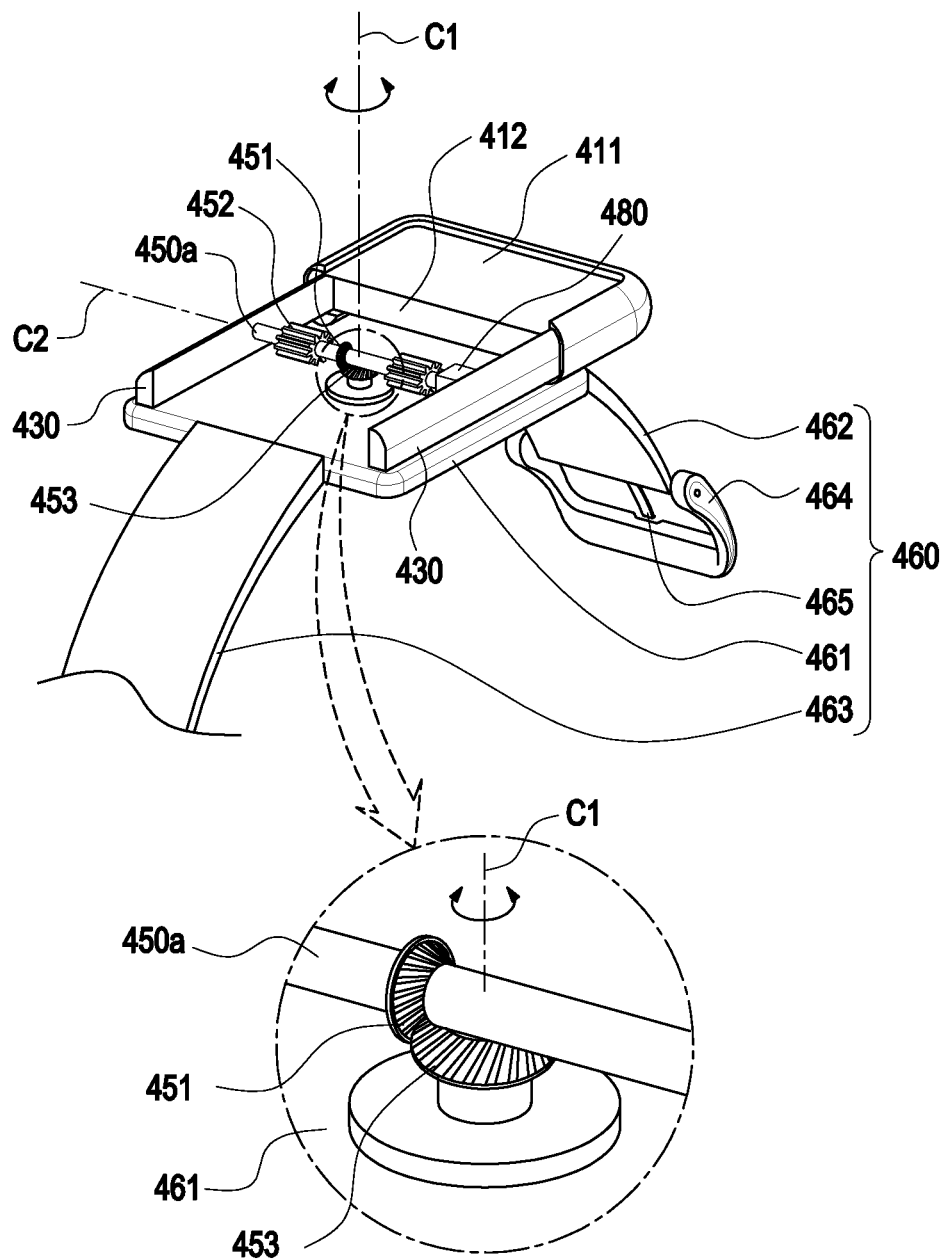
FIG. 11A is an exploded perspective view illustrating an operational process of an electronic device with a flexible display according to an embodiment of the disclosure.
Figure 11B:
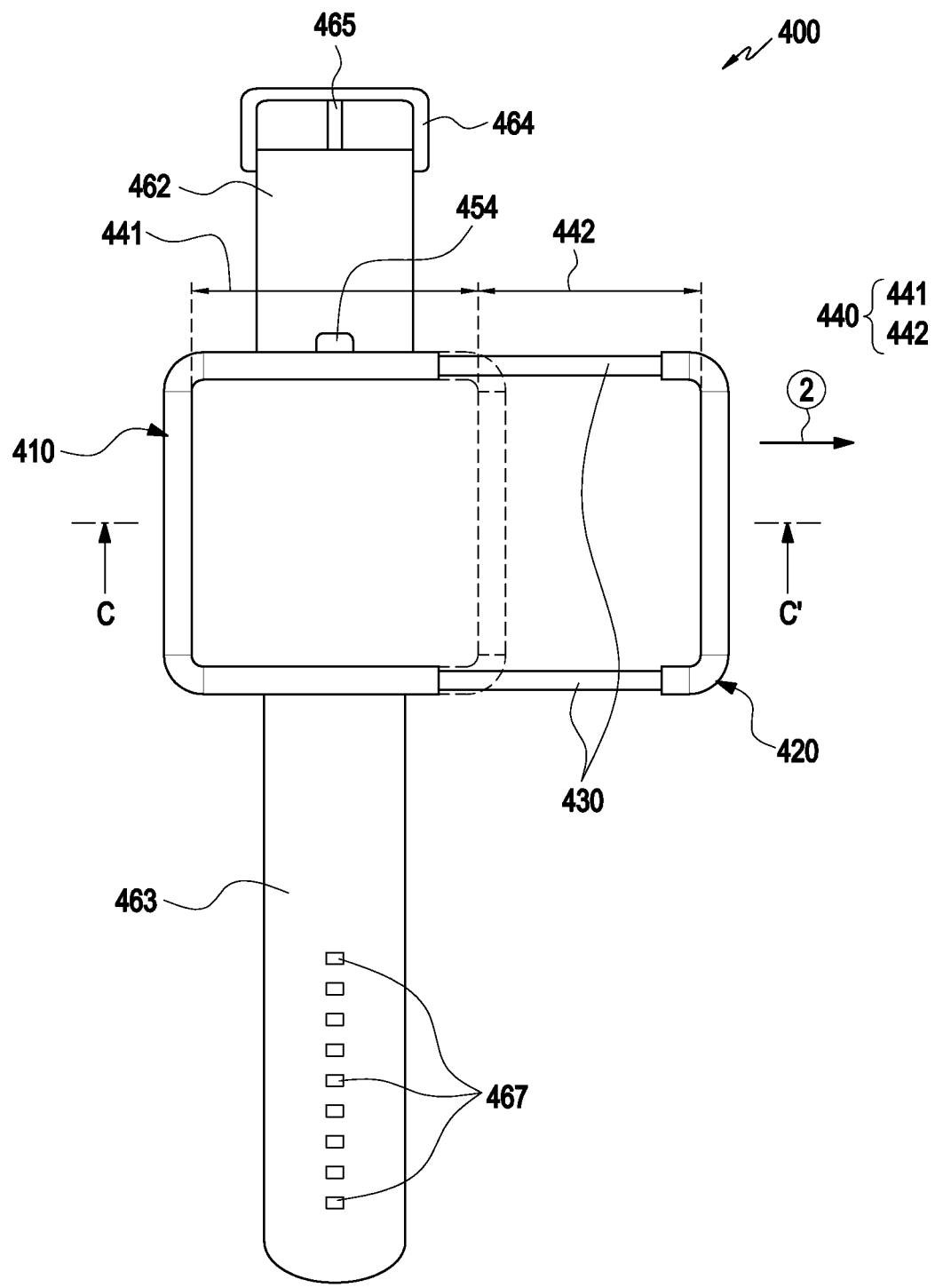
FIG. 11B is a plan view illustrating a post-operation state of an electronic device with a flexible display according to an embodiment of the disclosure.

FIG. 11A is an exploded perspective view illustrating an operational process of an electronic device 400 with a flexible display 440 according to an embodiment of the disclosure. FIG. 11B is a plan view illustrating a post-operation state of an electronic device 400 with a flexible display 440 according to an embodiment of the disclosure.

Figure 12:
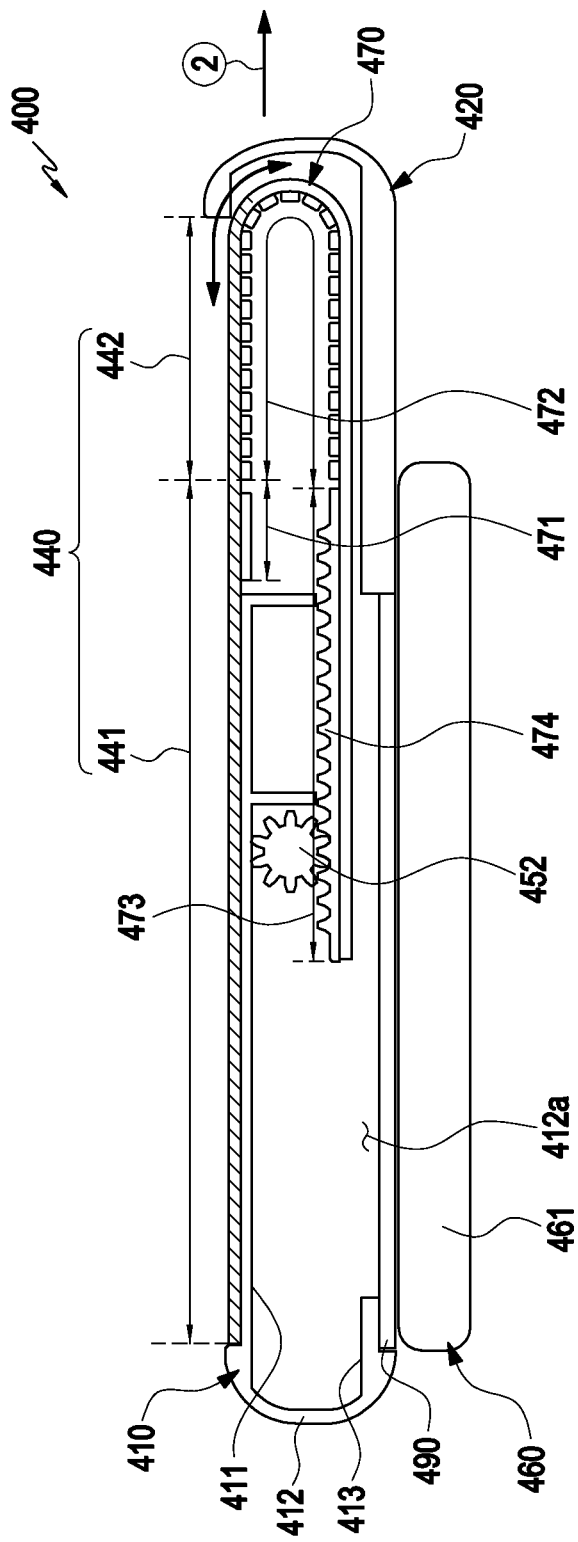
FIG. 12 is a cross-sectional view taken along C-C' of FIG. 11B, illustrating a post-operation state of an electronic device with a flexible display according to an embodiment of the disclosure.

FIG. 12 is a cross-sectional view taken along C-C' of FIG. 11B, illustrating a post-operation state of an electronic device 400 with a flexible display 440 according to an embodiment of the disclosure.

Referring to FIGS. 8 to 10, 11A, 11B, and 12, the gear structure 450 may be disposed in the first housing 410 and, as the first gear portion 451, the plurality of second gear portions 452, and the third gear portion 453 rotate, the gear structure 450 may rotate (①) the first and second housings 410 and 420 or slide the second housing 420 in the sliding direction ② from the first housing 410. For example, the gear structure 450 may include a rotation shaft 450a, a first gear portion 451, a plurality of second gear portions 452, a third gear portion 453, and a rotation knob 454.

The rotation shaft 450a may be connected to the driving motor 480 and may be rotated according to the driving of the driving motor 480.

The first gear portion 451 may be disposed on the rotation shaft 450a and may include a first rotational axis C1. For example, when the driving motor 480 is driven, the first gear portion 451 may rotate the first and second housings 410 and 420 and the flexible display 440 about the first rotational axis C1 according to the rotation of the rotation shaft 450a. For example, the first gear portion 451 may include a first bevel gear. The third gear portion 453 may be fixed while being disposed in the center of the mounting member 460, and may include a second bevel gear. The second bevel gear may mesh with the first bevel gear. For example, the first and second bevel gears mesh with each other. In this state, when the rotation shaft 450a rotates, as shown in FIGS. 10 and 11A above, the first gear portion 451 disposed on the rotation shaft 450a may be gear-rotated by the third gear portion 453 meshing with the first gear portion 451. In this case, the first gear portion 451 may rotate about the first rotational axis C1. The first and second housings 410 and 420 and the flexible display 440 may rotate about the first rotational axis C1 by the first and third gear portions 451 and 453.

According to various embodiments, a supporting member 490 facing the mounting member 460 and supporting rotation ① of the first and second housings 410 and 420 may be disposed on the second surface of the first housing 410. For example, the supporting member 490 may rotatably face the mounting member 460. In this state, the first and second housings 410 and 420 may be rotated about the first rotational axis C1 on the front surface of the mounting member 460 by the supporting member 490.

According to various embodiments, a through hole 491 that is through-coupled with the third gear portion 453 may be formed in the center of the supporting member 490. For example, when the supporting member 490 and the mounting member 460 face each other, the third gear portion 453 disposed on the mounting member 460 may pass through the through hole 491 and mesh with the first gear portion 451. Accordingly, the third gear portion 453 may support gear rotation of the first gear portion 451.

Referring to FIGS. 10, 11A, 11B, and 12, the plurality of second gear portions 452 may be disposed on the rotation shaft 450a and may include a second rotational axis C2. For example, the plurality of second gear portions 452 are meshed with the hinge gear 474 of the display supporting structure 470 and, when the rotation shaft 450a rotates about the second rotational axis C2, may slide the hinge gear 474 of the display supporting structure 470. For example, the plurality of second gear portions 452 may include spur gears to mesh with the hinge gear 474 of the display supporting structure 470. For example, the spur gear may change rotation to linear movement. Accordingly, when the plurality of second gear portions 452 including the spur gear rotate about the second hinge axis according to the rotation of the rotation shaft 450a, the second gear portions 452 may slide the hinge gear 474. At the same time, the display supporting structure 470 may be slid and rolled and be thus curved. In this case, the display supporting structure 470 may roll the second area 442 of the flexible display 440 while drawing out at least a portion of the second area 442 from the second housing 420. For example, when the display supporting structure 470 is slid in the sliding direction ② and curved, the display supporting structure 470 may slide and roll the second housing 420 in the sliding direction ②. In this case, the second hinge area 472 of the display supporting structure 470 may be curved and rolled, drawing out the second area 442 of the flexible display 440 from the second housing 420.

Although FIG. 12 illustrates that the internal structure of the housing 420 is exposed to the outside as the second housing 420 slides in the sliding direction ②, in an actual implementation, a structure to prevent the internal structure of the housing 420 from being exposed to the outside although the second housing 420 slides in the sliding direction ② may further be included.

Referring to FIG. 8, one end 450a-1 of the rotation shaft 450a may be connected with the driving motor 480, and the other end 450a-2 of the rotation shaft 450a may be connected with the rotation knob 454 exposed to the outside of the first and second housings 410 and 420. For example, when the user executes at least one desired application (e.g., navigation application), the processor (e.g., the processor 120 of FIG. 1) provided in the electronic device 400 may operate the driving motor 480 to rotate (①) the first and second housings 410 and 420 or slide the second housing 420. For example, the at least one application may include one or more applications that may perform functions such as, e.g., a home, a dialer, a short message service (SMS)/multimedia messaging service (MMS), an instant message (IM), a browser, a camera, an alarm, a contact, a voice dial, an email, a calendar, a media player, an album, or a clock, a healthcare (e.g., measuring the degree of exercise or blood sugar), or provision of environmental information (e.g., provision of air pressure, moisture, or temperature information) or navigation.

According to an embodiment, when the user executes at least one application (e.g., a navigation application), the processor 120 may apply a signal to the driving motor 480 to drive the driving motor 480. In this case, the driving motor 480 may rotate the rotation shaft 450*a* about the second rotational axis C2. The rotation shaft 450*a* may rotate the first gear portion 451. In this case, the first gear portion 451 may be rotated by the third gear portion 453 of the mounting member 460 to rotate (①) the first and second housings 410 and 420 and the flexible display 440 about the first rotational axis C1. At the same time, the rotation shaft 450*a* may also rotate the second gear portion 452 about the second rotational axis C2. For example, the second gear portion 452 may slide the hinge gear 474 of the display supporting structure 470. In this case, the second hinge area 472 of the display supporting structure 470 may be curved and rolled, sliding the second housing 420 in the sliding direction ②. For example, the display supporting structure 470 may be rolled to slide the second housing 420 while drawing out at least a portion of the second area 442 of the flexible display 440 from the second housing 420. For example, the first and second housings 410 and 420 and the flexible display 440 may be automatically rotated (①) by the driving motor 480 and, simultaneously, the flexible display may be rolled to slide the second housing 420 in the sliding direction ②. In this case, at least a portion of the second area 442 of the flexible display 440 may also be exposed to the outside while being drawn out from the second housing 420. Accordingly, at least a portion of the second area 442 may be exposed to the outside. In this state, the user may be provided with various pieces of information about an application (e.g., a navigation application) selected through the first area and at least a portion of the second area of the flexible display 440.

According to various embodiments, when the user manually rotates the rotation knob 454 connected to the other end 450*a*-2 of the rotation shaft 450*a* with his/her hand, the rotation knob 454 may rotate the rotation shaft 450*a*, and the rotation shaft 450*a* may simultaneously rotate the first gear portion 451 according to the rotation. According to the rotation, the first gear portion 451 may rotate (①) the first and second housings 410 and 420 and the flexible display 440. Simultaneously, the rotation shaft 450*a* may rotate the plurality of second gear portions 452 according to the rotation. In this case, according to the rotation, the plurality of second gear portions 452 may roll the flexible display 440 to slide the second housing 420 in the sliding direction while manually drawing out at least a portion of the second area 442 of the flexible display 440 from the second housing 420. Accordingly, at least a portion of the second area 442 of the flexible display 440 may be exposed to the outside according to the rotation of the rotation knob 454.

Accordingly, when rotated by being driven by the driving motor 480, the rotation shaft 450*a* may automatically rotate (①) the first and second housings 410 and 420 and the flexible display 440 while automatically exposing at least a portion of the second area 442 to the outside.

According to various embodiments, when the user holds the rotation knob 454 with his/her hand to rotate the rotation shaft 450*a*, the rotation shaft 450*a* may manually rotate the first and second housings 410 and 420 and the flexible display 440 while manually exposing at least a portion of the second area 442 to the outside.

Accordingly, the first and second housings 410 and 420 and the flexible display 440 may automatically be rotated by the driving motor 480 while automatically extending the flexible display 440. Further, the first and second housings 410 and 420 and the flexible display 440 may manually rotate the first and second housings 410 and 420 and the flexible display 440 by the rotation of the rotation knob 454 while manually extending the flexible display 440.

According to various embodiments, as shown in FIGS. 5 and 7, the third gear portion 453 fitted into the through hole 491 formed in the center of the supporting member 490 may be disposed in the center portion of the mounting member 460, and the first and second binding members 462 and 463 may be disposed around the outer circumference of the mounting member 460. For example, the first binding member 462 may include a band guide member 464 including a fixing member 465 fitted into a plurality of coupling holes 467 included in the second binding member 463 described below. For example, the first and second binding members 462 and 463 may be disposed to extend and protrude away from each other from the outer circumference of the mounting member 460. In this state, the mounting member 460 may be placed on the user's wrist, and the second binding member 463 may be inserted into the band guide member 464 of the first binding member 462. In this case, since the band guide member 464 includes the fixing member 465, the fixing member 464 may be inserted into the plurality of coupling recesses of the second binding member 463, binding and fixing the first and second binding members 462 and 463.

In this state, when the user executes a navigation application among at least one application of the electronic device 400, the processor 120 may drive the driving motor 480 in a first direction. The driving motor 480 may be driven by the processor 120 in the first direction while simultaneously rotating the rotation shaft 450*a* about the second rotational axis C2. The rotation shaft 450*a* may rotate the first and second gear portions 451 and 452. According to the rotation, the first gear portion 451 may rotate (①) the first and second housings 410 and 420 and the flexible display 440 about the first rotational axis C1. Simultaneously, the second gear portions 452 may also be rotated to slide the hinge gear 474 of the display supporting structure 470, and the second hinge area 472 of the display supporting structure 470 may be curved and rolled to slide the second housing 420 in the sliding direction ②. In this case, the second hinge area 472 of the display supporting structure 470 may draw out at least a portion of the second area 442 of the flexible display 440 from the second housing 420. Accordingly, the first area 441 of the flexible display 440 and at least a portion of the second area 442 of the flexible display 440 may be exposed to the outside. In this case, the user may receive information about the navigation application through the extended flexible display 440.

Referring to FIGS. 11B and 12, as the first area 441 and at least a portion of the second area 442 of the flexible display 440 are exposed to the outside, the flexible display 440 may secure an enlarged large-screen display area so that users may receive various pieces of visual information through the large-screen display area. Accordingly, the extended flexible display 440 may easily provide various pieces of application information to the user.

According to various embodiments, when the user does not execute the navigation application, the processor 120 may re-drive the driving motor 480. The driving motor 480 may be driven by the processor 120 in a second direction (e.g., reverse direction) opposite to the first direction (e.g., forward direction) while simultaneously rotating the rotation shaft 450a about the second rotational axis C2. The rotation shaft 450a may rotate the first and second gear portions 451 and 452. According to the rotation, the first gear portion 451 may rotate (①) the first and second housings 410 and 420 and the flexible display 440 about the first rotational axis C1. Simultaneously, the second gear portions 452 may also be rotated. According to the rotation, the second gear portions 452 may curve and roll the display supporting structure 470, sliding it in the direction opposite to the sliding direction ②. For example, the display supporting structure 470 may also slide at least a portion of the second area 442 of the flexible display 440. In this case, the display supporting structure 470 may slide at least a portion of the second area 442 in the direction opposite to the sliding direction ② while simultaneously sliding the second housing 420 in the direction opposite to the sliding direction ② back to the original position. Accordingly, the display supporting structure 470 may be curved and rolled, sliding the second housing 420 in the direction opposite to the sliding direction ② back to the original position while simultaneously drawing at least a portion of the second area 442 of the flexible display 440 in the second housing 420.

As such, the flexible display 440 configures the display supporting structure 470 which is curved according to the rotation of the gear structure 450 to support the rolling of the flexible display 440. Thus, the display supporting structure 470 may easily extend the flexible display 440, thus easily providing a large-screen display area of the flexible display 440. Accordingly, the user may extend the flexible display 440 according to the purpose of use of the electronic device, further enhancing the user's convenience.

Figure 13A:
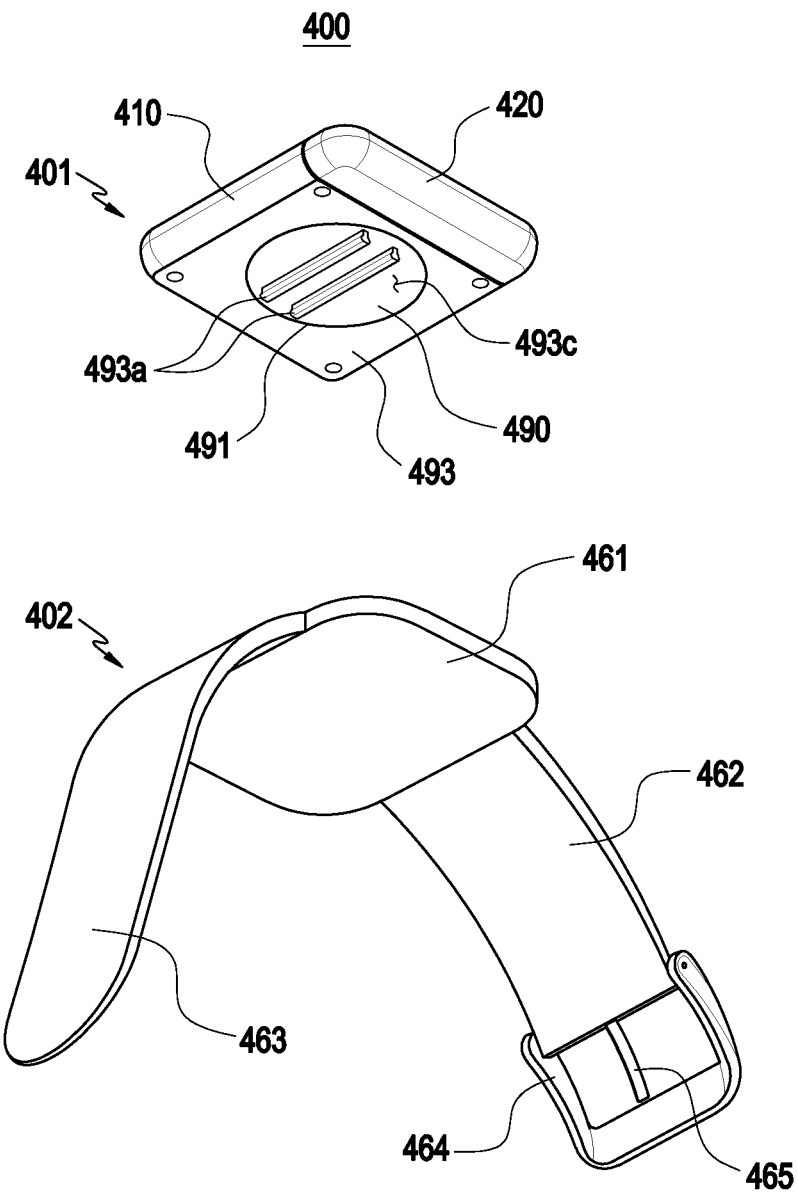
FIG. 13A is a perspective view illustrating a device portion and a mounting portion separated from each other in an electronic device with a flexible display according to an embodiment of the disclosure.
Figure 13B:
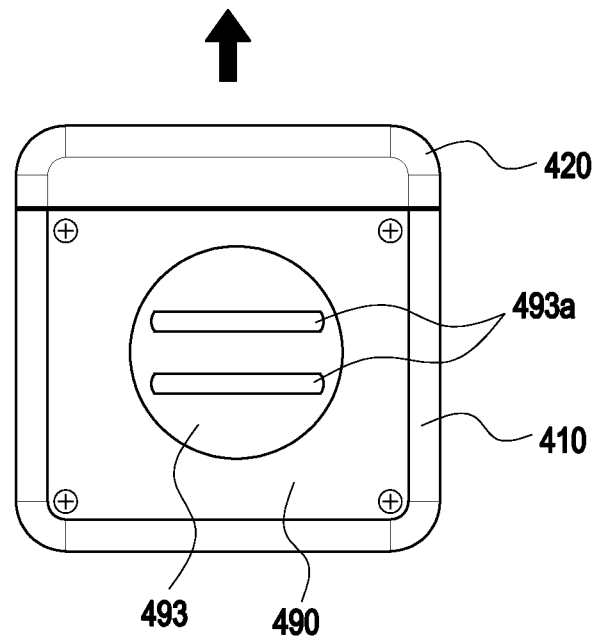
FIG. 13B is a view illustrating a gear plate for coupling with a mounting portion in a device portion of an electronic device according to an embodiment of the disclosure.
Figure 13B:
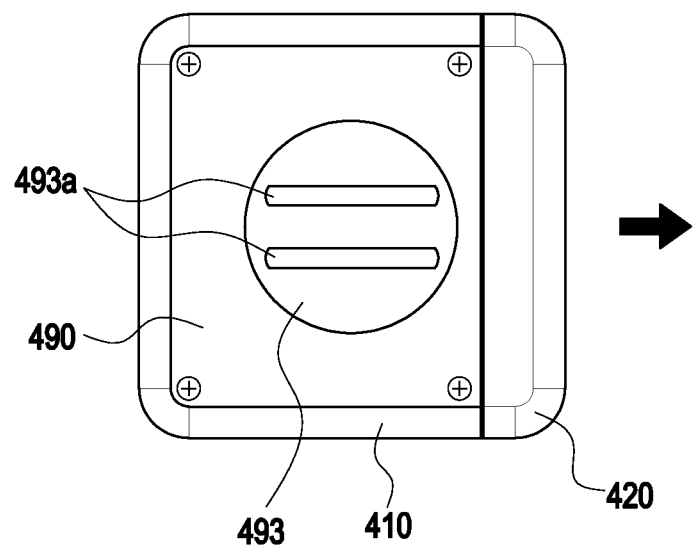
Figure 13C:
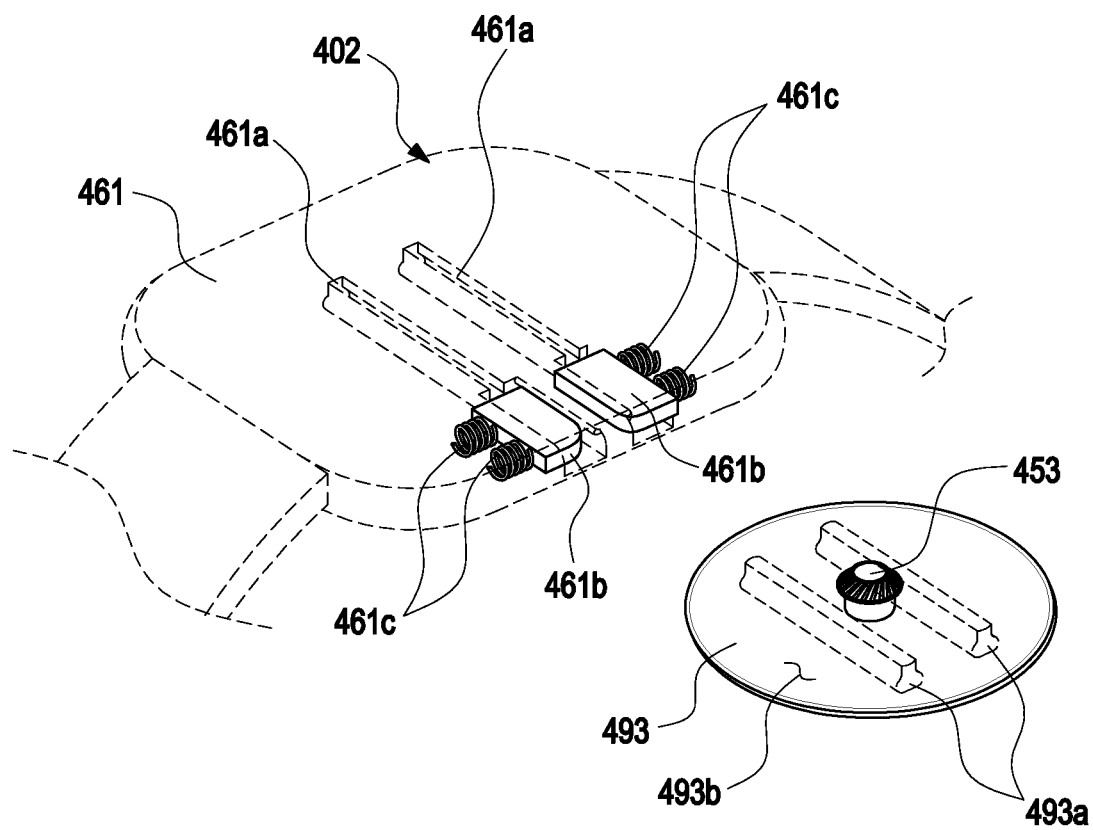
FIG. 13C is a perspective view illustrating a coupling relationship between a mounting portion and a device portion in an electronic device according to an embodiment of the disclosure.
Figure 13D:
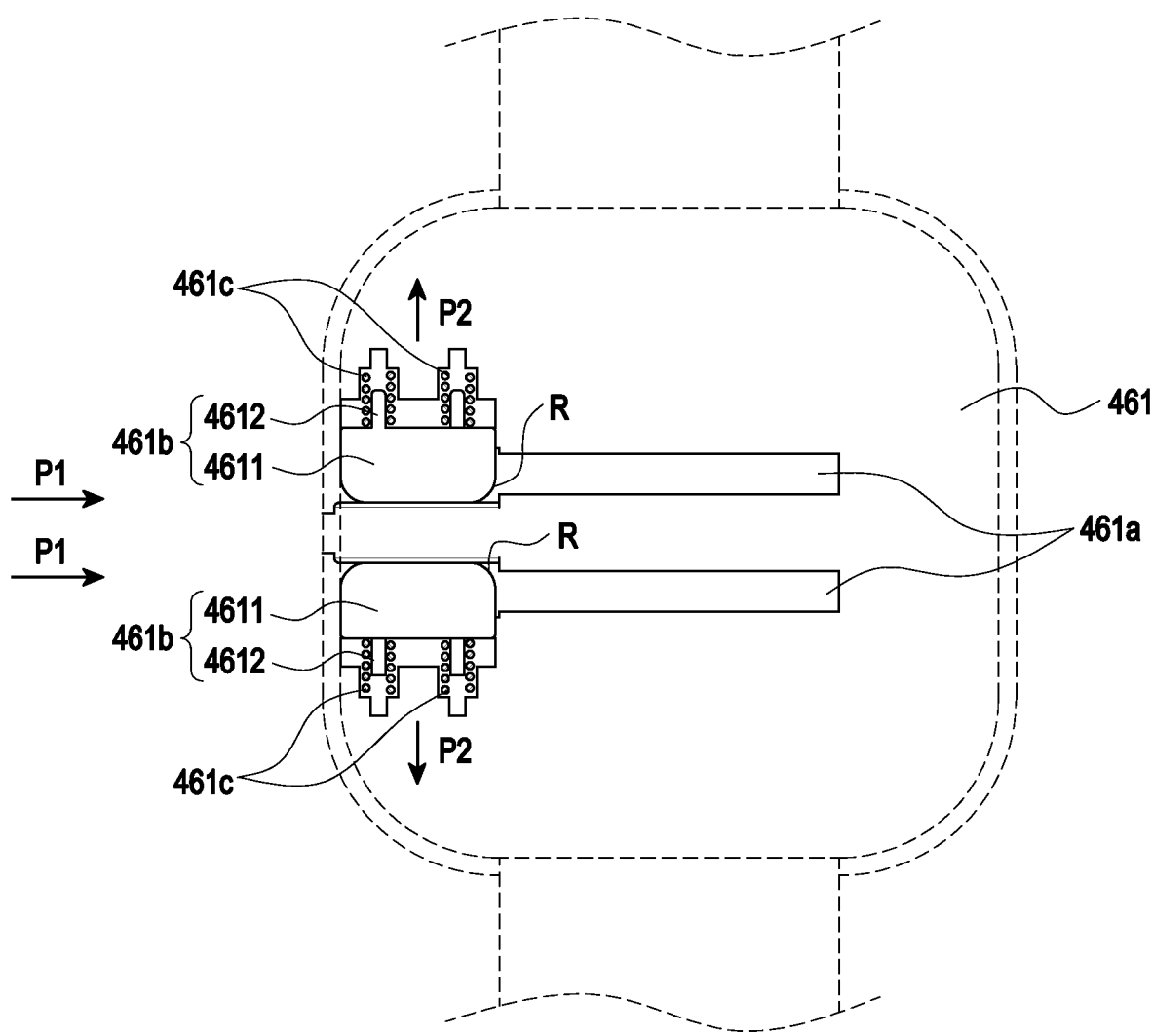
FIG. 13D is a view illustrating a coupling structure of a mounting portion in an electronic device according to an embodiment of the disclosure.

FIG. 13A is a perspective view illustrating a device portion 401 and a mounting portion 402 separated from each other in an electronic device 400 with a flexible display 440 according to an embodiment of the disclosure. FIG. 13B is a view illustrating a gear plate 493 for coupling with a mounting portion 402 in a device portion 401 of an electronic device 400 according to an embodiment of the disclosure. FIG. 13C is a perspective view illustrating a coupling relationship between a mounting portion 402 and a device portion 401 in an electronic device 400 according to an embodiment of the disclosure. FIG. 13D is a view illustrating a coupling structure of a mounting portion 402 in an electronic device 400 according to an embodiment of the disclosure.

The configuration of the electronic device 400 of FIGS. 13A to 13D may be at least partially similar to the configuration of the electronic device 400 of FIGS. 5 to 10, 11A, 11B, and 12 or may include another embodiment of the electronic device.

Referring to FIGS. 13A to 13D, an electronic device 400 may include a device portion 401 where a flexible display 440 is extendably disposed and a mounting portion 402 coupled with the device portion 401 and formed to be worn on the user's body (e.g., wrist).

According to various embodiments, the device portion 401 may include first and second housings 410 and 420, a plurality of guide rails (e.g., the guide rails 430 of FIGS. 5 to 7), a flexible display (e.g., the flexible display 440 of FIGS. 5 to 7), a supporting member 490, and a gear plate 493. The mounting portion 402 may include a mounting plate 461, first and second binding members (e.g., the first and second binding members 462 and 463 of FIGS. 5 to 7), a band guide member (e.g., the band guide member 464 of FIGS. 5 to 7), a fixing member (e.g., the fixing member 464 of FIGS. 5 to 7), and a plurality of coupling holes (e.g., the coupling holes 465 of FIGS. 5 to 7).

The following description focuses primarily on a configuration different from those shown in FIGS. 5 to 10, 11A, 11B, and 12.

According to an embodiment, the supporting member 490 may be disposed on one surface (e.g., the surface facing the mounting portion 402) of the first housing 410 to face the mounting portion 402 and support rotation of the first and second housings 410 and 420. The supporting member 490 may be rotatably coupled to the mounting portion 402. According to an embodiment, the gear plate 493 may be mounted in the center of the supporting member 490, and a through hole 491 for exposure to the outside may be formed. The gear plate 493 may include a first surface 493b facing the device portion 401 and a second surface 493c facing the mounting portion 402, and the third gear portion 453 protruding inward of the device portion 401 may be disposed on the first surface 493b. The third gear portion 453 of FIGS. 5 to 7 may be applied to some shape and/or function of the third gear portion 453. For example, the third gear portion 453 formed on the gear plate 493 may be disposed to mesh with the first gear portion (e.g., the first gear portion 451 of FIGS. 5 to 7) to support gear rotation of the first gear portion 451. A guide portion 493a protruding toward the mounting portion 402 may be disposed on the second surface 493c of the gear plate 493. For example, the guide portion 493a may include a linear protrusion for slidable coupling to the mounting plate 461 of the mounting portion 402. As an example, the guide portion 493a may have a plurality of linear protrusions formed side by side to allow the device portion 401 to be stably coupled to the mounting plate 461.

Referring to FIG. 13B, the gear plate 493 may be coupled to be rotated relative to the supporting member 490. For example, in a state in which the device portion 401 is coupled to the mounting portion 402, the gear plate 493 may be fixedly coupled to the mounting portion 402, and the supporting member 490 fixedly coupled to the device portion 401 may be rotated about the gear plate 493. As the device portion 401 is rotated relative to the mounting portion 402, the user may freely adjust the extending direction (e.g., the direction indicated by the arrow in FIG. 13B) of the flexible display.

According to various embodiments, the mounting plate 461 of the mounting portion 402 is a portion directly contacting the user's body (e.g., wrist) and may be provided in a plate shape. The mounting plate 461 may include a recess portion 461a for slidable coupling with the guide portion 493a of the gear plate 493, a fixing member 461b disposed in one area of the recess portion 461a to fix the gear plate 493, and an elastic member 461c disposed on one end of the fixing member 461b to provide an elastic force. A plurality of recess portion 461a, a plurality of fixing member 461b, and a plurality of elastic member 461c, corresponding to the number of guide portions 493a of the gear plate 493, may be formed.

According to an embodiment, the recess portion 461a may have a recess shape recessed into the mounting plate 461. At least a portion of the recess portion 461a may be provided in a shape corresponding to the guide portion 493a, guiding the guide portion 493a to slide while being coupled to the recess portion 461a. The recess portion 461a is formed such that one end of the mounting plate 461 is opened, and the guide portion 493a may be inserted in the opened direction and then fastened. In the recess portion 461a, an area adjacent to the opening may be sized to seat the fixing member 461b and the elastic member 461c.

According to an embodiment, the fixing member 461b may be disposed at one end of the mounting plate 461 (e.g., near the opening of the recess portion 461a) and may be positioned in a state coupled to the elastic member 461c. The fixing member 461b may be provided as a component including an elastic material (e.g., rubber) and, when the guide portion 493a of the gear plate 493 is inserted into or separated from the mounting plate 461, fix it so that more than a certain designated force is required. For example, the first portion 4611 of the fixing member 461b may be positioned to block or open the passage of the recessed portion 461a for the guide portion 493a to pass therethrough. The second portion 4612 extending from the first portion 4611 may be coupled with the elastic member 461c. The elastic member 461c may be disposed to provide an elastic force perpendicular to the direction in which the recess portion 461a faces and be designed to require a designated force for blocking or opening the passage as it provides an elastic force to the first portion 4611.

According to an embodiment, in the fixing member 461b, an area (e.g., an edge area of the first portion 4611) in contact with the guide portion 493a may be formed to have a designated curvature value R. Accordingly, when the guide portion 493a is inserted into or separated from the recess portion 461a, it is possible to advantageously provide movement of the fixing member 461b positioned in the passage. For example, if the guide portion 493a provides a force in the P1 direction to one area having the curvature value R, the first portion 4611 may convert the force in the P1 direction to move in the P2 direction, thus opening the passage for the guide portion 493a to move. As another example, one area having the curvature value R may be formed in each of the two opposite edge areas of the first portion 4611 and may contact when the guide portion 493a is inserted into or separated from the recess portion 461a.

According to an embodiment, an operation for coupling or releasing the device portion 401 to/from the mounting portion 402 is described. To couple the device portion 401 to the mounting portion 402, the guide portion 493a of the gear plate 493 may be inserted into the area (e.g., the end of the recess portion 461a) where the opening of the mounting plate 461 is disposed. The end of the guide portion 493a may contact the portion having the curvature value R of the fixing member 461b and, if a predetermined level of force or more is applied, the elastic member 461c may be compressed, so that the recess portion 461a may be opened. The guide portion 493a of the gear plate 493 may slide along the opened recess portion 461a. If the slide of the guide portion 493a is completed, compression of the elastic member 461c may be released, and the fixing member 461b may block the movement passage of the guide portion 493a and fix the position of the gear plate 493. According to another embodiment, when the device portion 401 is separated from the mounting portion 402, the separation may proceed in the reverse order of the insertion for coupling.

Figure 14:
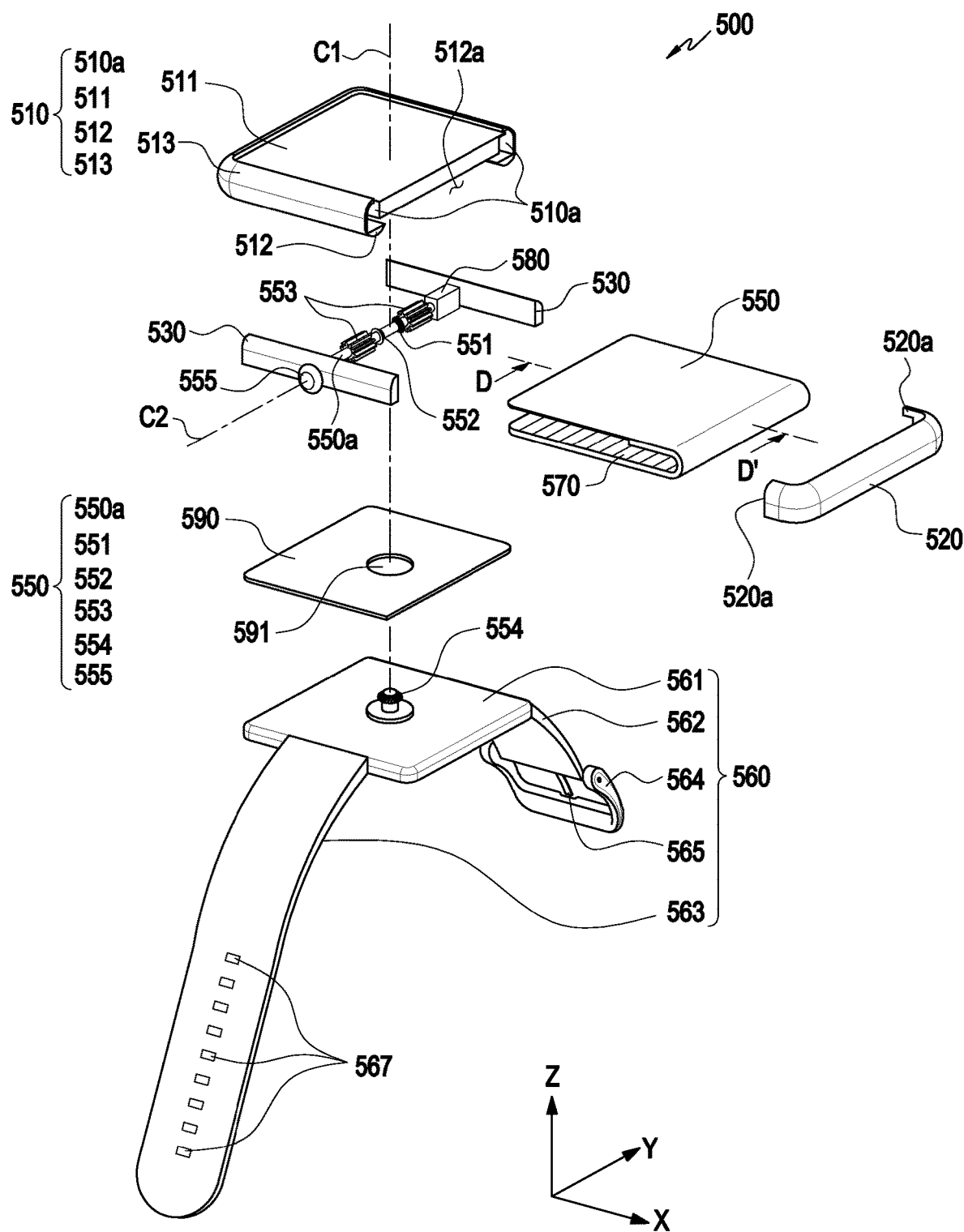
FIG. 14 is an exploded perspective view illustrating a configuration of an electronic device with a flexible display according to an embodiment of the disclosure.

FIG. 14 is an exploded perspective view illustrating a configuration of an electronic device 500 with a flexible display 540 according to an embodiment of the disclosure.

Figure 15:
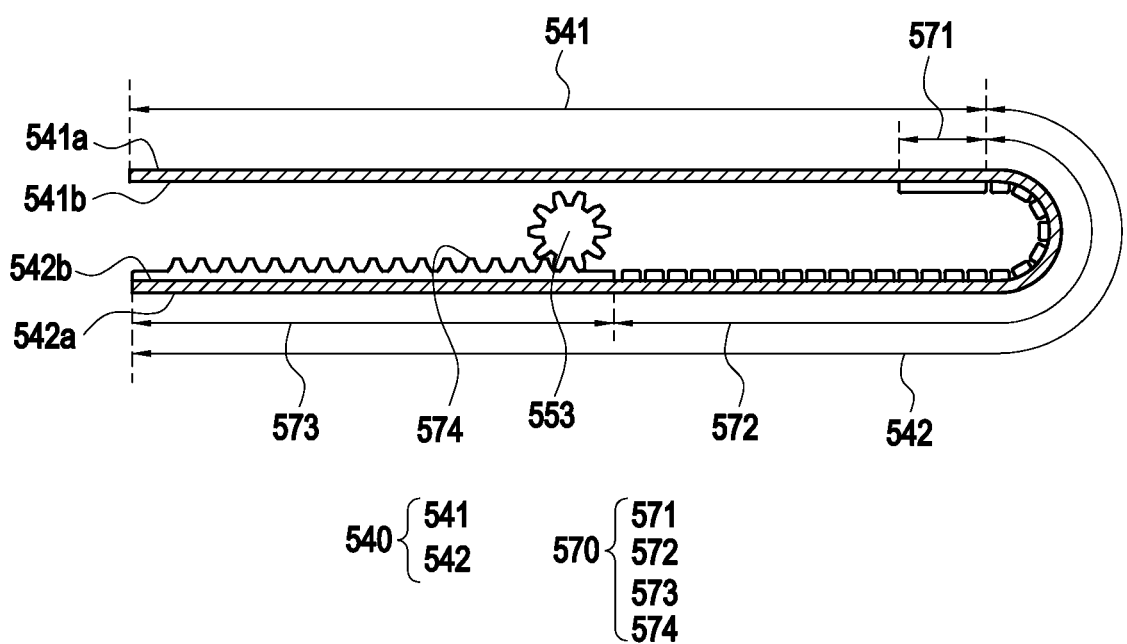
FIG. 15 is a cross-sectional view taken along D-D' of FIG. 14, illustrating a flexible display and a display supporting structure according to an embodiment of the disclosure.

FIG. 15 is a cross-sectional view taken along D-D' of FIG. 14, illustrating a flexible display 540 and a display supporting structure 570 according to an embodiment of the disclosure.

Referring to FIGS. 14 and 15, according to other various embodiments, an electronic device 500 may include first and second housings 510 and 520, a plurality of guide rails 530, a flexible display 540, a gear structure 550, a mounting member 560, and a plurality of stopper members 501. For example, the first housing 510 may include a first surface (e.g., front surface) 511, a second surface (e.g., rear surface) 512 facing in the opposite direction of the first surface 511, and a side surface 513 surrounding the space between the first and second surfaces 511 and 512.

According to an embodiment, the first surface 511 may face a first area 541 of the flexible display 540 to be described below, and a supporting member 590 supporting rotation ① of the first and second housings 510 and 520, as described below, may be disposed on the second surface 512. For example, an opening 512a may be formed in the second surface 512 to allow the supporting member 590 to be disposed thereon.

The second housing 520 may be slidably coupled to a side surface of the first housing 510 and may be detachably coupled to the side surface of the first housing 510 and may rotate ① together with the first housing 510. For example, the second housing 520 may rotate (①) together with the first housing 510 and slide away from or closer to the side surface of the first housing 510. For example, when the second housing 520 slides away from the side surface of the first housing 510, the second housing 520 may be separated from the side surface of the first housing 510 while extending the flexible display 540. Further, when the second housing 520 slides closer to the side surface of the first housing 510, the second housing 520 may be coupled to the side surface of the first housing 510 while shrinking the flexible display 540.

The plurality of guide rails 530 may be disposed in the first housing 510, guiding the slide of the second housing 520. For example, first ends of the plurality of guide rails 530 may be slidably fitted to the plurality of sliding recesses 510a formed on two opposite sides of the first housing 510. Second ends of the plurality of guide rails 530 may be fitted to a plurality of coupling recesses 520a formed on two opposite sides of the second housing 520. Accordingly, the plurality of guide rails 530 may be drawn in or out from the plurality of sliding recesses 510a to be able to slide the second housing 520.

Referring to FIG. 15, the flexible display 540 may include a first area 541 mounted on a first surface 511 of the first housing 510 and a second area 542 extending from the first area 541. For example, the first area 541 may include a first front surface 541a exposed to the outside and a first rear surface 541b which is opposite to the first front surface 541a. The second area 542 may include a second front surface 542a having at least a portion exposed to the outside and a second rear surface 542b which is opposite to the second front surface 542a.

According to various embodiments, the electronic device 500 may include a display supporting structure 570 facing the first rear surface 541b of the first area 541 and the second rear surface 542b of the second area 542. For example, the display supporting structure 570 may support rolling of the flexible display 540 to allow at least a portion of the second area 542 to be exposed to the outside while supporting the slide of the second housing 520 according to rotation of the gear structure 550 described below.

According to an embodiment, the display supporting structure 570 may include first, second, and third hinge areas 571, 572, and 573, and the first hinge area 571 may face and be fixed to at least a portion of the first rear surface 541b of the first area 541. The second hinge area 572 may extend from the first hinge area 571 and, as the second housing 520 slides, the second area 542 may be curved to be drawn in or out from the second housing 520. The third hinge area 573 may extend from the second hinge area 572 and include a hinge gear 574 engaged with a plurality of third gear portions 553 included in the gear structure 550. For example, when the plurality of third gear portions 553 are rotated, the plurality of third gear portions 553 may slide the hinge gear 574 according to the rotations and, in this case, the third hinge area 573 along with the hinge gear 574 may slide. For example, if the third hinge area 573 slides, the second hinge area 572 may be curved while sliding the second housing 520 in the sliding direction ②. In this case, the second hinge area 572 may draw out at least a portion of the second area 542 from the second housing 520. Simultaneously, at least a portion of the second area 542 may be exposed to the outside. For example, the second area 542 may be extended from the first area 541, and the first area 541 and at least a portion of the second area 542 may be exposed to the outside.

According to various embodiments, the fourth gear portion 554 fitted into the through hole 591 formed in the center of the supporting member 590 may be disposed in the center portion of the mounting member 560 including a mounting plate 561, and the first and second binding members 562 and 563 may be disposed around the outer circumference of the mounting member 560. For example, the first binding member 562 may include a band guide member 564 including a fixing member 565 fitted into a plurality of coupling holes 565 included in the second binding member 463 described below. For example, the first and second binding members 562 and 563 may be disposed to extend and protrude away from each other from the outer circumference of the mounting member 560. In this state, the mounting member 560 may be placed on the user's wrist, and the second binding member 563 may be inserted into the band guide member 564 of the first binding member 562. In this case, since the band guide member 564 includes the fixing member 565, the fixing member 565 may be inserted into the plurality of coupling recesses 567 of the second binding member 563, binding and fixing the first and second binding members 562 and 563.

According to various embodiments, at least one of the components of the electronic device 500 may be the same or similar to at least one of the components of the electronic device 400 of FIGS. 5 to 7 and no duplicate description is made below.

Figure 16A:
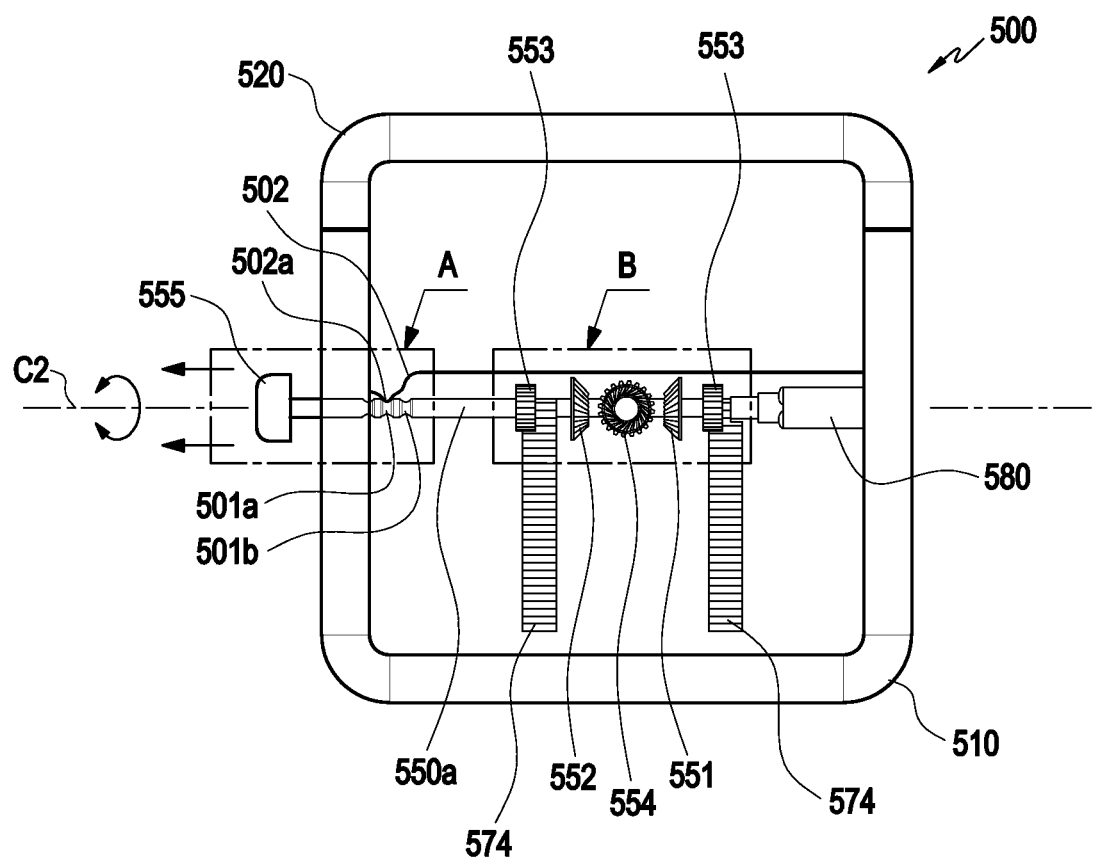
FIG. 16A is a plan view illustrating an assembled state of an electronic device with a flexible display according to an embodiment of the disclosure.
Figure 16B:
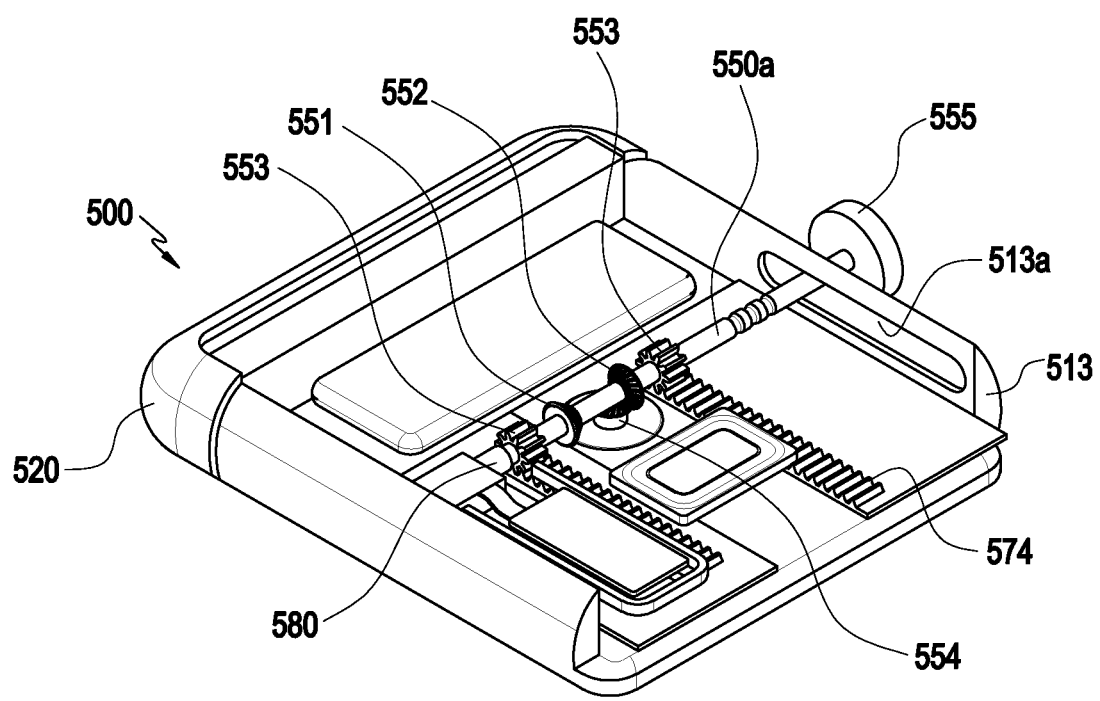
FIG. 16B is a perspective view illustrating an assembled state of an electronic device with a flexible display according to an embodiment of the disclosure.

FIG. 16A is a plan view illustrating an assembled state of an electronic device 500 with a flexible display 540 according to an embodiment of the disclosure. FIG. 16B is a perspective view illustrating an assembled state of an electronic device 500 with a flexible display 540 according to an embodiment of the disclosure.

Figure 17:
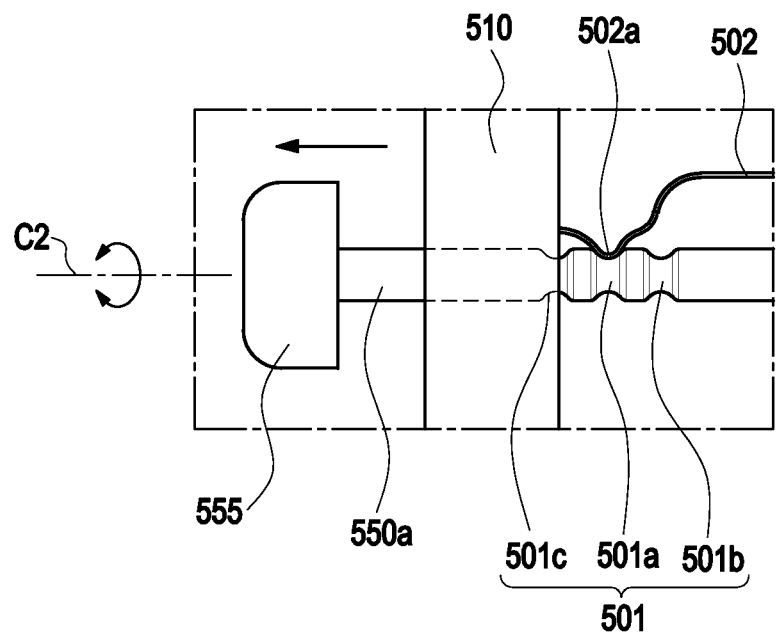
FIG. 17 is an enlarged plan view of portion A of FIG. 16A, illustrating an operational state of a rotation knob and a plurality of stopper members according to an embodiment of the disclosure.

FIG. 17 is an enlarged plan view of portion A of FIG. 16A, illustrating an operational state of a rotation knob 555 and a plurality of stopper members 501 according to an embodiment of the disclosure.

Figure 18:
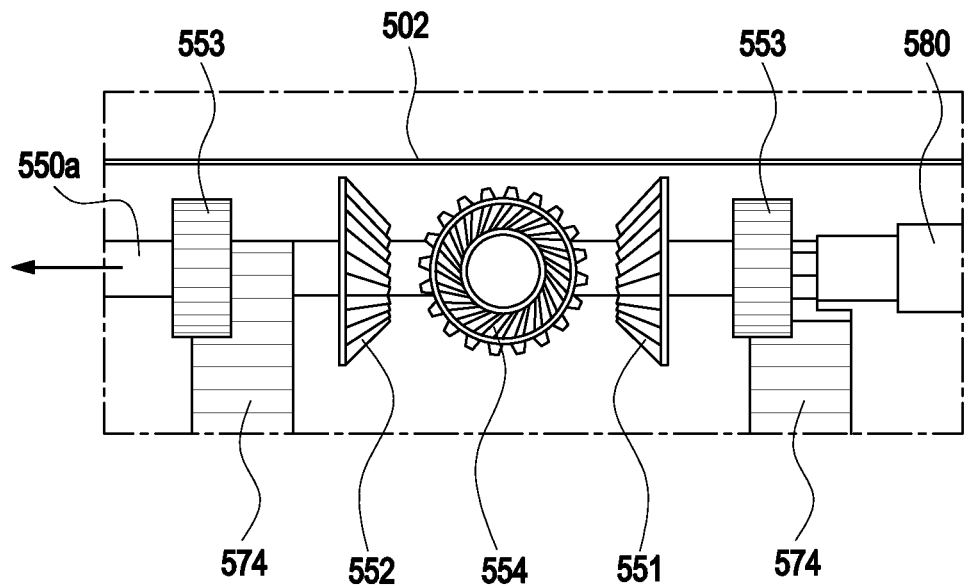
FIG. 18 is an enlarged plan view of portion B of FIG. 16A, illustrating an operational state of a gear structure according to an embodiment of the disclosure.

FIG. 18 is an enlarged plan view of portion B of FIG. 16A, illustrating an operational state of a gear structure 550 according to an embodiment of the disclosure.

Figure 19:
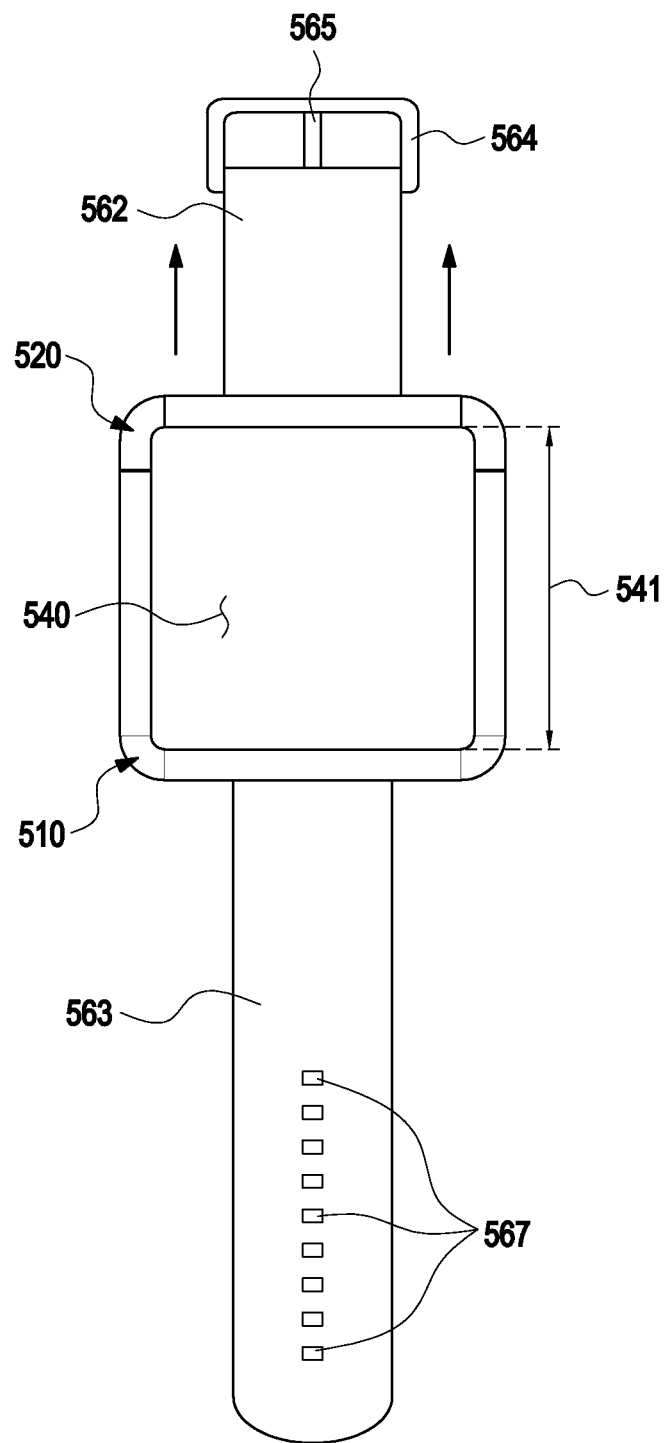
FIG. 19 is a plan view illustrating a pre-extension state of a flexible display among components of an electronic device with a flexible display according to an embodiment of the disclosure.

FIG. 19 is a plan view illustrating a pre-extension state of a flexible display 540 among components of an electronic device 500 with a flexible display 540 according to an embodiment of the disclosure.

Figure 20:
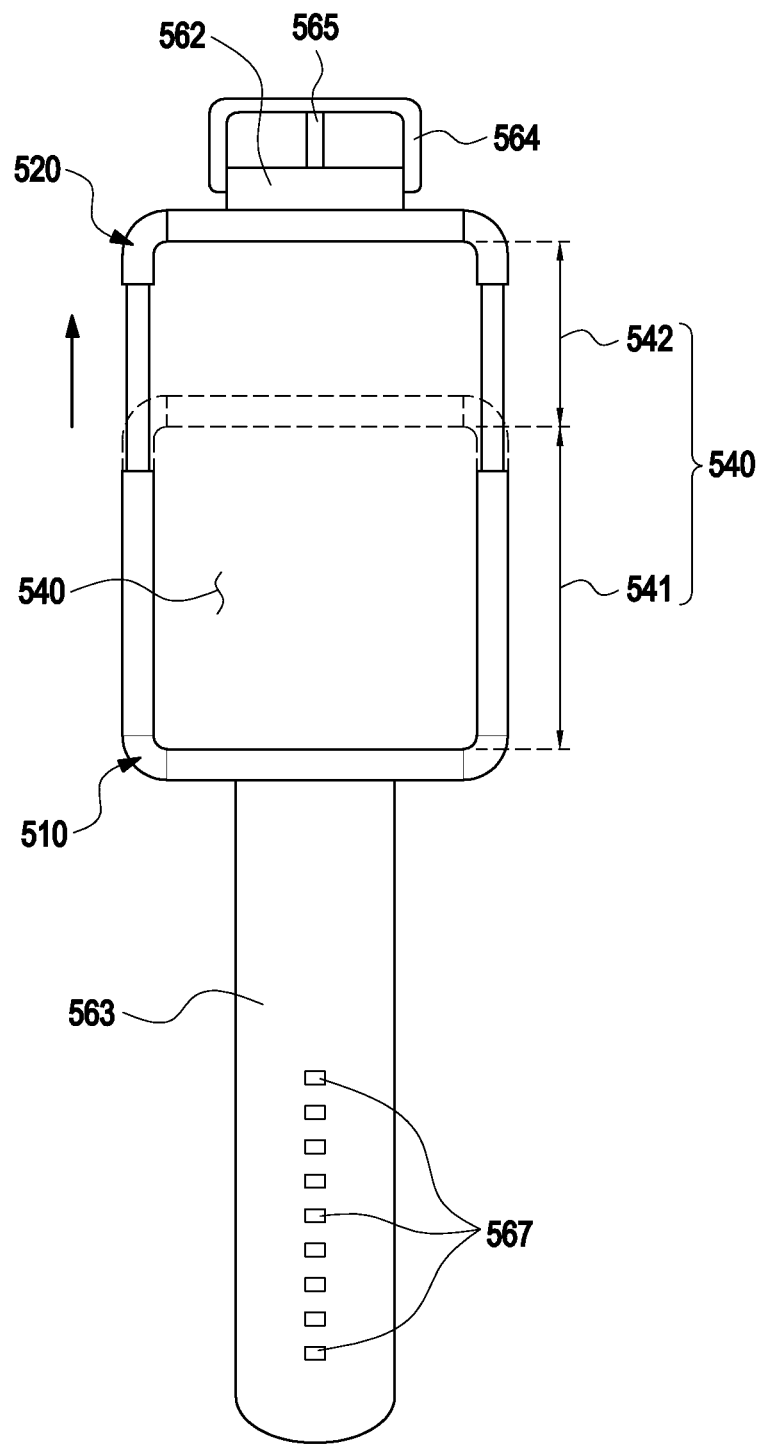
FIG. 20 is a plan view illustrating a post-extension state of a flexible display among components of an electronic device with a flexible display according to an embodiment of the disclosure.

FIG. 20 is a plan view illustrating a post-extension state of a flexible display 540 among components of an electronic device 500 with a flexible display 540 according to an embodiment of the disclosure.

Referring to FIGS. 16A, 16B, and 17 to 20, according to various embodiments, the gear structure 550 may include a rotation shaft 550a, a rotation knob 555, first and second gear portions 551 and 552, a plurality of third gear portions 553, and a fourth gear portion 554. For example, one end of the rotation shaft 550a may be connected with the driving motor 580, and the rotation shaft 550a may be rotated according to the rotation of the driving motor 580. The other end of the rotation shaft 550a may be connected with the rotation knob 555 that slides or rotates the rotation shaft 550a by an external force (e.g., the user's hand) According to an embodiment, one area of the side surface 513 of the first housing 410 may form a guide hole 513a through which at least a portion of the rotation shaft 550a passes. The rotation shaft 550a may be connected through the guide hole 513a to the rotation knob 555 positioned outside the electronic device 500. The guide hole 513a may be formed in a size extended up to the area where the rotation shaft 550a may be rotated and/or slid.

The first and second gear portions 551 and 552 may be spaced apart on the rotation shaft 550a, include the first rotational axis C1 and, when the rotation shaft 550a is slid or rotated, be slid or rotated along with the rotation shaft 550a. For example, the first and second gear portions 551 and 552 may be engaged or disengaged with/from the fourth gear portion 554 as the rotation shaft 550a slides. The plurality of third gear portions 553 may be disposed on the rotation shaft 550a, include the second rotational axis C2 and, when the rotation shaft 550a is slid or rotated, be slid or rotated along with the rotation shaft 550a. For example, the plurality of third gear portions 553 may be engaged or disengaged to/from the hinge gear 574 of the display supporting structure 570 as the rotation shaft 550a slides.

When connected to the rotation shaft 550a, the rotation knob 555 may simultaneously be rotated along with the rotation shaft 550a by external force and be exposed to the outside.

According to various embodiments, the plurality of stopper members 501 may include first, second, and third stopper members 501a, 501b, and 501c. For example, the first, second, and third stopper members 501 may be formed on the rotation shaft 550a and, when pulling the rotation knob 555 outward of the housings 510 and 520 by external force and sliding them, be slid along with the rotation shaft 550a while simultaneously being coupled or separated to/from the stopper protrusion 502 disposed in the first housing 510 by elastic force.

Referring to FIGS. 16A, 16B, 17, and 18, when the user holds the rotation knob 555 exposed to the outside of the housings 510 and 520 with his/her hand and pulls it outward of the housings 510 and 520, the rotation knob 555 may be slid to the second rotational axis C2 while simultaneously sliding the rotation shaft 550a. In this case, the first stopper member 501a formed in the rotation shaft 550a may also be slid. Simultaneously, the first stopper member 501a may be coupled to the protrusion 502a formed in the stopper protrusion 502 of the first housing 510. In this case, when the first stopper member 501a is coupled with the protrusion 502a of the stopper protrusion 502, the slide of the rotation shaft 550a may be restricted. In this case, the plurality of third gear portions 553 disposed on the rotation shaft 550a may be engaged with the hinge gear 574 of the display supporting structure 570, and the first and second gear portions 551 and 552 may be disengaged from the fourth gear portion 554.

In this state, when the rotation knob 555 is rotated about the second rotational axis C2 in the first direction (e.g., forward direction), the rotation shaft 550a is rotated while simultaneously rotating the plurality of third gear portions 553 and, according to the rotation, the plurality of third gear portions 553 may slide the hinge gear 574 of the display supporting structure 570. Accordingly, the plurality of third gear portions 553 may roll and curve the display supporting structure 570 according to the rotation, drawing out at least a portion of the second area 542 from the second housing 520 in the direction perpendicular to the second rotational axis C2.

The plurality of third gear portions 553 and at least one of the components of the display supporting structure 570 may be identical or similar to the plurality of second gear portions 452 and at least one of the components of the display supporting structure 470 of FIGS. 13A to 13D, and no duplicate description thereof is thus given below.

According to various embodiments, the first area 541 of the flexible display 540 and at least a portion of the second area 542 of the flexible display 540 may be exposed to the outside. In this case, the user may receive information about various applications through the extended flexible display 540.

Referring to FIGS. 19 and 20, as the first area 541 and at least a portion of the second area 542 of the flexible display 540 are exposed to the outside, the flexible display 540 may secure an enlarged large-screen display area so that users may receive various pieces of visual information through the large-screen display area. Accordingly, the extended flexible display 540 may easily provide various pieces of application information to the user.

According to an embodiment, when the user does not use at least a portion of the second area 542, the user's hand holds the rotation knob 555 and rotate it about the second rotational axis C2 in the second direction (e.g., reverse direction) opposite to the first direction (e.g., forward direction). In this case, the rotation shaft 550a may also rotate the plurality of third gear portions 553 while simultaneously rotating in the second direction (e.g., reverse direction) and, according to the rotation, the plurality of third gear portions 553 may slide the hinge gear 574 of the display supporting structure 570 in the opposite direction, back to the original position. For example, the plurality of third gear portions 553 may roll, in the reverse direction, and curve the display supporting structure 570 according to the rotation, drawing in at least a portion of the second area 542 from the second housing 520 in the direction perpendicular to the second rotational axis C2.

According to various embodiments, when the user automatically draws in or out at least a portion of the second area 542 from the second housing 520, the processor 120 may drive the driving motor 580 in the first direction (e.g., forward direction). The driving motor 580 may be driven by the processor (e.g., the processor 120 of FIG. 1) in the first direction (e.g., forward direction) while simultaneously rotating the rotation shaft 550a about the second rotational axis C2. The rotation shaft 550a may rotate the plurality of third gear portions 553 according to the rotation. In this case, the plurality of third gear portions 553 may slide the hinge gear 574 of the display supporting structure 570, and the display supporting structure 470 may be curved and rolled to slide the second housing 520 in the sliding direction ②. In this case, the display supporting structure 570 may automatically draw out at least a portion of the second area 542 of the flexible display 540 from the second housing 520.

According to various embodiments, when the driving motor 580 is driven by the processor 120 in a second direction (e.g., reverse direction) opposite to the first direction (e.g., forward direction), the driving motor 580 may rotate the rotation shaft 550a about the second rotational axis C2 in the second direction (e.g., reverse direction). In this case, the rotation shaft 550a may also rotate the plurality of third gear portions 553 while simultaneously rotating in the second direction and, according to the rotation, the plurality of third gear portions 553 may slide the hinge gear 574 of the display supporting structure 570 in the opposite direction, back to the original position. For example, the plurality of third gear portions 553 may roll, in the reverse direction, and curve the display supporting structure 570 according to the rotation, automatically drawing in at least a portion of the second area from the second housing 520 in the direction perpendicular to the second rotational axis C2.

As such, the user may hold and rotate the rotation knob 555 with his/her hand to manually draw in or out at least a portion of the second area 542 from the second housing 520 and may further drive the driving motor 580 to automatically draw in or out at least a portion of the second area from the second housing 520. Accordingly, the user may automatically or manually extend or shrink the flexible display 540 according to selection, so that the user's convenience may further be enhanced.

Figure 21:
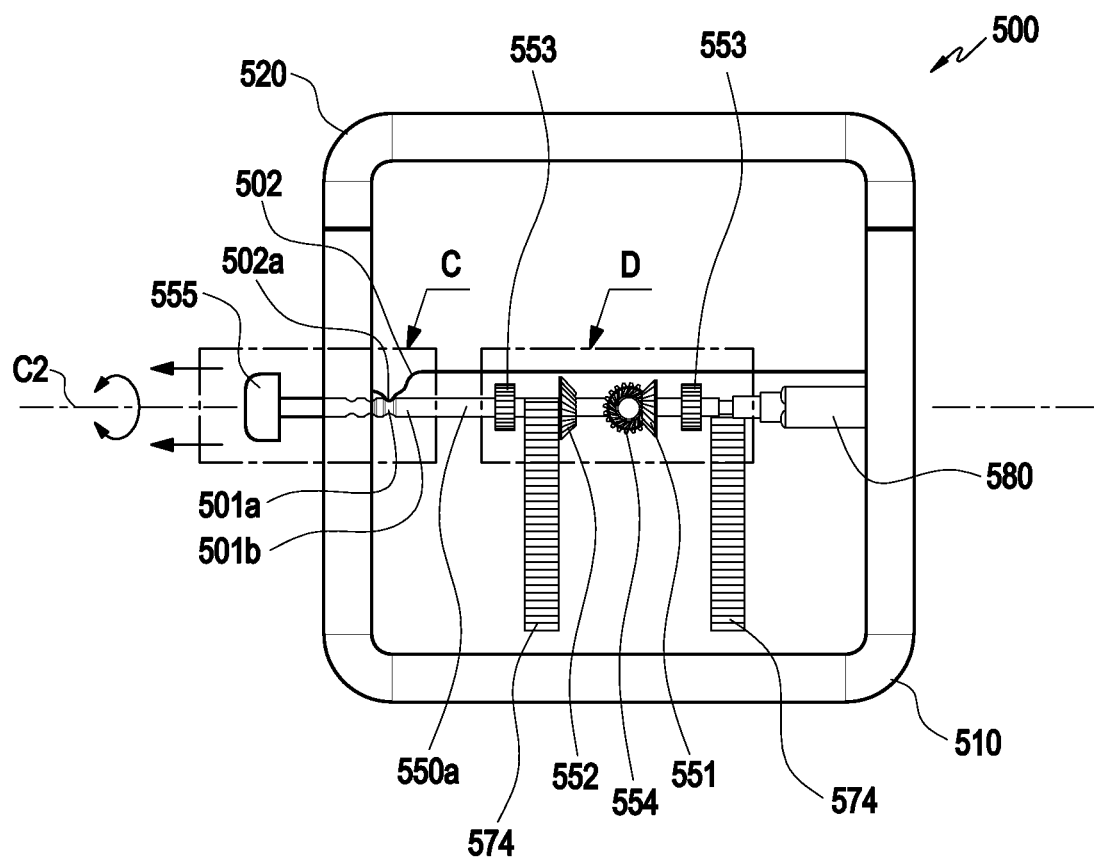
FIG. 21 is a plan view illustrating an assembled state of an electronic device with a flexible display according to an embodiment of the disclosure.

FIG. 21 is a plan view illustrating an assembled state of an electronic device 500 with a flexible display 540 according to an embodiment of the disclosure.

Figure 22:
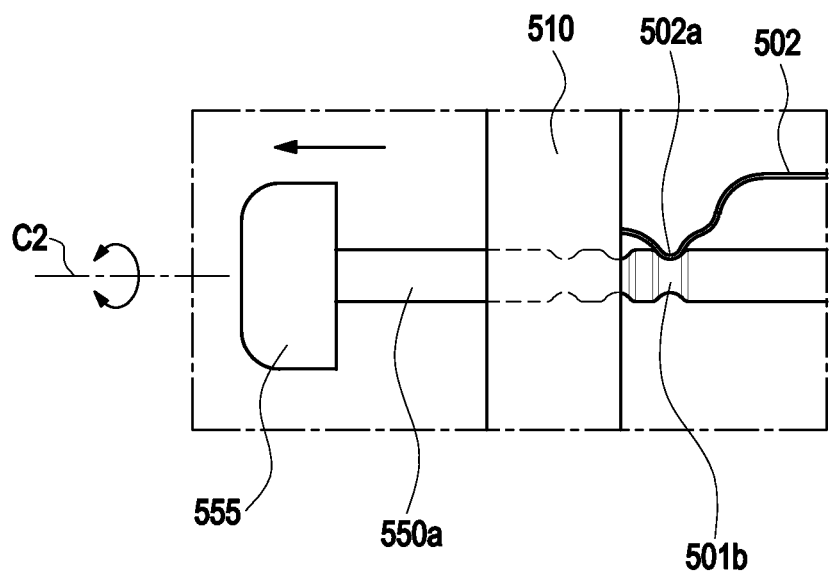
FIG. 22 is an enlarged plan view of portion C of FIG. 21, illustrating an operational state of a rotation knob and a plurality of stopper members according to an embodiment of the disclosure.

FIG. 22 is an enlarged plan view of portion C of FIG. 21, illustrating an operational state of a rotation knob 555 and a plurality of stopper members 501 according to an embodiment of the disclosure.

Figure 23:
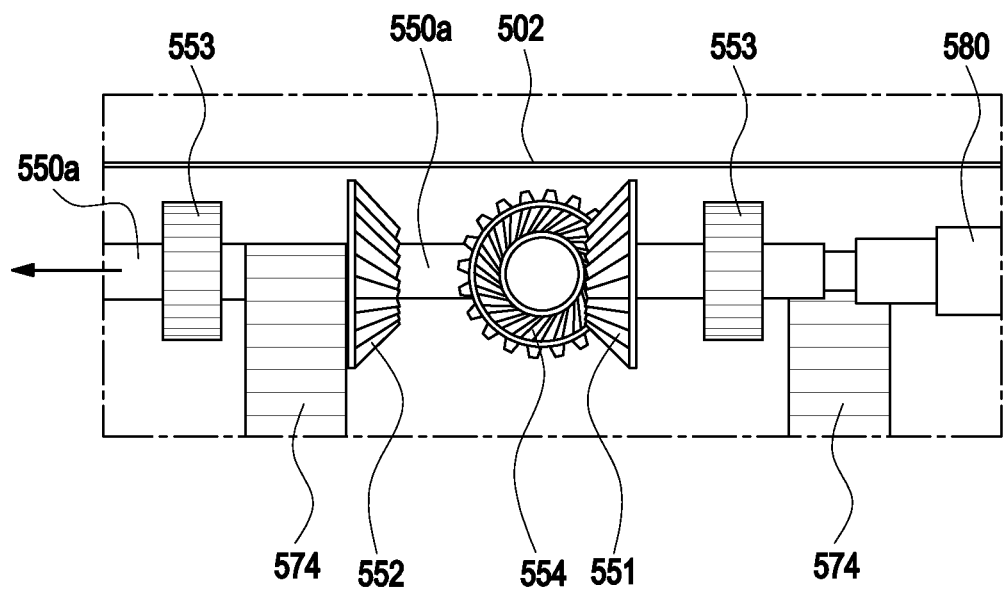
FIG. 23 is an enlarged plan view of portion D of FIG. 21, illustrating an operational state of a gear structure according to an embodiment of the disclosure.

FIG. 23 is an enlarged plan view of portion D of FIG. 21, illustrating an operational state of a gear structure 550 according to an embodiment of the disclosure.

Figure 24:
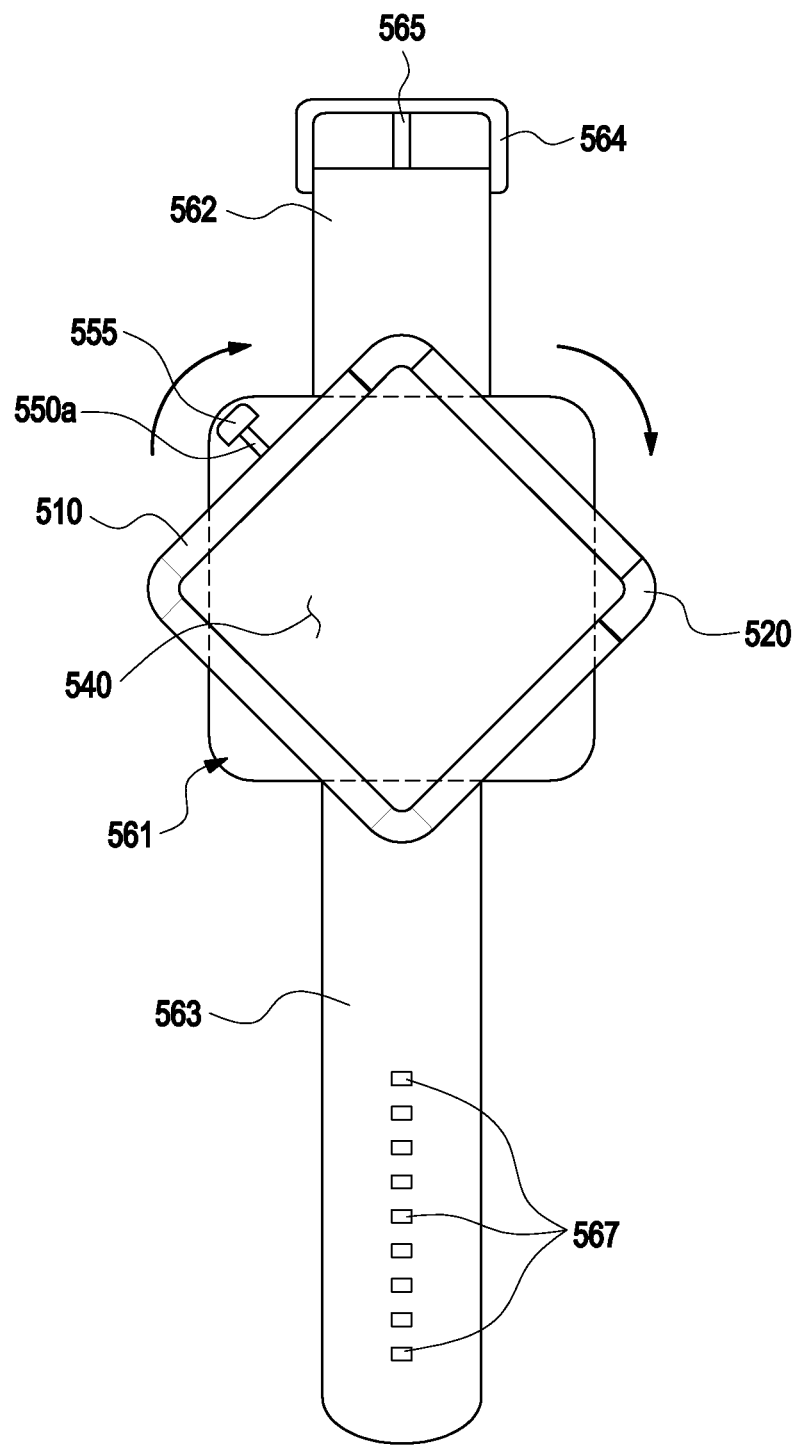
FIG. 24 is a plan view illustrating a pre-rotation state of a flexible display among components of an electronic device with a flexible display according to an embodiment of the disclosure.

FIG. 24 is a plan view illustrating a pre-rotation state of a flexible display 540 among components of an electronic device 500 with a flexible display 540 according to an embodiment of the disclosure.

Figure 25:
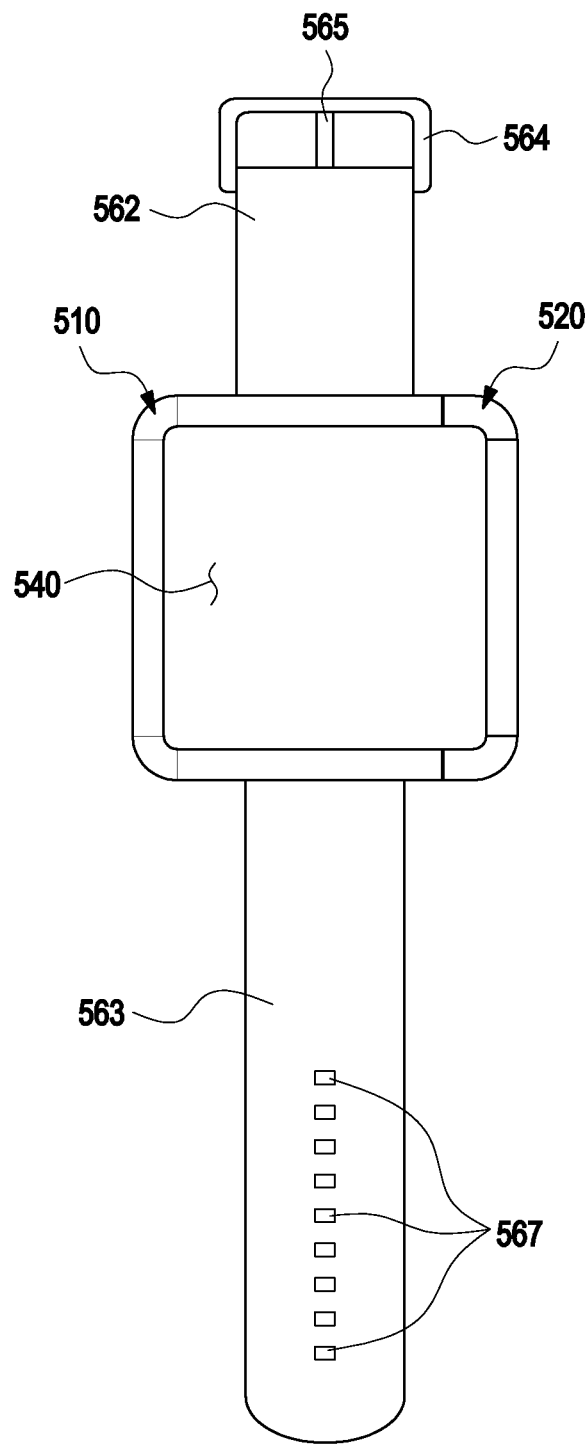
FIG. 25 is a plan view illustrating a post-rotation state of a flexible display among components of an electronic device with a flexible display according to an embodiment of the disclosure.

FIG. 25 is a plan view illustrating a post-rotation state of a flexible display 540 among components of an electronic device 500 with a flexible display 540 according to an embodiment of the disclosure.

Referring to FIGS. 21 to 25, when the user holds the rotation knob 555 exposed to the outside of the first housing 510 with his/her hand and pulls it outward of the first housing 510, the rotation knob 555 may be slid to the second rotational axis C2 while simultaneously sliding the rotation shaft 550a.

Referring to FIG. 16A, the rotation knob 555 is in a state of having protruded outward of the first housing 510 in a predetermined length and, in this state, if the user pulls the rotation knob 555 outward of the first housing 510 with his/her hand, the rotation knob 555 may extend to the second rotational axis C2 and slide. In this case, the rotation shaft 550a may also extend and slide, and the second stopper member 501b formed on the rotation shaft 550a may also slide and, simultaneously, the protrusion 502a of the stopper protrusion 502 may be separated from the first stopper member 501a while simultaneously coupled to the second stopper member 501b. In this case, when the second stopper member 501b is coupled with the protrusion 502a of the stopper protrusion 502, the slide of the rotation shaft 550a may be restricted. In this case, the plurality of third gear portions 553 may also be restricted from sliding while simultaneously separated from the hinge gear 574 of the display supporting structure 570. Simultaneously, the first gear portion 451 may slide and engage with the fourth gear portion 554.

In this state, when the rotation knob 555 is rotated about the second rotational axis C2 in the first direction (e.g., forward direction), the rotation shaft 550a is rotated while simultaneously rotating the first gear portion 551. According to the rotation, the first gear portion 551 may rotate the first and second housings 510 and 520 and the first area 541 of the flexible display 540 about the first rotational axis C1.

In this case, the first area 541 of the flexible display 540 may rotate while being exposed to the outside. The second area 542 of the flexible display 540 is not exposed to the outside.

Referring to FIGS. 24 and 25, as the first area 541 of the flexible display 540 is exposed to the outside, the first area 541 of the flexible display 540 may provide information about various applications to the user.

According to an embodiment, the user's hand holds the rotation knob 555 and rotate it about the second rotational axis C2 in the second direction (e.g., reverse direction) opposite to the first direction (e.g., forward direction). In this case, the rotation shaft 550a may also rotate in the second direction while simultaneously rotating the first gear portion 551 and, according to the rotation, the first gear portion 551 may also rotate the first and second housings 510 and 520 and the first area 541 of the flexible display 540 back to the original position.

According to various embodiments, when the user automatically rotates the first and second housings 510 and 520 and the first area 541, the processor 120 may drive the driving motor 580 in the first direction (e.g., forward direction). The driving motor 580 may be driven by the processor 120 in the first direction (e.g., forward direction) while simultaneously rotating the rotation shaft 550a about the second rotational axis C2. The rotation shaft 550a may rotate the first gear portion 551 according to the rotation. In this case, the first gear portion 551 may automatically rotate the first and second housings 510 and 520 and the first area 541 about the first rotational axis C1. Further, when the driving motor 580 is driven by the processor 120 in a second direction (e.g., reverse direction) opposite to the first direction (e.g., forward direction), the driving motor 580 may rotate the rotation shaft 550a about the second rotational axis C2 in the second direction. In this case, the rotation shaft 550a may rotate the first gear portion 551 while simultaneously rotating in the second direction and, according to the rotation, the first gear portion 551 may rotate the first and second housings 510 and 520 and the first area 541 about the first rotational axis C1 in the second direction, back to the original position.

As such, the user may hold and rotate the rotation knob 555 with his/her hand to manually rotate the first and second housings 510 and 520 and the first area 541 about the first rotational axis C1 and may drive the driving motor 580 to automatically rotate the first and second housings 510 and 520 and the first area 541 about the first rotational axis C1. Accordingly, the user may automatically or manually rotate the flexible display 540 according to selection, so that the user's convenience may further be enhanced.

Figure 26:
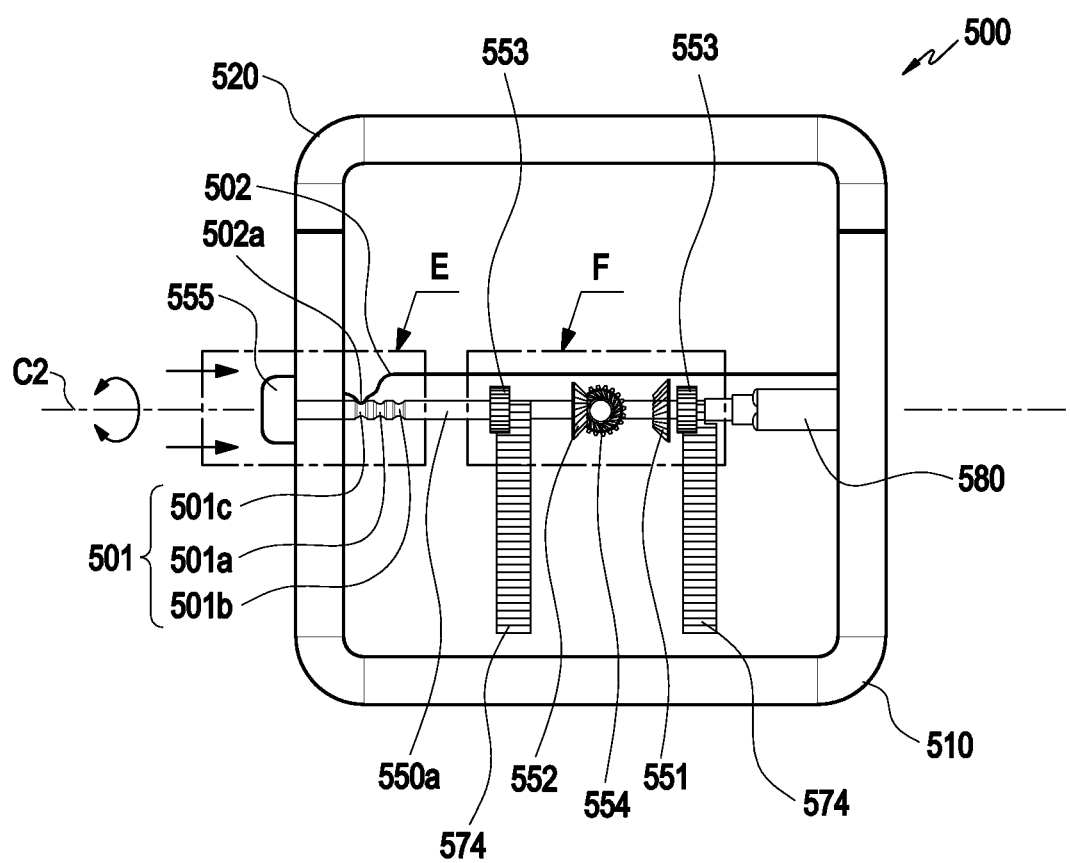
FIG. 26 is a plan view illustrating an assembled state of an electronic device with a flexible display according to an embodiment of the disclosure.

FIG. 26 is a plan view illustrating an assembled state of an electronic device 500 with a flexible display 540 according to an embodiment of the disclosure.

Figure 27:
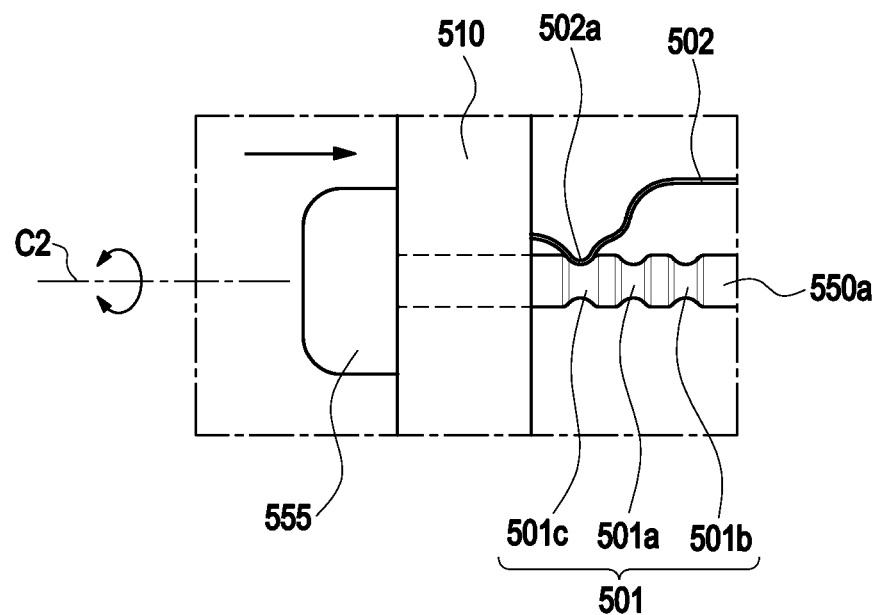
FIG. 27 is an enlarged plan view of portion E of FIG. 26, illustrating an operational state of a rotation knob and a plurality of stopper members according to an embodiment of the disclosure.

FIG. 27 is an enlarged plan view of portion E of FIG. 26, illustrating an operational state of a rotation knob 555 and a plurality of stopper members 501 according to an embodiment of the disclosure.

Figure 28:
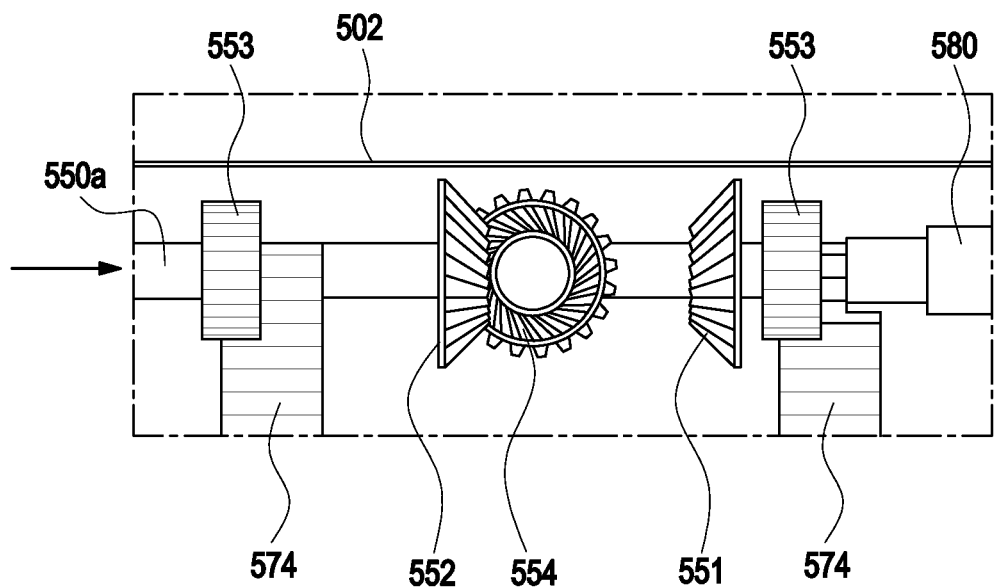
FIG. 28 is an enlarged plan view of portion F of FIG. 26, illustrating an operational state of a gear structure according to an embodiment of the disclosure.

FIG. 28 is an enlarged plan view of portion F of FIG. 26, illustrating an operational state of a gear structure 550 according to an embodiment of the disclosure.

Figure 29:
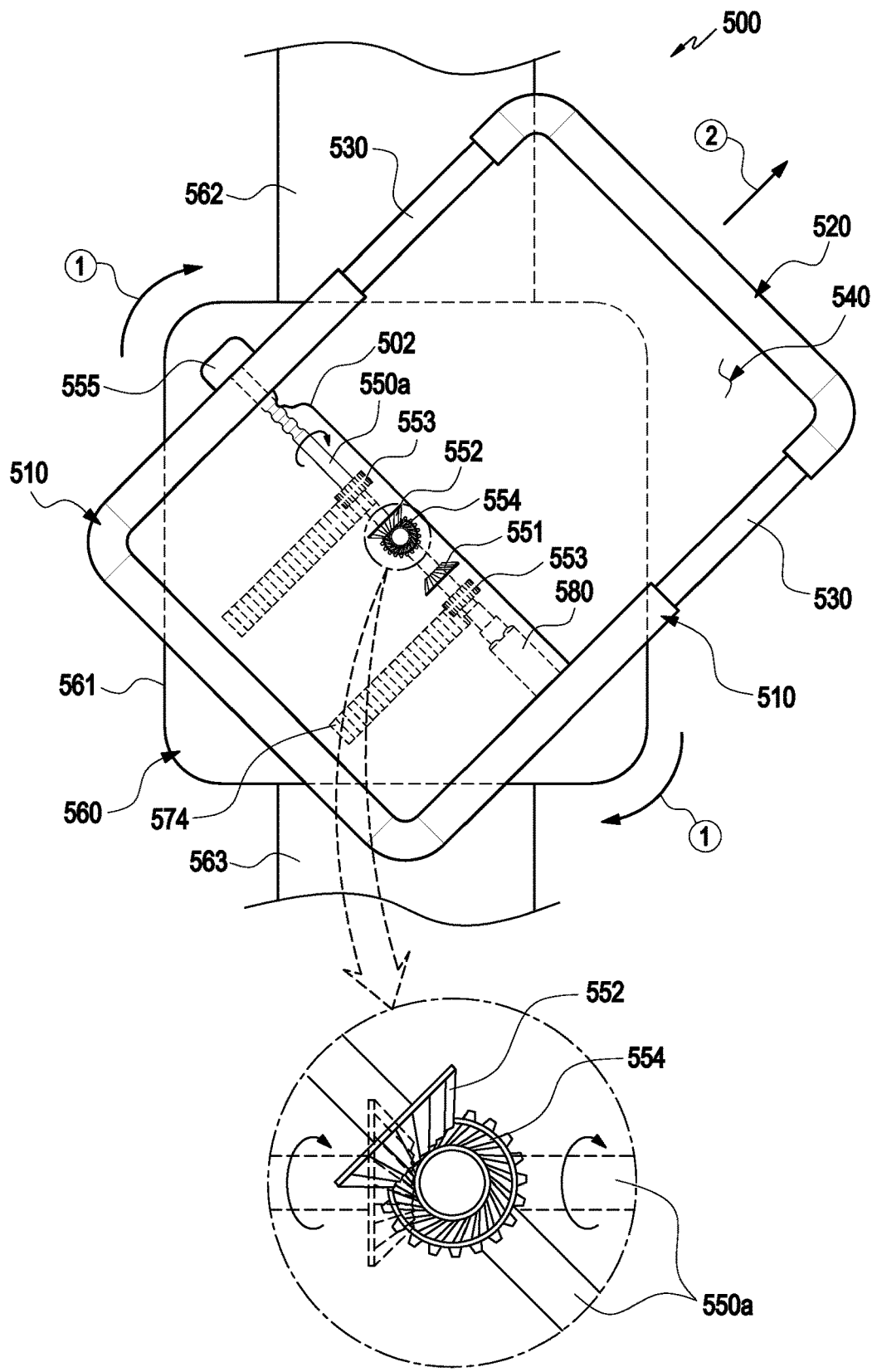
FIG. 29 is a plan view illustrating a rotation and extension process of a flexible display among components of an electronic device with a flexible display according to an embodiment of the disclosure.

FIG. 29 is a plan view illustrating a pre-rotation and extension state of a flexible display 540 among components of an electronic device 500 with a flexible display 540 according to an embodiment of the disclosure.

Figure 30:
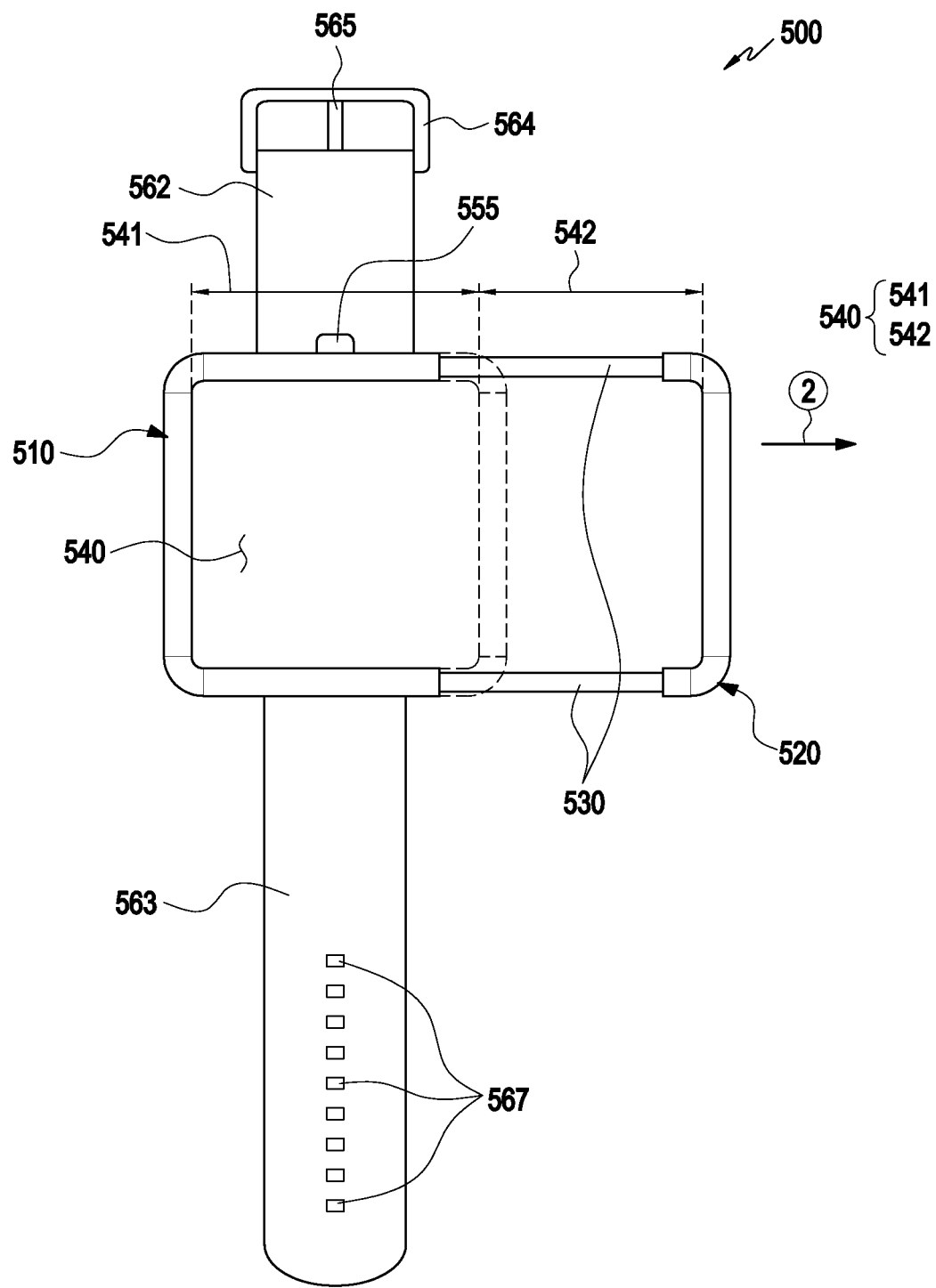
FIG. 30 is a plan view illustrating a post-rotation and extension state of a flexible display among components of an electronic device with a flexible display according to an embodiment of the disclosure.

FIG. 30 is a plan view illustrating a rotation and extension process of a flexible display 540 among components of an electronic device 500 with a flexible display 540 according to an embodiment of the disclosure.

Figure 31:
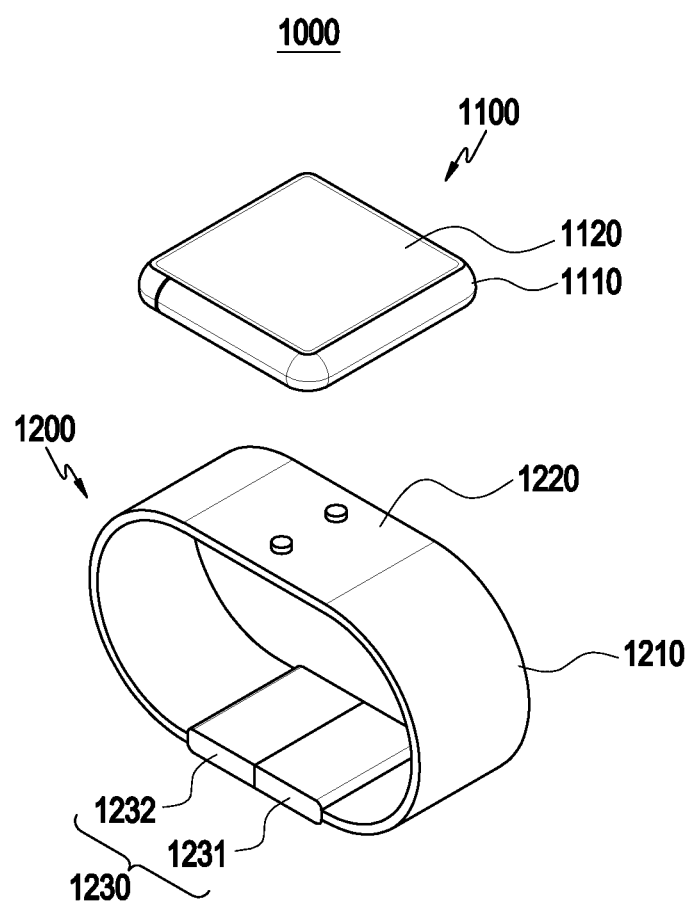
FIG. 31 is a view illustrating a configuration of an electronic device according to an embodiment of the disclosure.

FIG. 31 is a plan view illustrating a post-rotation and extension state of a flexible display 540 among components of an electronic device 500 with a flexible display 540 according to an embodiment of the disclosure.

Referring to FIG. 26, when the user holds the rotation knob 555 exposed to the outside of the housings 510 and 520 with his/her hand and pushes it inward of the housings 510 and 520, the rotation knob 555 may be slid to the second rotational axis C2 while simultaneously sliding the rotation shaft 550a. For example, as shown in FIG. 21, the rotation knob 555 is in a state of having protruded outward of the first housing 510 in a predetermined length and, in this state, if the user pushes the rotation knob 555 inward of the first housing 510 with his/her hand, the rotation knob 555 may slide in the direction of the second rotational axis C2. In this case, the rotation shaft 550a may slide together, and the third stopper member 501c formed on the rotation shaft 550a may also slide. Simultaneously, the protrusion 502a of the stopper protrusion 502 may be separated from the second stopper member 501b while separated from the first stopper member 501a and be then coupled to the third stopper member 501c. In this case, when the third stopper member 501c is coupled with the protrusion 502a of the stopper protrusion 502, the slide of the rotation shaft 550a may be restricted. In this case, the plurality of third gear portions 553 may also be restricted from sliding while simultaneously engaged with the hinge gear 574 of the display supporting structure 570. Simultaneously, the second gear portion 552 may slide and engage with the fourth gear portion 554.

Referring to FIG. 29, when the rotation knob 555 is rotated about the second rotational axis C2 in the first direction (e.g., forward direction), the rotation shaft 550a is rotated while simultaneously rotating the second gear portion 552. According to the rotation, the second gear portion 552 may rotate the first and second housings 510 and 520 and the first area of the flexible display 540 about the first rotational axis C1.

Simultaneously, the plurality of third gear portions 553 may also be rotated according to the rotation of the rotation shaft 550a. For example, the plurality of third gear portions 553 may slide the hinge gear 574 of the display supporting structure 570 according to the rotation. Accordingly, the plurality of third gear portions 553 may roll and curve the display supporting structure 570 according to the rotation, drawing out at least a portion of the second area 542 of the flexible display 540 from the second housing 520 in the direction perpendicular to the second rotational axis C2.

The plurality of third gear portions 553 and at least one of the components of the display supporting structure 570 may be identical or similar to the plurality of second gear portions 452 and at least one of the components of the display supporting structure 470 of FIGS. 13A to 13D, and no duplicate description thereof is thus given below.

In this case, the first area 541 of the flexible display 540 and at least a portion of the second area 542 of the flexible display 540 may be exposed to the outside. In this case, the user may receive information about various applications through the extended flexible display 540.

Referring to FIG. 30, as the first area 541 and at least a portion of the second area 542 of the flexible display 540 are exposed to the outside, the flexible display 540 may secure an enlarged large-screen display area so that users may receive various pieces of visual information through the large-screen display area. Accordingly, the extended flexible display 540 may easily provide various pieces of application information to the user.

According to various embodiments, when the user automatically rotates the first area 541 and at least a portion of the second area 542, the processor 120 may drive the driving motor 580 in the first direction (e.g., forward direction). The driving motor 580 may be driven by the processor 120 in the first direction while simultaneously rotating the rotation shaft 550a about the second rotational axis C2. The rotation shaft 550a may rotate the second gear portion 552 and the plurality of third gear portions 553 according to the rotation. In this case, according to the rotation, the second gear portion 552 may automatically rotate the first and second housings 510 and 520 and the first area 541 about the first rotational axis C1. At the same time, the rotation shaft 550a may also rotate the plurality of third gear portions 553 about the second rotational axis C2. For example, the plurality of third gear portions 553 may slide the hinge gear 574 of the display supporting structure 570. In this case, the display supporting structure 570 may be curved and rolled, sliding the second housing 520 in the sliding direction ②. For example, the display supporting structure 570 may be rolled to slide the second housing 520 while drawing out at least a portion of the second area 542 of the flexible display 540 from the second housing 520. For example, the first and second housings 510 and 520 and the flexible display 540 may be automatically rotated (①) by the driving motor 580 and, simultaneously, the flexible display 540 may be rolled to slide the second housing 520 in the sliding direction ②. In this case, at least a portion of the second area 542 of the flexible display 540 may also be exposed to the outside while being drawn out from the second housing 520. Accordingly, at least a portion of the second area 542 may be exposed to the outside. In this state, the user may be provided with various pieces of information about an application (e.g., a navigation application) selected through the first area 541 and at least a portion of the second area 542 of the flexible display 540.

According to various embodiments, when the user does not execute the application, the processor 120 may re-drive the driving motor 580. The driving motor 580 may be driven by the processor 120 in a second direction (e.g., reverse direction) opposite to the first direction (e.g., forward direction) while simultaneously rotating the rotation shaft 550a about the second rotational axis C2. The rotation shaft 550a may rotate the second gear portion 552 and the plurality of third gear portions 553. According to the rotation, the second gear portion 552 may rotate (①) the first and second housings 510 and 520 and the flexible display 540 about the first rotational axis C1. Simultaneously, the plurality of third gear portions 553 may also be rotated. According to the rotation, the plurality of third gear portions 553 may curve and roll the display supporting structure 570, sliding it in the direction opposite to the sliding direction ②. For example, the display supporting structure 570 may also slide at least a portion of the second area 542 of the flexible display 540. In this case, the display supporting structure 570 may slide at least a portion of the second area 542 in the direction opposite to the sliding direction ② while simultaneously sliding the second housing 520 in the direction opposite to the sliding direction ② back to the original position. Accordingly, the display supporting structure 570 may be curved and rolled, sliding the second housing 520 in the direction opposite to the sliding direction ② back to the original position while simultaneously drawing at least a portion of the second area 542 of the flexible display 540 in the second housing 520.

As such, the user may hold and rotate the rotation knob 555 with his/her hand to manually rotate the first area and at least a portion of the second area or manually slide at least a portion of the second area or may drive the driving motor 580 to automatically rotate the first area and at least a portion of the second area or automatically slide at least a portion of the second area.

Accordingly, the user may rotate, extend or shrink the flexible display 540 according to selection, so that the user's convenience may further be enhanced.

FIG. 31 is a view illustrating a configuration of an electronic device according to an embodiment of the disclosure.

Referring to FIG. 31, an electronic device 1000 (e.g., the electronic device 101 of FIG. 1) may include a main body 1100 and a mounting member 1200.

According to various embodiments, the main body 1100 may include a housing 1110 and a flexible display 1120 (e.g., the display module 160 of FIG. 1). For example, at least a portion of the flexible display 1120 may be exposed to the outside through the housing 1110.

According to various embodiments, although not shown in FIG. 31, the inside of the housing 1110 may further include a processor (e.g., the processor 120 of FIG. 1) operatively connected with the flexible display 1120 and a driving structure (e.g., the gear structure 450 of FIG. 8 or the gear structure 550 of FIG. 14) configured to adjust the exposed portion of the flexible display 1120. According to the manipulation of the driving structure, the flexible display 1120 may be additionally drawn out or in the housing 1110. The additional draw-out and/or in the housing 1110, of the flexible display 1120 may be referred to as a slide. According to the slide, the externally exposed area of the flexible display 1120 may be changed.

According to various embodiments, the mounting member 1200 may be a component for mounting the electronic device 1000 on a portion of the user's body and may include a strap 1210 and a plurality of coupling portions 1230 disposed at two opposite ends of the strap 1210.

According to various embodiments, the strap 1210 may include a sub housing for coupling to or separating from the housing 1110 of the main body 1100. According to various embodiments, components (e.g., a sub processor, a battery, or a communication module) for controlling the mounting member 1200 may be disposed in the sub housing 1220. According to various embodiments, the components (e.g., a sub processor, a battery, or a communication module) for controlling the mounting member 1200 may be disposed in the strap 1210 or in a portion of the plurality of coupling portions 1230, other than the sub housing 1220.

For example, the main body 1100 and the mounting member 1200 may be coupled to each other using a magnet disposed in at least a portion of the housing 1110 and a magnet disposed in at least a portion of the sub housing 1220 but, without limitations thereto, the main body 1100 and the mounting member 1200 may be coupled together in a manner shown in FIG. 5.

According to various embodiments, the plurality of coupling portions 1230 may include a first coupling portion 1231 disposed at a side end of the strap 1210 and a second coupling portion 1232 disposed at another side end of the strap 1210. According to various embodiments, the plurality of coupling portions 1230 may be coupled or separated from each other using a magnet disposed in at least one of the first coupling portion 1231 or the second coupling portion 1232. For example, the plurality of coupling portions 1230 may be coupled or separated from each other using the magnets disposed in the first coupling portion 1231 and the second coupling portion 1232, respectively. As another embodiment, when a magnet is disposed in the first coupling portion 1231, of the first coupling portion 1231 and the second coupling portion 1232, an object which sticks to a magnet may be disposed in the second coupling portion 1232 or the second coupling portion 1232 may be formed of a material that sticks to a magnet. As another embodiment, when the strap 1210 is formed of a material that sticks to a magnet, the second coupling portion 1232 may be one of the two opposite ends of the strap 1210, which does not stick to a magnet.

According to various embodiments, as shown in FIG. 5, the plurality of coupling portions 1230 may be implemented to include a plurality of coupling holes (e.g., the coupling hole 467 of FIG. 5) provided on one side of the strap 1210 and a fixing member (e.g., the fixing member 465 of FIG. 5) provided on the other side of the strap 1210.

According to various embodiments, a sensor may be disposed in at least a portion of the strap 1210 and/or at least a portion of the plurality of coupling portions 1230. According to various embodiments, the sensor may be used for user authentication. The sensor for user authentication is described below with reference to FIGS. 34A to 34C.

According to various embodiments, although FIG. 31 illustrates a structure in which the main body 1100 and the mounting member 1200 may be coupled or separated from each other, the main body 1100 and the mounting member 1200 may be inseparable from each other.

Figure 32:
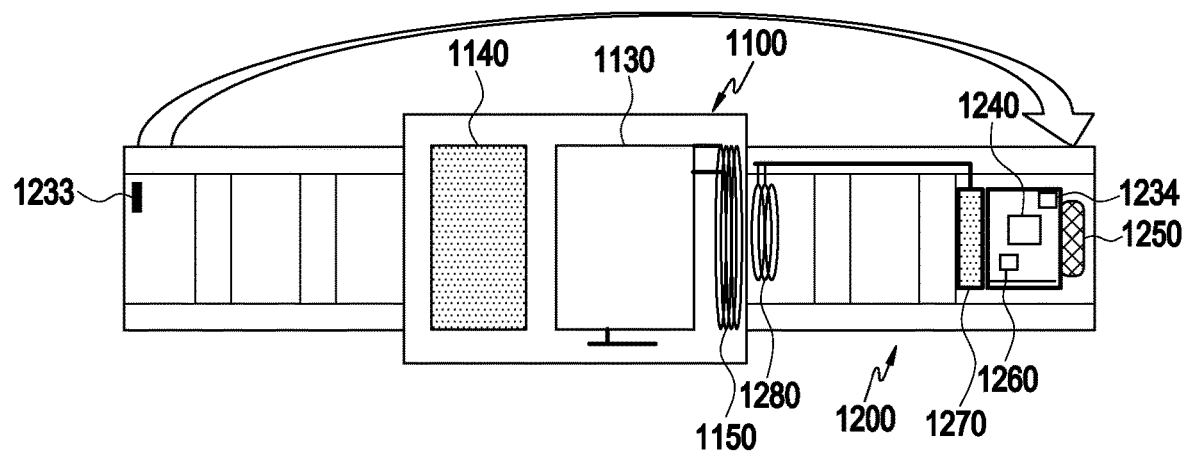
FIG. 32 is a view illustrating a configuration of an electronic device according to an embodiment of the disclosure.

FIG. 32 is a view illustrating a configuration of an electronic device according to an embodiment of the disclosure. FIG. 32 illustrates an embodiment in which a sub processor is disposed in the mounting member 1200 (e.g., the strap 1210, sub housing 1220, and the plurality of coupling portions 1230 of FIG. 31). According to various embodiments, some operations for controlling the electronic device (e.g., the electronic device 101 of FIG. 1 or the electronic device 1000 of FIG. 31) may be performed by the sub processor.

Referring to FIG. 32, the main body 1100 (e.g., the main body 1100 of FIG. 31) may include a processor 1130 (e.g., the processor 120 of FIG. 1), a battery 1140 (e.g., the battery 189 of FIG. 1, hereinafter referred to as a first battery), and a first coil 1150 for wirelessly receiving power from the battery 1270 of the mounting member 1200. According to various embodiments, the main body 1100 may further include a communication module (e.g., communication module 190 of FIG. 1) for performing communication with the mounting member 1200 or an external electronic device, a memory (e.g., the memory 130 of FIG. 1), a driving structure (e.g., the gear structure 450 of FIG. 8 or the gear structure 550 of FIG. 14) configured to adjust the exposed portion of the flexible display (e.g., the display module 160 of FIG. 1 or the flexible display 1120 of FIG. 31) and/or rotation of the housing (e.g., the housing 1110 of FIG. 31), and a plurality of sensors (e.g., the sensor module 176 of FIG. 1) for detecting the operation state of the electronic device or external environment state.

According to various embodiments, the mounting member 1200 may include a magnet 1233 disposed in at least one of the plurality of coupling portions (e.g., the plurality of coupling portions 1230 of FIG. 31), a coupling detection sensor 1234 (e.g., hall integrated circuit (IC)) for detecting the coupling or separation of the plurality of coupling portions, a sub processor 1240 (e.g., the processor 120 of FIG. 1), a sensor 1250 (e.g., a fingerprint recognition sensor or a blood vessel recognition sensor) for user authentication, a communication module 1260 (e.g., the communication module 190 of FIG. 1) for performing communication with the main body 1100 or an external electronic device, a battery 1270 (e.g., the battery 189 of FIG. 1, hereinafter referred to as a second battery), and a second coil 1280 for supplying power to the first battery 1140 and the second battery 1270 of the main body 1100. According to various embodiments, the mounting member 1200 may further include a memory (e.g., the memory 130 of FIG. 1) and a plurality of sensors (e.g., the sensor module 176 of FIG. 1) for detecting the operation state of the electronic device or external environment state.

According to various embodiments, the sub processor 1240 may be operatively connected with the components of the mounting member 1200. For example, upon detecting mutual coupling of the plurality of coupling portions, the sub processor 1240 may perform user authentication. For example, if the plurality of coupling portions are coupled through the magnet 1233, the sub processor 1240 may detect the coupling of the plurality of coupling portions through the coupling detection sensor 1234.

According to various embodiments, upon detecting the mutual coupling of the plurality of coupling portions, the sub processor 1240 may perform user authentication based on the sensing value detected through the sensor 1250 for user authentication. According to various embodiments, the sub processor 1240 may perform user authentication by comparing user information stored in the memory included in the mounting member 1200 or user information received through the communication module 1260 and the sensing value detected through the sensor 1250. Various embodiments of the sensor 1250 for user authentication are described below with reference to FIGS. 34A to 34C.

According to various embodiments, the sub processor 1240 may transmit the result of user authentication to the processor 1130. For example, the sub processor 1240 may transmit the user authentication result to the processor 1130 of the main body 1100 through the communication module 1260.

According to various embodiments, the processor 1130 may control the driving structure based on the user authentication result received from the sub processor 1240. According to various embodiments, the driving structure may include at least one of a rotation shaft (e.g., the rotation shaft 450a of FIG. 8), a crown (e.g., the rotation knob 454 of FIG. 5) connected with a side end of the rotation shaft to manually move the rotation shaft, a sensor (e.g., the sensor module 176 of FIG. 1) for detecting the position of the crown, or a driving motor (e.g., the driving motor 480 of FIG. 5) connected with the other side end of the rotation shaft to rotate the rotation shaft about the rotation shaft. According to various embodiments, the electronic device may omit the crown and, if included, the crown may be disposed outside the housing.

According to various embodiments, as shown in FIG. 8 or 16A, a plurality of first gear portions (e.g., the second gear portion 452 of FIG. 8 or the third gear portion 553 of FIG. 16A) related to adjustment of the exposed portion of the flexible display and at least one second gear portion (e.g., the first gear portion 451 of FIG. 8 or the first and second gear portions 551 and 552 of FIG. 16A) may be disposed on the rotation shaft.

According to various embodiments, as shown in FIG. 16A, when the plurality of first gear portions (e.g., the third gear portion 553 of FIG. 16A) and the plurality of second gear portions (e.g., the first and second gear portions 551 and 552 of FIG. 16A) are disposed on the rotation shaft, the electronic device may operate in one mode among a first mode for rotating the housing, a second mode for adjusting the exposed portion of the flexible display, or a third mode for adjusting the exposed portion of the flexible display and rotating the housing, through adjustment of the position of the rotation shaft. According to various embodiments, the position of the rotation shaft may be automatically or manually adjusted.

According to various embodiments, the processor 1130 may control the driving structure to perform at least one of rotation of the housing or adjustment of the exposed portion of the flexible display based on the executed function if user authentication succeeds. For example, the processor 1130 may control the driving structure to perform at least one of rotation of the housing or adjustment of the exposed portion of the flexible display based on at least one of the size, ratio, or direction of the screen corresponding to the executed function. For example, the function may include at least one of display of the home screen, execution of an application (e.g., video playback, navigation, map, or messaging), or execution of the payment function. The driving structure control operation according to the executed function is described below with reference to FIGS. 36 to 44.

According to various embodiments, when the position of the rotation shaft is automatically adjusted, if user authentication succeeds, the processor 1130 may identify one of the first mode to the third mode based on the executed function and move the rotation shaft to operate in the identified mode. For example, the processor 1130 may identify one of the first mode to the third mode to change the currently exposed portion of the flexible display and direction to correspond to the executed function. According to various embodiments, the processor 1130 may move the rotation shaft to operate in the identified mode and rotate the housing and/or adjust the exposed portion of the flexible display in the identified mode to be suitable for the executed function.

According to various embodiments, when the position of the rotation shaft is manually adjusted through the crown, the processor 1130 may identify the mode corresponding to the position of the crown detected using the sensor for detecting the position of the crown. For example, the sensor for detecting the position of the crown may be a hall IC that is disposed in the housing and detects the strength of the magnetic field of the magnet disposed in the crown. According to various embodiments, the processor 1130 may identify the position of the crown based on the strength value of the magnetic field sensed by the sensor for detecting the position of the crown and identify the mode corresponding to the identified position of the crown.

According to various embodiments, if user authentication succeeds, the processor 1130 may compare the mode identified based on the position of the crown with the mode corresponding to the executed function. For example, if the mode identified based on the position of the crown differs from the mode corresponding to the executed function, the processor 1130 may display a message to request to adjust the position of the crown to become the mode corresponding to the executed function, on the exposed portion of the flexible display. According to various embodiments, upon detecting the adjustment of the position of the crown to become the mode corresponding to the executed function, the processor 1130 may control the driving structure to rotate the housing and/or adjust the exposed portion of the flexible display in the mode corresponding to the executed function.

In another embodiment, if the mode identified based on the position of the crown is the same as the mode corresponding to the executed function, the processor 1130 may control the driving structure to rotate the housing and/or adjust the exposed portion of the flexible display to be suitable for the executed function without changing the mode. An embodiment for manually changing the mode is described below with reference to FIG. 41.

According to various embodiments, if the mutual coupling of the plurality of coupling portions is maintained after user authentication succeeds, the processor 1130 may execute a function requiring user authentication without an additional authentication operation. For example, the function requiring user authentication may be execution of a security folder or a payment function. The operation of executing the function requiring user authentication without an additional authentication operation is described below with reference to FIG. 40.

According to various embodiments, upon receiving information indicating that user authentication fails from the sub processor 1240, the processor 1130 may activate only set functions. For example, the processor 1130 may activate only the clock function when user authentication fails. In another embodiment, when user authentication fails, the processor 1130 may display a message to re-request user authentication a preset number of times and, if user authentication fails a preset number of times or more, activate only preset functions. Operations according to the user authentication result are described below with reference to FIG. 39.

According to various embodiments, the sub processor 1240 may determine whether to supply the power of the second battery 1270 to the first battery 1140 based on the user authentication result.

For example, if user authentication succeeds, the sub processor 1240 may determine to supply the power of the second battery 1270 to the first battery 1140 and wirelessly transmit power to the first coil 1150 connected with the first battery 1140 through the second coil 1280. According to various embodiments, if power is supplied to the first battery 1140, the processor 1130 may control the driving structure.

In another embodiment, if user authentication fails, the sub processor 1240 may not supply the power of the second battery 1270 to the first battery 1140. Thus, if user authentication fails, the main body does not receive power and may not be driven.

Although FIG. 32 illustrates that power is wirelessly transmitted/received through the first coil 1150 and the second coil 1280, according to various embodiments, power may be wiredly transmitted/received through a pin contact.

According to various embodiments, the processor 1130 or the sub processor 1240 may provide a feedback for the user authentication result. For example, the processor 1130 may display information about success or failure in user authentication on the exposed portion of the flexible display or provide at least one of a sound feedback or vibration feedback. In another embodiment, the sub processor 1240 may provide a feedback for the antenna unit result through an LED included in the mounting member 1200 or provide at least one of a sound feedback or vibration feedback. For example, when a feedback for the user authentication result is provided through the LED, the sub processor 1240 provide the feedback by emitting green light when authentication succeeds, emitting red light when authentication fails, flickering green light when authentication is in progress and flickering red light when reauthentication is required.

According to various embodiments, upon detecting separation of the plurality of coupling portions, the sub processor 1240 may transmit information indicating that the plurality of coupling portions are separated to the processor 1130. According to various embodiments, upon receiving the information indicating that the plurality of coupling portions are separated, the processor 1130 may switch to an unauthenticated state. For example, upon detecting separation of the plurality of coupling portions after user authentication succeeds in a state in which the plurality of coupling portions are coupled together, the processor 1130 may switch to the unauthenticated state to re-request user authentication or activate only set functions. As another embodiment, upon detecting separation of the plurality of coupling portions after user authentication succeeds in a state in which the plurality of coupling portions are coupled together, the sub processor 1240 may switch to the unauthenticated state and may not supply the power of the second battery 1270 to the first battery 1140.

Although FIG. 32 illustrates that the user authentication operation is performed by the sub processor 1240, according to various embodiments, the sub processor 1240 may transmit only the sensing value detected by the sensor 1250 to the processor 1130, and the processor 1130 may perform the user authentication operation.

Figure 33:
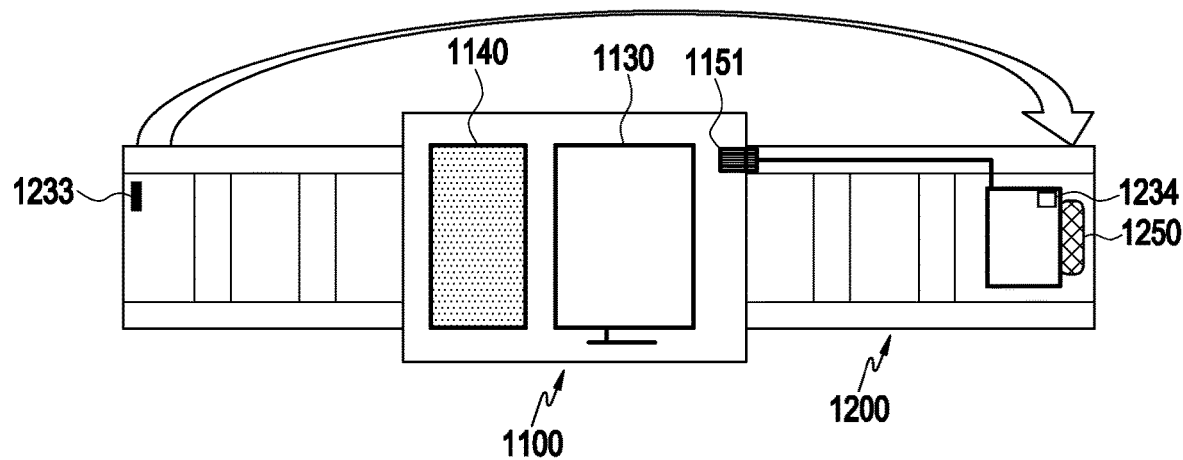
FIG. 33 is a view illustrating a configuration of an electronic device according to an embodiment of the disclosure.

FIG. 33 is a view illustrating a configuration of an electronic device according to an embodiment of the disclosure. FIG. 33 illustrates an embodiment in which a sub processor is not disposed in the mounting member 1200 (e.g., the strap 1210, sub housing 1220, and the plurality of coupling portions 1230 of FIG. 31).

Referring to FIG. 33, the main body 1100 (e.g., the main body 1100 of FIG. 31) may include a processor 1130 (e.g., the processor 120 of FIG. 1), a battery 1140 (e.g., the battery 189 of FIG. 1), and a first contact pin 1151 for communicating with the mounting member 1200. According to various embodiments, the main body 1100 may further include a communication module (e.g., the communication module 190 of FIG. 1) for performing communication with the mounting member 1200 or an external electronic device, a memory (e.g., the memory 130 of FIG. 1), a driving structure (e.g., the gear structure 450 of FIG. 8 or the gear structure 550 of FIG. 14) configured to adjust the exposed portion of the flexible display (e.g., the display module 160 of FIG. 1 or the flexible display 1120 of FIG. 31) and/or rotation of the housing (e.g., the housing 1110 of FIG. 31), and a plurality of sensors (e.g., the sensor module 176 of FIG. 1) for detecting the operation state of the electronic device or external environment state.

According to various embodiments, the mounting member 1200 may include a magnet 1233 disposed in at least one of the plurality of coupling portions (e.g., the plurality of coupling portions 1230 of FIG. 31), a coupling detection sensor 1234 (e.g., hall IC) for detecting coupling or separation of the plurality of coupling portions, a sensor 1250 for user authentication (e.g., fingerprint recognition sensor or blood vessel recognition sensor), and a second contact pin 1181 for communicating with the main body 1100.

According to various embodiments, the mounting member 1200 may further include a communication module (e.g., the communication module 190 of FIG. 1) for performing communication with an external electronic device, a memory (e.g., the memory 130 of FIG. 1) and a plurality of sensors (e.g., the sensor module 176 of FIG. 1) for detecting the operation state of the electronic device or external environment state.

According to various embodiments, the processor 1130 may receive a sensing value from at least one of the coupling detection sensor 1234 or the sensor 1250 for user authentication through the first contact pin 1141 and the second contact pin 1181.

For example, upon detecting the mutual coupling of the plurality of coupling portions through the coupling detection sensor 1234, the processor 1130 may perform user authentication based on the sensing value detected through the sensor 1250 for user authentication.

According to various embodiments, the processor 1130 may perform the operation of detecting coupling of the plurality of coupling portions and user authentication operation using the sensing value detected through the sensor 1250 by the sub processor 1240, as well as the operation by the processor 1130 shown in FIG. 32.

Figure 34A:
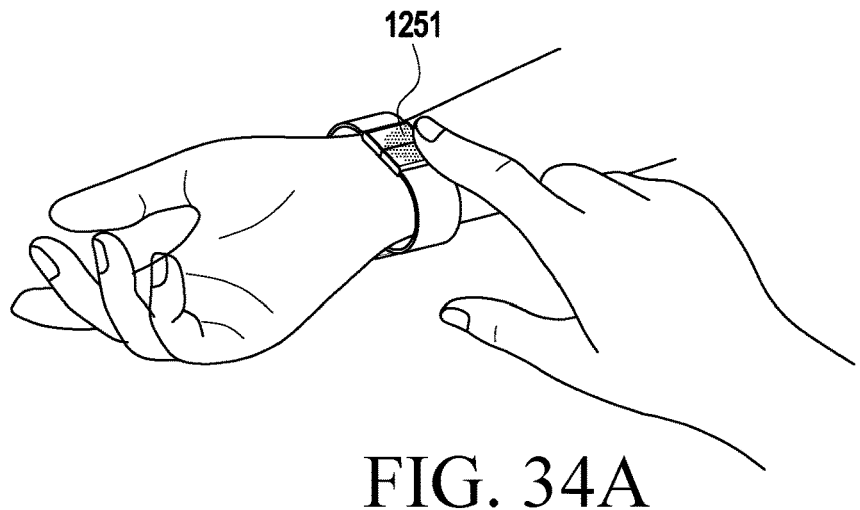
FIG. 34A is a view illustrating a user authentication method of an electronic device according to an embodiment of the disclosure.
Figure 34B:
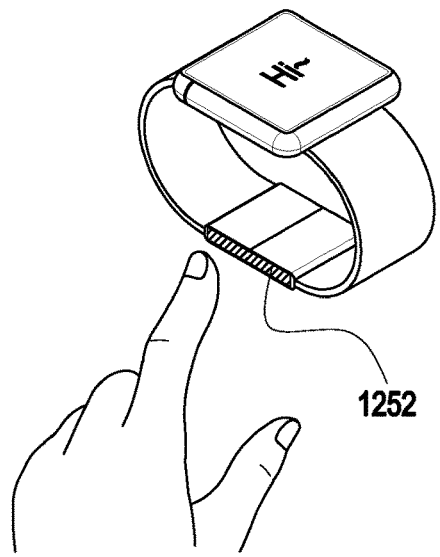
FIG. 34B is a view illustrating a user authentication method of an electronic device according to an embodiment of the disclosure.
Figure 34C:
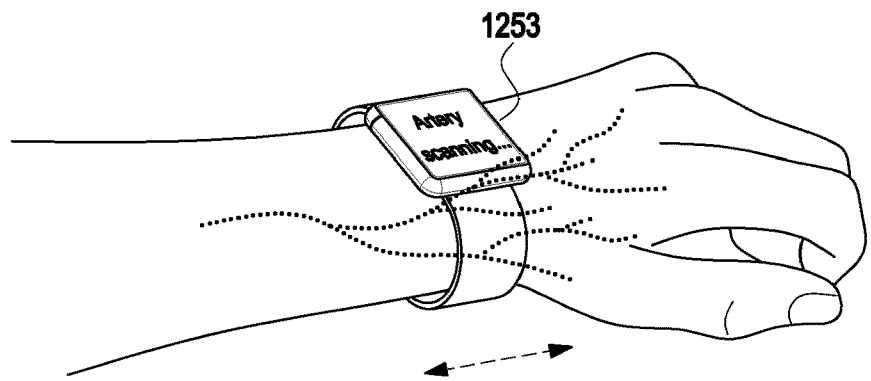
FIG. 34C is a view illustrating a user authentication method of an electronic device according to an embodiment of the disclosure.

FIGS. 34A, 34B, and 34C are views illustrating a user authentication method of an electronic device according to various embodiments of the disclosure. For example, FIGS. 34A and 34B illustrate an embodiment of performing user authentication through fingerprint recognition, and FIG. 34C illustrates an embodiment of performing user authentication through blood vessel recognition.

According to various embodiments, the sensors 1251 and 1252 for user authentication (e.g., the sensor module 176 of FIG. 1, the sensor 1250 of FIG. 32, or the sensor 1250 of FIG. 33) may be fingerprint recognition sensors disposed in at least a partial area of the plurality of coupling portions (e.g., the plurality of coupling portions 1230 of FIG. 31, the first coupling portion 1231, or the second coupling portion 1232).

Referring to FIG. 34A, the sensor 1251 may be disposed on the surface opposite to the surface contacting the human body among the plurality of coupling portions.

Referring to FIG. 34B, the sensor 1252 may be disposed on a side surface of the plurality of coupling portions. Thus, when the user's finger contacts the plurality of coupling portions for mutual coupling of the plurality of coupling portions, the sensors 1251 and 1252 may detect the user's fingerprint.

According to various embodiments, the sensor 1253 for user authentication may be a blood vessel recognition sensor (e.g., an infrared sensor for detecting arteries and/or veins) disposed in at least a portion of the mounting member (e.g., the mounting member 1200 of FIG. 31).

Referring to FIG. 34C, the sensor 1253 may be disposed on at least a portion of the surface contacting the human body of the mounting member and detect the user's blood vessel.

According to various embodiments, the sensor for user authentication is not limited to the fingerprint recognition sensor or blood vessel recognition sensor shown in FIG. 32 but may be included in the main body (e.g., the main body 1100 of FIG. 31). For example, the sensor for user authentication may include a fingerprint recognition sensor included in the flexible display (e.g., the flexible display 1120 of FIG. 31) or housing (e.g., the housing 1110 of FIG. 31) of the main body and may include an iris recognition sensor included in the main body.

Figure 35:
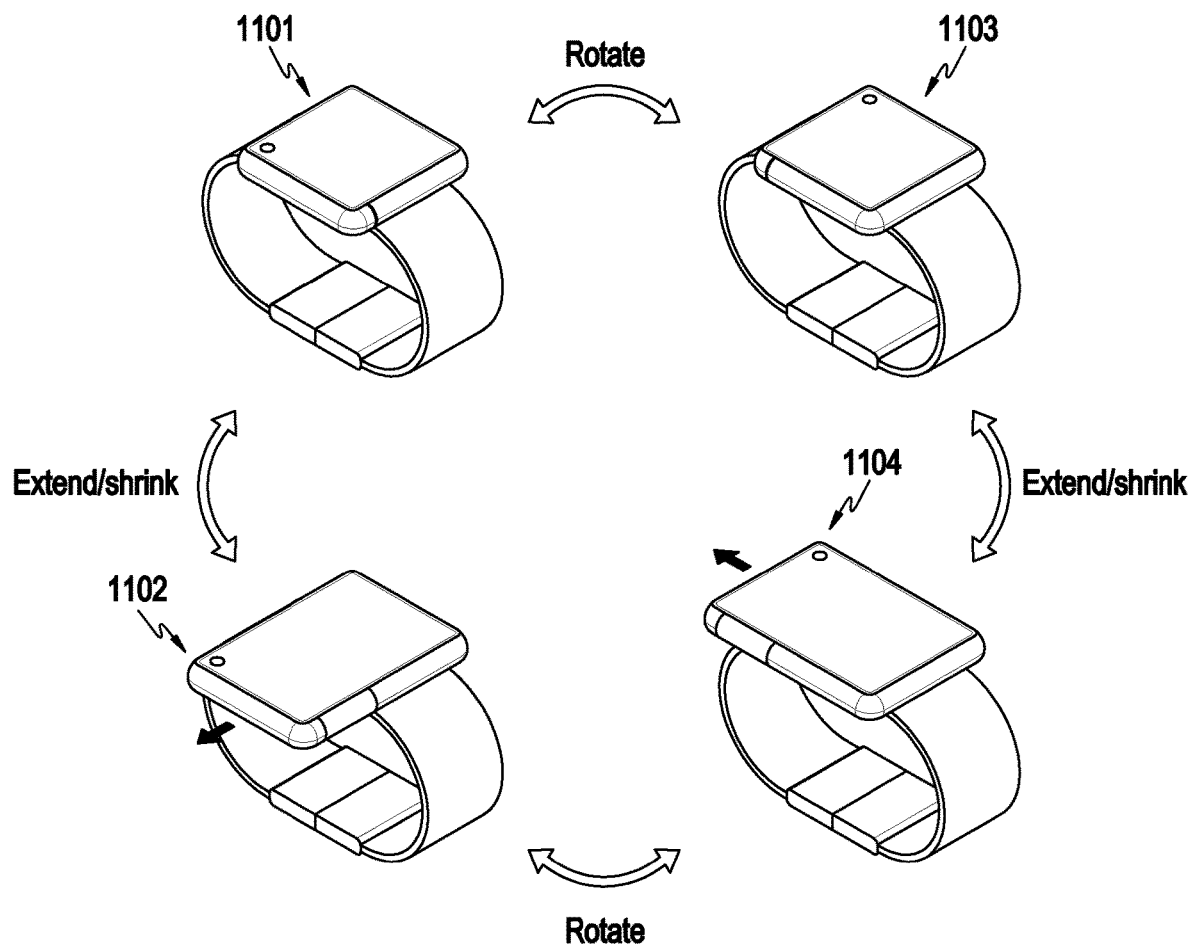
FIG. 35 is a view illustrating an operation of adjusting an exposed portion of a flexible display and rotation of a housing of an electronic device according to an embodiment of the disclosure.

FIG. 35 is a view illustrating an operation of adjusting an exposed portion of a flexible display and rotation of a housing of an electronic device according to an embodiment of the disclosure.

Referring to FIG. 35, a state in which a dot is positioned at an upper left end of the flexible display (e.g., the display module 160 of FIG. 1 or the flexible display 1120 of FIG. 31) may be assumed to be a normal state 1101 of the electronic device (e.g., the electronic device 101 of FIG. 1 or the electronic device 1000 of FIG. 31). The dot positioned at the upper left end of the flexible display is illustrated to describe the state of the electronic device, and is not displayed on the flexible display.

For example, at least one of the rotation of the housing of the electronic device or the adjustment of the exposed portion of the flexible display may be performed by the rotation of the rotation shaft (e.g., the rotation shaft 550a of FIG. 18 or the rotation shaft 550a of FIG. 23) disposed in the housing.

According to various embodiments, if the exposed portion of the flexible display is extended in the normal state 1101 of the electronic device, the electronic device may be changed into the extended state 1102. For example, if the exposed portion of the flexible display is extended to the left in the normal state 1101, the dot at the upper left end of the flexible display may also be in the extended state 1102 which it has been moved to the left according to the extension of the flexible display. According to various embodiments, if the exposed portion of the flexible display is shrunken in the extended state 1102 of the electronic device, the electronic device may be changed into the normal state 1101.

According to various embodiments, if the housing is rotated in the normal state 1101, the electronic device may be changed into the rotated state 1103. For example, if the housing is rotated clockwise in the normal state 1101, the dot at the upper left end of the flexible display may be in the rotated state 1103 in which it has been moved to the upper right end. According to various embodiments, if the housing is rotated counterclockwise in the rotated state 1103 of the electronic device, the electronic device may be changed into the normal state 1101.

According to various embodiments, if the exposed portion of the flexible display is extended in the rotated state 1103, the electronic device may be changed into the extended and rotated state 1104. For example, if the exposed portion of the flexible display is extended upward in the rotated state 1102, the dot at the upper right end of the flexible display may also be in the extended and rotated state 1104 in which it has been moved upward according to the extension of the flexible display. According to various embodiments, if the exposed portion of the flexible display is shrunken in the extended and rotated state 1104, the electronic device may be changed into the rotated state 1102.

According to various embodiments, if the housing is rotated in the extended state 1102 of the electronic device, the electronic device may be changed into the extended and rotated state 1104. For example, if the housing is rotated clockwise in the extended state 1102 of the electronic device, the dot at the upper left end of the flexible display may be in the extended and rotated state 1104 in which it has been moved to the upper right end. According to various embodiments, if the housing is rotated counterclockwise in the extended and rotated state 1104 of the electronic device, the electronic device may be changed into the extended state 1102.

The rotation direction of the housing may be varied depending on the rotation direction or arrangement structure of the rotation shaft and, according to various embodiments, the housing of the electronic device may be rotated counterclockwise in the normal state 1101 and, in the rotated state 1103, be rotated clockwise.

The direction of adjustment of the exposed portion of the flexible display has been described as extension to the left in the normal state 1101. However, according to various embodiments, the extension may be performed right, upward, downward, or in two opposite directions in the normal state 1101.

Figure 36:
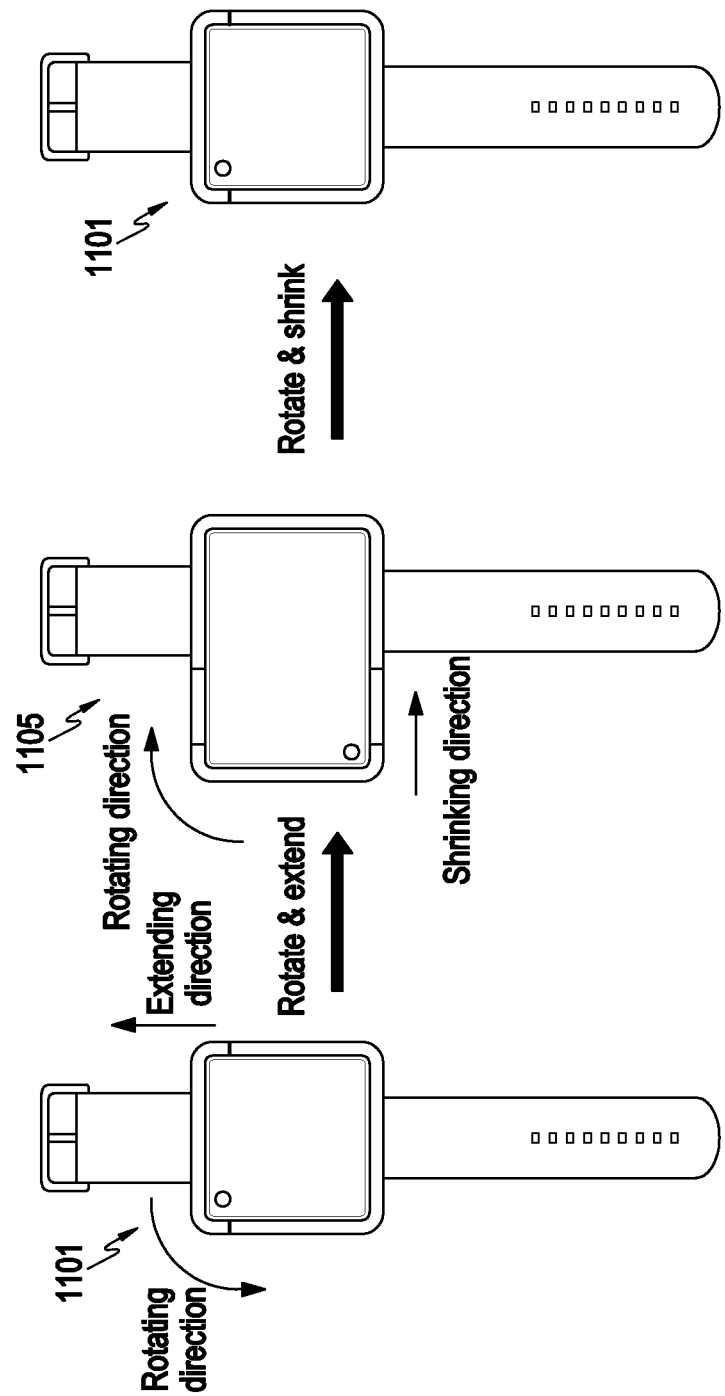
FIG. 36 is a view illustrating an operation of adjusting an exposed portion of a flexible display and rotation of a housing of an electronic device according to an embodiment of the disclosure.

Although FIG. 35 illustrates an embodiment in which rotation of the housing or adjustment of the exposed portion of the flexible display is independently performed, as shown in FIG. 36, rotation of the housing and adjustment of the exposed portion of the flexible display may be performed in association with each other.

FIG. 36 is a view illustrating an operation of adjusting an exposed portion of a flexible display and rotation of a housing of an electronic device according to an embodiment of the disclosure.

Referring to FIG. 36, a state in which a dot is positioned at an upper left end of the flexible display (e.g., the display module 160 of FIG. 1 or the flexible display 1120 of FIG. 31) may be assumed to be a normal state 1101 of the electronic device (e.g., the electronic device 101 of FIG. 1 or the electronic device 1000 of FIG. 31). The dot positioned at the upper left end of the flexible display is illustrated to describe the state of the electronic device, and is not displayed on the flexible display.

For example, when the electronic device includes the structure of FIG. 8 or 28, adjustment of the housing and adjustment of the exposed portion of the flexible display may be performed together by rotation of the rotation shaft (e.g., the rotation shaft 450a of FIG. 8 or the rotation shaft 550a of FIG. 28).

According to various embodiments, according to rotation of the rotation shaft in one direction in the normal state 1101, the electronic device may be changed into the extended and rotated state 1105 in which the exposed portion of the flexible display is adjusted while the housing is rotated. For example, according to rotation of the rotation shaft in the normal state 1101, the electronic device may be changed into the extended and rotated state 1105 in which the housing is rotated counterclockwise while the exposed portion of the flexible display is extended. For example, in the normal state 1101, the dot positioned at the upper left end of the flexible display may be moved to the lower left end of the flexible display according to rotation of the housing and be moved to the left according to extension of the exposed portion of the flexible display.

According to various embodiments, in the extended and rotated state 1105, according to rotation of the rotation shaft in the opposite direction, the electronic device may be changed into the normal state 1101 in which the housing is rotated clockwise while the exposed portion of the flexible display is shrunken.

Although FIG. 36 illustrates that the exposed portion of the flexible display is extended as the housing is rotated counterclockwise, and the exposed portion of the flexible display is shrunken as the housing is rotated clockwise, according to various embodiments, extension or shrinkage of the exposed portion and the rotation direction may be varied depending on the arrangement structure of the plurality of gear portions for controlling the exposed portion of the flexible display and the plurality of gear portions for rotating the housing on the rotation shaft.

Figure 37:
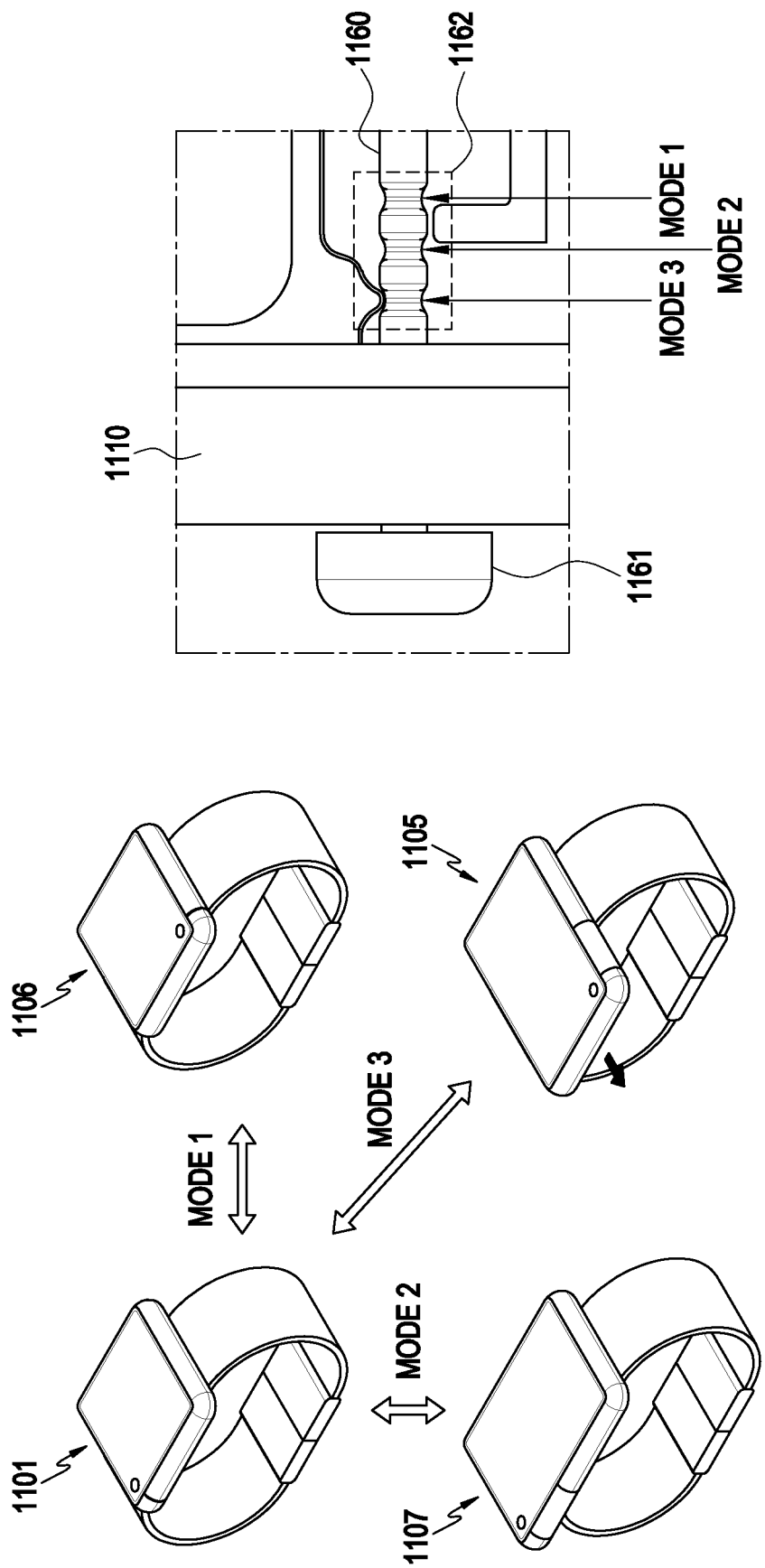
FIG. 37 is a view illustrating an operation mode of adjusting an exposed portion of a flexible display and rotation of a housing of an electronic device according to an embodiment of the disclosure.

FIG. 37 is a view illustrating an operation mode of adjusting an exposed portion of a flexible display and rotation of a housing of an electronic device according to an embodiment of the disclosure.

For example, when the electronic device includes a rotation shaft (e.g., the rotation shaft 550a of FIG. 14) where a plurality of gear portions are disposed for rotation, the electronic device may automatically or manually move the rotation shaft (e.g., the rotation shaft 550a of FIG. 14) to change the operation mode. For example, the operation mode may include a first mode (mode 1) for rotating the housing 1110, a second mode (mode 2) for adjusting the exposed portion of the flexible display, or a third mode (mode 3) for adjusting the exposed portion of the flexible display and rotating the housing.

Referring to FIG. 37, the electronic device may include the rotation shaft 1160 in the housing 1110 and may include a crown 1161 connected with one side end of the rotation shaft 1160 and disposed outside the housing 1110. According to various embodiments, the rotation shaft 1160 may include three grooves 1162 (e.g., the plurality of stopper members 501 of FIG. 17) respectively corresponding to the first mode, the second mode, and the third mode. For example, the three grooves 1162 may be a groove corresponding to the third mode, a groove corresponding to the second mode, or a groove corresponding to the first mode in the order from the crown 1161. According to various embodiments, the order of the grooves may be varied depending on the arrangement structure of the plurality of gear portions disposed on the rotation shaft.

According to various embodiments, the electronic device may identify the mode based on the position of the crown moved by the user's manual manipulation. As another embodiment, the electronic device may automatically move the rotation shaft 1160 using the motor provided in the housing 1110, determining the operation mode. According to various embodiments, when automatically moving the rotation shaft, the electronic device may omit the crown 1161.

According to various embodiments, a state in which a dot is positioned at an upper left end of the flexible display (e.g., the display module 160 of FIG. 1 or the flexible display 1120 of FIG. 31) may be assumed to be a normal state 1101 of the electronic device (e.g., the electronic device 101 of FIG. 1 or the electronic device 1000 of FIG. 31). The dot positioned at the upper left end of the flexible display is illustrated to describe the state of the electronic device, and is not displayed on the flexible display.

According to various embodiments, when a stopper protrusion (e.g., the stopper protrusion 502 of FIG. 17) is fixed to the groove corresponding to the first mode for rotating the housing, among the three grooves 1162, in the normal state 1101 so that the electronic device operates in the first mode, the housing may be rotated by rotation of the rotation shaft 1160, changing the electronic device into the rotated state 1106. For example, the electronic device may be rotated counterclockwise according to rotation of the rotation shaft 1160 in one direction in the normal state 1101 and be changed into the rotated state 1106 in which the dot is positioned at the lower left end of the flexible display. According to various embodiments, the electronic device may be rotated clockwise according to rotation of the rotation shaft 1160 in the opposite direction in the rotated state 1106 and be changed into the normal state 1101.

According to various embodiments, when the stopper protrusion is fixed to the groove corresponding to the second mode for adjusting the exposed portion of the flexible display, among the three grooves 1162, in the normal state 1101 so that the electronic device operates in the second mode, the exposed portion of the flexible display may be extended by rotation of the rotation shaft 1160, changing the electronic device into the extended state 1107. For example, the flexible display may be extended upward according to rotation of the rotation shaft 1160 in one direction in the normal state 1101, so that the electronic device may be changed into the extended state 1107 in which the dot at the upper left end of the flexible display has been moved upward. According to various embodiments, the extended portion of the flexible display may be shrunken downward according to rotation of the rotation shaft 1160 in the opposite direction in the extended state 1107, so that the electronic device may be changed into the normal state 1101.

According to various embodiments, when the stopper protrusion is fixed to the groove corresponding to the third mode for adjusting the exposed portion of the flexible display and rotating the housing, among the three grooves 1162, in the normal state 1101 so that the electronic device operates in the third mode, the exposed portion of the flexible display may be extended and the housing may be rotated by rotation of the rotation shaft 1160, changing the electronic device into the extended and rotated state 1105. For example, according to rotation of the rotation shaft 1160 in one direction in the normal state 1101, the housing may be rotated counterclockwise, and the upper edge portion of the flexible display in the normal state 1101 may be extended to the left along with rotation of the housing, so that the electronic device may be changed into the extended and rotated state 1105 in which the dot at the upper left end of the flexible display has been moved downward and further left. According to various embodiments, according to rotation of the rotation shaft 1160 in the opposite direction in the extended and rotated state 1105, the housing may be rotated clockwise while the extended portion of the flexible display may be shrunken, changing the electronic device into the normal state 1101.

According to various embodiments, extension or shrinkage of the exposed portion and the rotation direction may be varied depending on the arrangement structure of the plurality of gear portions for controlling the exposed portion of the flexible display and the plurality of gear portions for rotating the housing on the rotation shaft.

Figure 38:
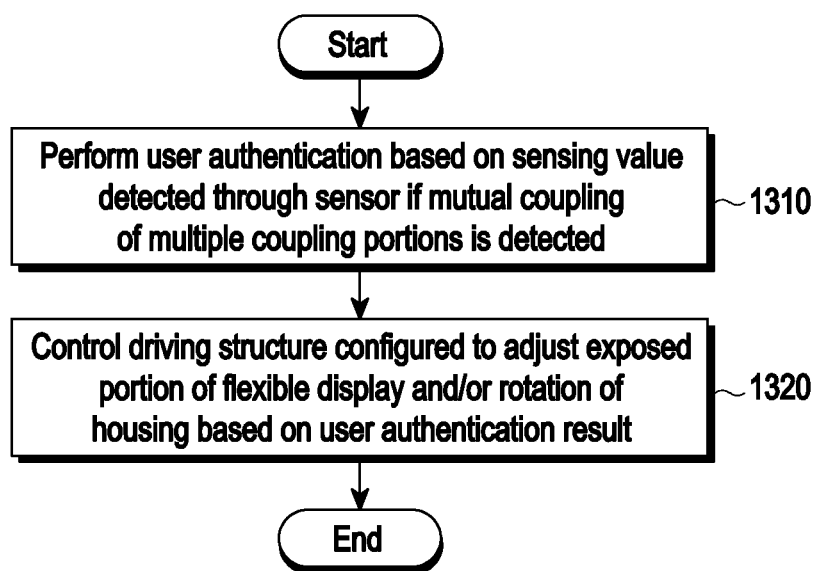
FIG. 38 is a view illustrating an operation of controlling an exposed portion of a flexible display and rotation of a housing of an electronic device according to an embodiment of the disclosure.

FIG. 38 is a view illustrating an operation of controlling an exposed portion of a flexible display and rotation of a housing of an electronic device according to an embodiment of the disclosure.

According to various embodiments, in operation 1310, upon detecting mutual coupling of the plurality of coupling portions (e.g., the plurality of coupling portions 1230 of FIG. 31), the electronic device (e.g., the electronic device 101 of FIG. 1, the processor 1130 of FIG. 32, the sub processor 1240 of FIG. 32, or the processor 1130 of FIG. 33) may perform user authentication based on the sensing value detected by the sensor (e.g., the sensor 1250 of FIG. 32 or the sensor 1250 of FIG. 33).

According to various embodiments, if the user authentication operation is performed by the sub processor, the sub processor may transmit the user authentication result to the processor.

According to various embodiments, in operation 1320, the electronic device may control the driving structure (e.g., the gear structure 450 of FIG. 8 or the gear structure 550 of FIG. 14) configured to adjust the exposed portion of the flexible display (e.g., the flexible display 1120 of FIG. 31) and/or rotate the housing (e.g., the housing 1110 of FIG. 31) based on the user authentication result.

For example, the electronic device may control the driving structure to perform at least one of rotation of the housing or adjustment of the exposed portion of the flexible display based on the executed function if user authentication succeeds.

According to various embodiments, the electronic device may control the driving structure to perform, in realtime, at least one of rotation of the housing or adjustment of the exposed portion of the flexible display further considering at least one of the position of the electronic device or direction of the electronic device detected using the sensor (e.g., speed sensor, accelerometer, rotation angle sensor, angular speed sensor, or position sensor) included in the electronic device. For example, when the executed function is a navigation application, the electronic device may rotate the housing or adjust the exposed portion of the flexible display further considering at least one of the position or direction of the electronic device, or the navigation screen displayed on the flexible display. For example, the electronic device may rotate the housing by 90 degrees counterclockwise when a left turn is required, extend the exposed portion of the flexible display when the distance to go straight is long, and gradually shrink the exposed portion of the flexible display as the distance reduces. Accordingly, the electronic device may more intuitively provide content to the user.

According to various embodiments, the driving structure may include at least one of a rotation shaft (e.g., the rotation shaft 450a of FIG. 8 or the rotation shaft 550a of FIG. 14), a crown (e.g., the rotation knob 454 of FIG. 5 or the rotation knob 555 of FIG. 14) connected with a side end of the rotation shaft to manually move the rotation shaft, a sensor (e.g., the sensor module 176 of FIG. 1) for detecting the position of the crown, or a driving motor (e.g., the driving motor 480 of FIG. 5 or the driving motor 580 of FIG. 14) connected with the other side end of the rotation shaft to rotate the rotation shaft about the rotation shaft. According to various embodiments, the electronic device may omit the crown and, if included, the crown may be disposed outside the housing.

For example, a plurality of first gear portions related to adjustment of the exposed portion of the flexible display and at least one second gear portion related to rotation of the housing may be disposed on the rotation shaft.

According to various embodiments, as shown in FIG. 8, when the plurality of first gear portions (e.g., the second gear portion 452 of FIG. 8) and one second gear portion (e.g., the first gear portion 451 of FIG. 8) are disposed on the rotation shaft, if user authentication succeeds, the electronic device may control the driving structure based on the executed function to adjust the exposed portion of the flexible display while rotating the housing.

According to various embodiments, as shown in FIG. 14, when the plurality of first gear portions and the plurality of second gear portions are disposed on the rotation shaft, the electronic device may operate in one mode among a first mode for rotating the housing, a second mode for adjusting the exposed portion of the flexible display, or a third mode for adjusting the exposed portion of the flexible display and rotating the housing, through adjustment of the position of the rotation shaft.

For example, if user authentication succeeds, the electronic device may determine whether only housing rotation is needed, only adjustment of the exposed portion of the flexible display is needed, or rotation of the housing and adjustment of the exposed portion of the flexible display are needed based on the executed function and control the driving structure to operate in one mode among the first mode to the third mode.

According to various embodiments, if the position of the rotation shaft may be manually adjusted, the electronic device may display a message requesting to adjust the position of the crown to correspond to the determine mode on the exposed portion of the flexible display. According to various embodiments, upon detecting the position of the crown as being the position corresponding to the determined mode, the electronic device may control the driving structure according to the determined mode.

According to various embodiments, the electronic device may identify the direction of the housing and the exposed portion of the flexible display according to the control of the driving structure and identify at least one content and layout to be displayed on the flexible display based on the identified direction of the housing and exposed portion of the flexible display. For example, when the rotation of the housing or adjustment of the exposed portion of the flexible display is automatically performed through control of the driving structure or the rotation of the housing or adjustment of the exposed portion of the flexible display is performed by the user's manual manipulation, the electronic device may identify the direction of the housing and the exposed portion of the flexible display and identify at least one content and layout to be displayed on the flexible display based on the identified direction of the housing and the exposed portion of the flexible display.

According to various embodiments, the electronic device may display the identified at least one content in the identified layout, on the exposed portion of the flexible display. Various embodiments related to the layout of content based on the direction of the housing and the exposed portion of the flexible display are described below with reference to FIGS. 48A to 48D, 49A to 49C, 50A to 50D, and 51A to 51C.

Figure 39:
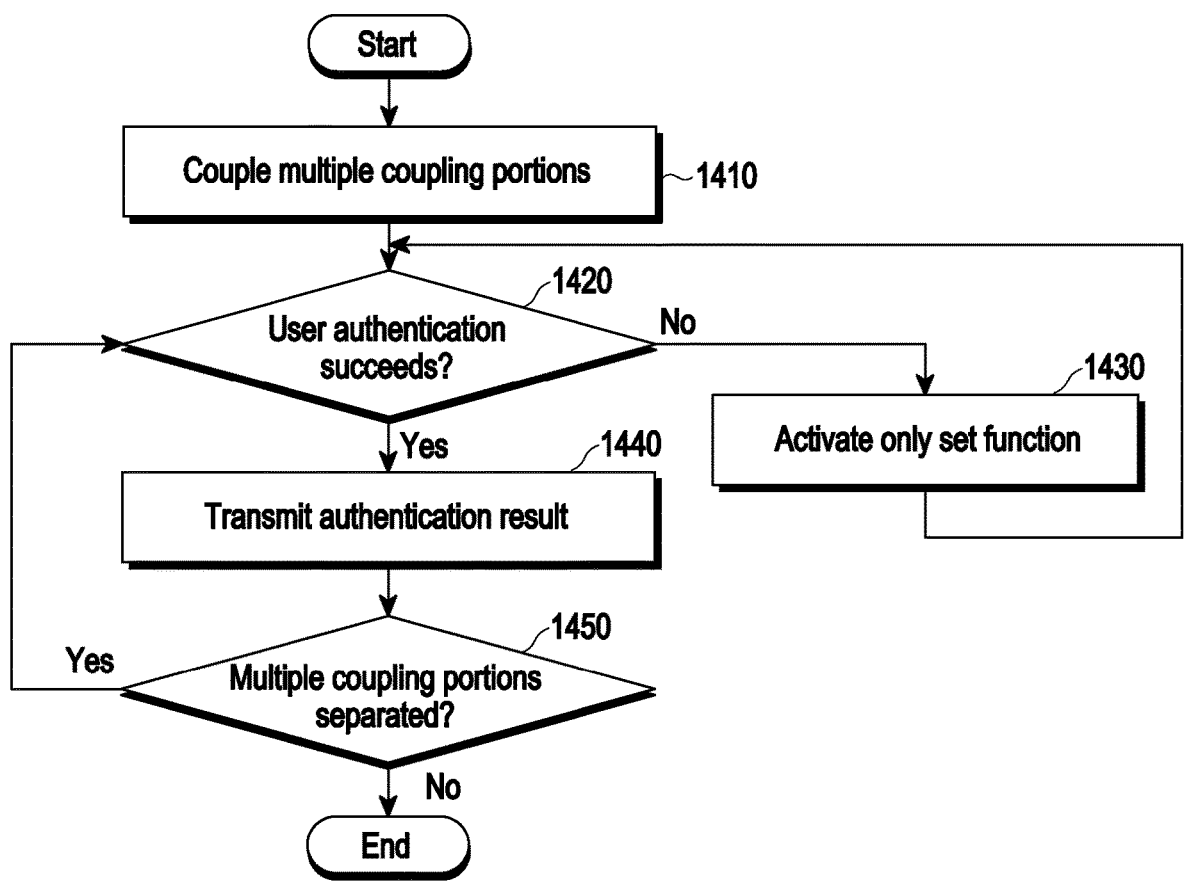
FIG. 39 is a view illustrating an operation of controlling an exposed portion of a flexible display and rotation of a housing of an electronic device according to a user authentication result according to an embodiment of the disclosure.

FIG. 39 is a view illustrating an operation of controlling an exposed portion of a flexible display and rotation of a housing of an electronic device according to a user authentication result according to an embodiment of the disclosure.

According to various embodiments, in operation 1410, the electronic device (e.g., the electronic device 101 of FIG. 1, the processor 1130 of FIG. 32, the sub processor 1240 of FIG. 32, or the processor 1130 of FIG. 33) may detect mutual coupling of the plurality of coupling portions (e.g., the plurality of coupling portions 1230 of FIG. 31). For example, the electronic device may detect mutual coupling of the plurality of coupling portions based on detection of approach of the magnet provided in at least one of the plurality of coupling portions through a hall IC provided in one of the plurality of coupling portions.

According to various embodiments, in operation 1420, the electronic device may perform a user authentication operation. For example, the electronic device may perform user authentication based on at least one of the fingerprint recognition sensor disposed in at least a portion of the plurality of coupling portions, a blood vessel recognition sensor disposed in the mounting member (e.g., the mounting member 1200 of FIG. 31), or the fingerprint recognition sensor or iris recognition sensor disposed in the main body (e.g., the main body 1100 of FIG. 31).

According to various embodiments, if user authentication fails (no in operation 1420, the electronic device may activate only set functions in operation 1430. For example, if user authentication fails, the electronic device may activate only the clock function. As another embodiment, if user authentication fails, the electronic device may not supply the power of the second battery (e.g., the second battery 1270 of FIG. 32) disposed in the mounting member to the first battery (e.g., the first battery 1140 of FIG. 32).

According to various embodiments, if user authentication fails, the electronic device may repeat the user authentication operation a set number of times and, if user authentication fails despite the repeated user authentication operation, activate only set functions.

According to various embodiments, if user authentication succeeds (yes in operation 1420), the electronic device may transmit the authentication result in operation 1440. For example, when the user authentication operation is performed by the sub processor, the sub processor may transmit the user authentication result to the processor. As another embodiment, when the user authentication operation is performed by the processor, operation 1440 may be omitted.

According to various embodiments, in operation 1450, the electronic device may detect separation of the plurality of coupling portions. For example, upon detecting separation of the plurality of coupling portions after user authentication succeeds (yes in operation 1450), the electronic device may return to operation 1420 to perform user authentication again. For example, upon detecting separation of the plurality of coupling portions after user authentication succeeds, the electronic device may switch to the unauthenticated state and perform user authentication again.

According to various embodiments, if separation of the plurality of coupling portions is not detected after user authentication succeeds (no in operation 1450), the electronic device may maintain the state in which user authentication succeeds. For example, the electronic device may perform the operation of controlling the driving structure or perform functions requiring user authentication without additional authentication until separation of the plurality of coupling portions is detected after user authentication succeeds.

Figure 40:
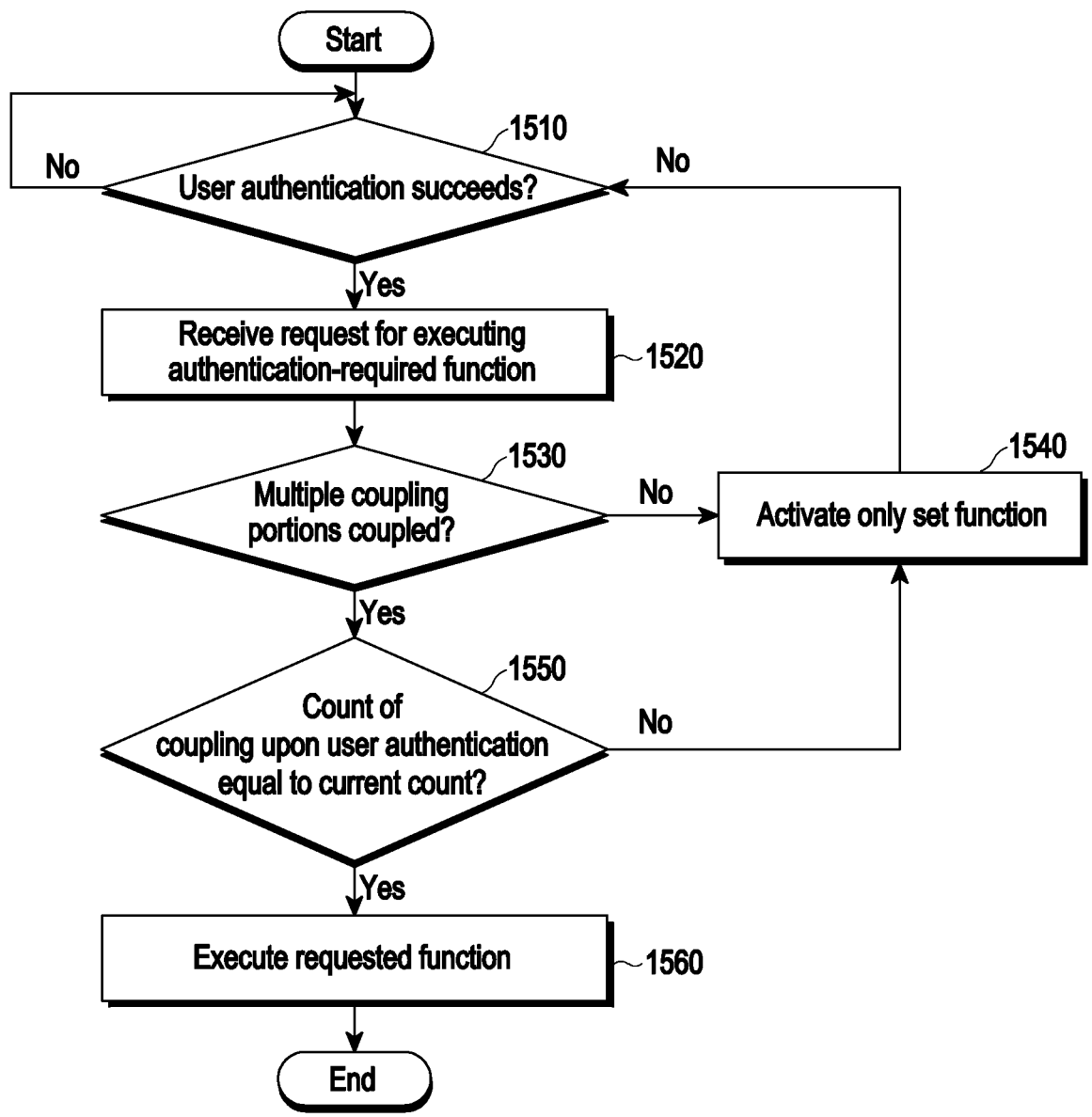
FIG. 40 is a view illustrating an operation of adjusting an exposed portion of a flexible display and rotation of a housing of an electronic device according to an embodiment of the disclosure.

FIG. 40 is a view illustrating an operation of adjusting an exposed portion of a flexible display and rotation of a housing of an electronic device according to an embodiment of the disclosure.

Referring to FIG. 40, if the plurality of coupling portions are coupled to each other, the electronic device may perform the authentication operation in operation 1510. For example, operation 1510 may be the same as operation 1420 of FIG. 39.

According to various embodiments, if user authentication fails (no in operation 1510), the electronic device may perform user authentication again. According to various embodiments, if user authentication fails a set number of times, the electronic device may activate set functions (e.g., clock function) and stop supplying power to the main body (e.g., the main body 1100 of FIG. 31).

According to various embodiments, if user authentication succeeds (yes in operation 1510), the electronic device may receive a request for executing a function requiring authentication in operation 1520. For example, in a state in which user authentication succeeds, the electronic device may receive a request for executing a function requiring user authentication.

According to various embodiments, in operation 1530, the electronic device may detect mutual coupling of the plurality of coupling portions. For example, the electronic device may detect mutual coupling of the plurality of coupling portions based on detection of approach of the magnet provided in at least one of the plurality of coupling portions through a hall IC provided in one of the plurality of coupling portions.

According to various embodiments, if the plurality of coupling portions are not coupled to each other (no in operation 1530), the electronic device may activate only set functions in operation 1540. For example, the electronic device may activate only the clock function.

According to various embodiments, in a state in which only the clock function has been activated, the electronic device may return to operation 1510 to perform the user authentication operation again.

According to various embodiments, if the plurality of coupling portions are coupled to each other (yes in operation 1530), the electronic device may identify whether the coupling count at the time of user authentication is identical to the current count in operation 1550. For example, the coupling count may be information related to how many times the plurality of coupling portions have been coupled to each other and, whenever the plurality of coupling portions are coupled to each other, the coupling count may increment.

For example, the electronic device may compare the coupling count at the time of success in authentication according to operation 1510 with the current coupling count and, if different (no in operation 1550), identify that the user authentication for the current coupling count is in the unauthenticated state. According to various embodiments, if the coupling counts differ from each other, the electronic device may activate only set functions in operation 1540.

According to various embodiments, the electronic device may compare the coupling count at the time of success in authentication according to operation 1510 with the current coupling count and, if the same (yes in operation 1550), identify that the user authentication for the current coupling count is in the state in which user authentication succeeds. According to various embodiments, in operation 1560, the electronic device may execute the requested function. For example, if the coupling counts are the same, the electronic device may request to execute a function requiring authentication without additional authentication.

Figure 41:
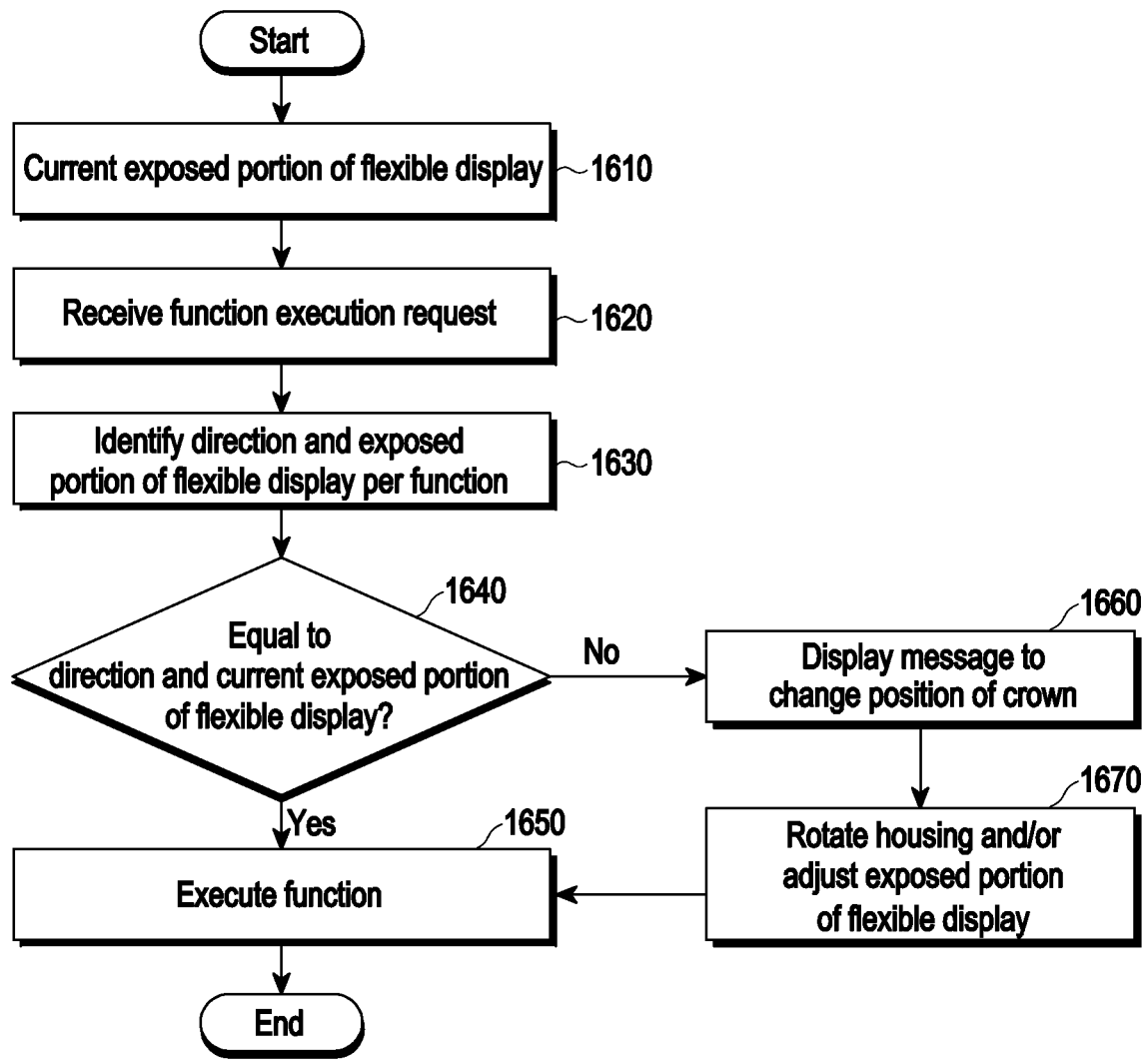
FIG. 41 is a view illustrating an operation of controlling an exposed portion of a flexible display and rotation of a housing of an electronic device according to a function according to an embodiment of the disclosure.

FIG. 41 is a view illustrating an operation of controlling an exposed portion of a flexible display and rotation of a housing of an electronic device according to a function according to an embodiment of the disclosure. FIG. 41 may illustrate, e.g., operations after the plurality of coupling portions (e.g., the plurality of coupling portions 1230 of FIG. 31) are coupled to each other and the user authentication operation succeeds.

According to various embodiments, in operation 1610, the electronic device (e.g., the electronic device 101 of FIG. 1, the processor 1130 of FIG. 32, or the processor 1130 of FIG. 33) may identify the current exposed portion and current direction of the flexible display (e.g., the display module 160 of FIG. 1 or the flexible display 1120 of FIG. 31). For example, the current direction of the flexible display may be the direction of the housing (e.g., the housing 1110 of FIG. 31).

According to various embodiments, in operation 1620, the electronic device may receive a function execution request. For example, the function execution request may include an application execution request, a payment function execution request, or a video playback request.

According to various embodiments, in operation 1630, the electronic device may identify the exposed portion and direction of the flexible display for each function. For example, the electronic device may identify the direction of the housing and the exposed portion of the flexible display based on at least one of the size, ratio, or direction of the screen appropriate for the function requested to be executed.

According to various embodiments, in operation 1640, the electronic device may determine whether they are the same as the current exposed portion and direction of the flexible display.

For example, if the current exposed portion and direction of the flexible display are the same as the exposed portion and direction of the flexible display corresponding to the function requested to be executed (yes in operation 1640), the electronic device may execute the requested function in operation 1650.

According to various embodiments, if the current exposed portion and direction of the flexible display differs from the exposed portion and direction of the flexible display corresponding to the function requested to be executed (no in operation 1640), the electronic device may display a crown position change message in operation 1660. For example, the electronic device may identify one mode among a first mode for rotating the housing to change the current exposed portion and direction of the flexible display to correspond to the exposed portion and direction of the flexible display corresponding to the function requested to be executed, a second mode for adjusting the exposed portion of the flexible display, or a third mode for adjusting the exposed portion of the flexible display and rotating the housing.

According to various embodiments, when the current position of the crown differs from the position of the crown corresponding to the identified mode, the electronic device may display a crown position change message on the exposed portion of the flexible display to change the position of the crown to the position corresponding to the identified mode.

According to various embodiments, when the electronic device includes the structure of FIG. 8 or when the electronic device includes a rotation shaft (e.g., the rotation shaft 550a of FIG. 14) where a plurality of gear portions for rotation are disposed and a mode change may be automatically performed, operation 1660 may be omitted.

According to various embodiments, upon detecting the position of the crown as the position corresponding to the identified mode, the electronic device may adjust the exposed portion of the flexible display and/or rotate the housing in operation 1670. For example, the electronic device may adjust the exposed portion of the flexible display and/or rotate the housing by rotating the rotation shaft (e.g., the rotation shaft 450a of FIG. 8 or the rotation shaft 550a of FIG. 14) of the driving structure (e.g., the gear structure 450 of FIG. 8 or the gear structure 550 of FIG. 14).

According to various embodiments, when operation 1660 is omitted, if the current exposed portion and direction of the flexible display differs from the exposed portion and direction of the flexible display corresponding to the function requested to be executed (no in operation 1640), the electronic device may rotate the housing and/or adjust the exposed portion of the flexible display.

According to various embodiments, if the housing is rotated and/or the exposed portion of the flexible display is adjusted, the electronic device may execute the requested function in operation 1650.

Figure 42:
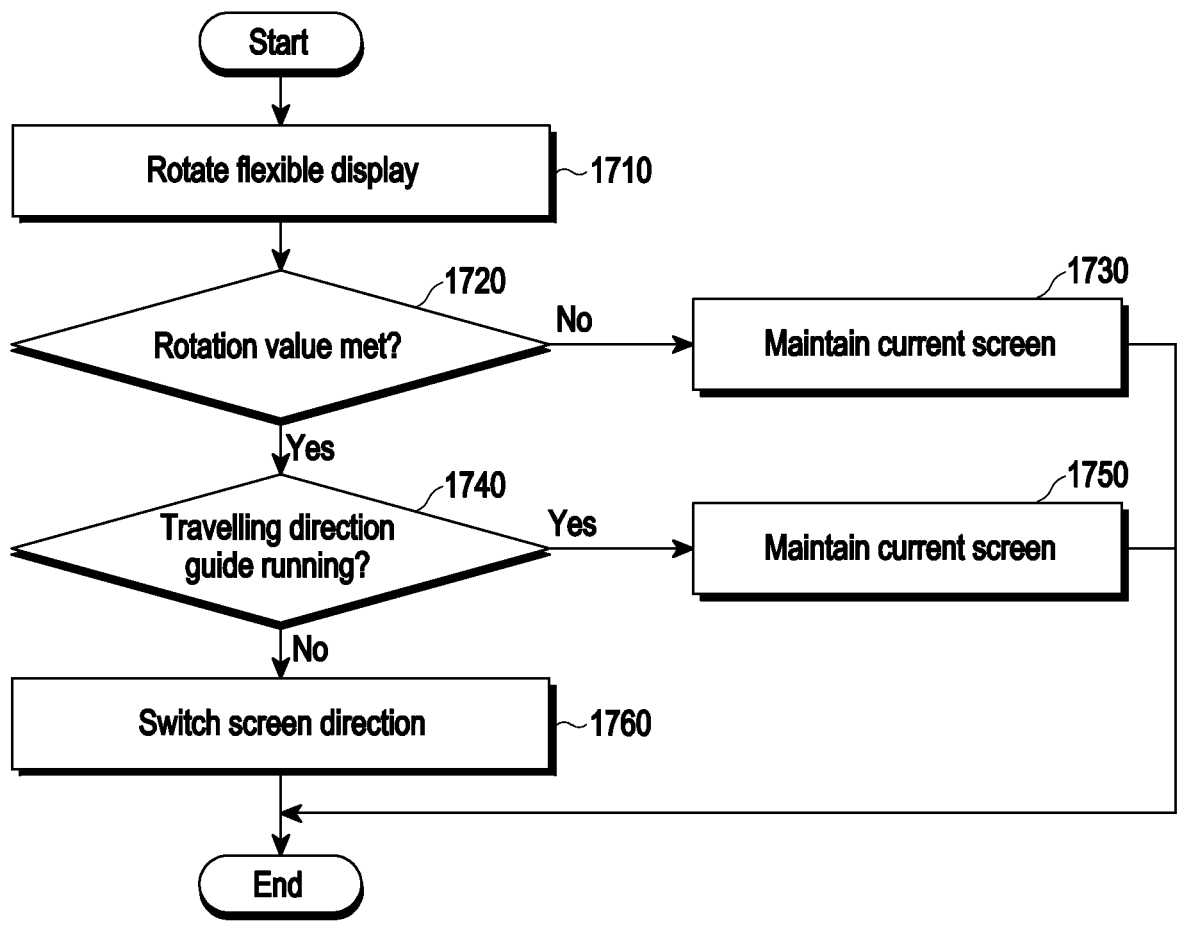
FIG. 42 is a view illustrating an operation of rotating a screen according to a rotation operation of a housing of an electronic device according to an embodiment of the disclosure.

FIG. 42 is a view illustrating an operation of rotating a screen according to a rotation operation of a housing of an electronic device according to an embodiment of the disclosure. FIG. 42 may illustrate, e.g., operations after the plurality of coupling portions (e.g., the plurality of coupling portions 1230 of FIG. 31) are coupled to each other and the user authentication operation succeeds.

According to various embodiments, in operation 1710, the electronic device (e.g., the electronic device 101 of FIG. 1, the processor 1130 of FIG. 32, or the processor 1130 of FIG. 33) may rotate the flexible display (e.g., the display module 160 of FIG. 1 or the flexible display 1120 of FIG. 31). For example, the electronic device may rotate the flexible display by rotating the housing (e.g., the housing 1110 of FIG. 31).

According to various embodiments, in operation 1720, the electronic device may determine whether a rotation value of the flexible display is met. For example, the electronic device may determine whether the rotation value of the flexible display is a threshold or more with respect to the mounting member (e.g., the mounting member 1200 of FIG. 31 or the strap 1210 of FIG. 31). According to various embodiments, the electronic device may obtain the rotation value of the flexible display using at least one sensor (e.g., rotation angle sensor or angular speed sensor) included in the main body (e.g., the main body 1100 of FIG. 31).

Figure 43:
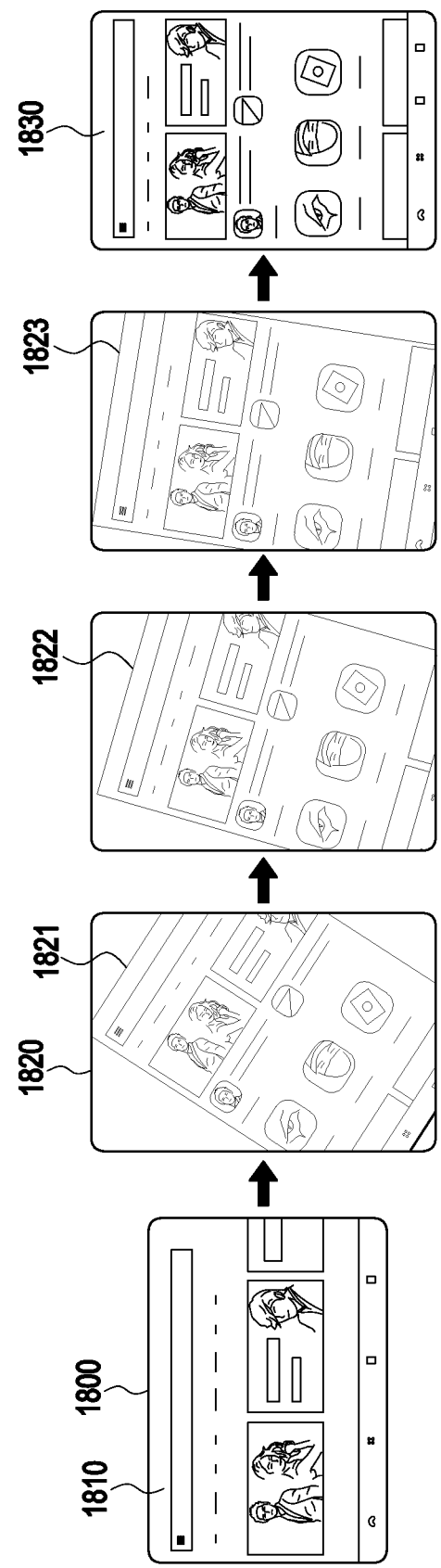
FIG. 43 is a view illustrating an operation of rotating a screen according to a rotation operation of a housing of an electronic device according to an embodiment of the disclosure.

FIG. 43 is a view illustrating an operation of rotating a screen according to a rotation operation of a housing of an electronic device according to an embodiment of the disclosure.

According to various embodiments, if the rotation value of the flexible display is not met (no in operation 1720), the electronic device may maintain the current screen in operation 1730. For example, when the flexible display is in a horizontal direction 1800 as shown in FIG. 43, the electronic device may display content 1810 in a layout based on the horizontal direction on the flexible display. According to various embodiments, when the flexible display is rotated until before reaching the threshold with respect to the mounting member (e.g., the mounting member 1200 of FIG. 31 or the strap 1210 of FIG. 31), the electronic device may maintain the content 1810 in the layout based on the horizontal direction.

According to various embodiments, if the rotation value of the flexible display is met (yes in operation 1720), the electronic device may determine whether a moving direction guide is running. For example, the electronic device may determine whether the moving direction guide according to execution of the navigation function is running.

Figure 47:
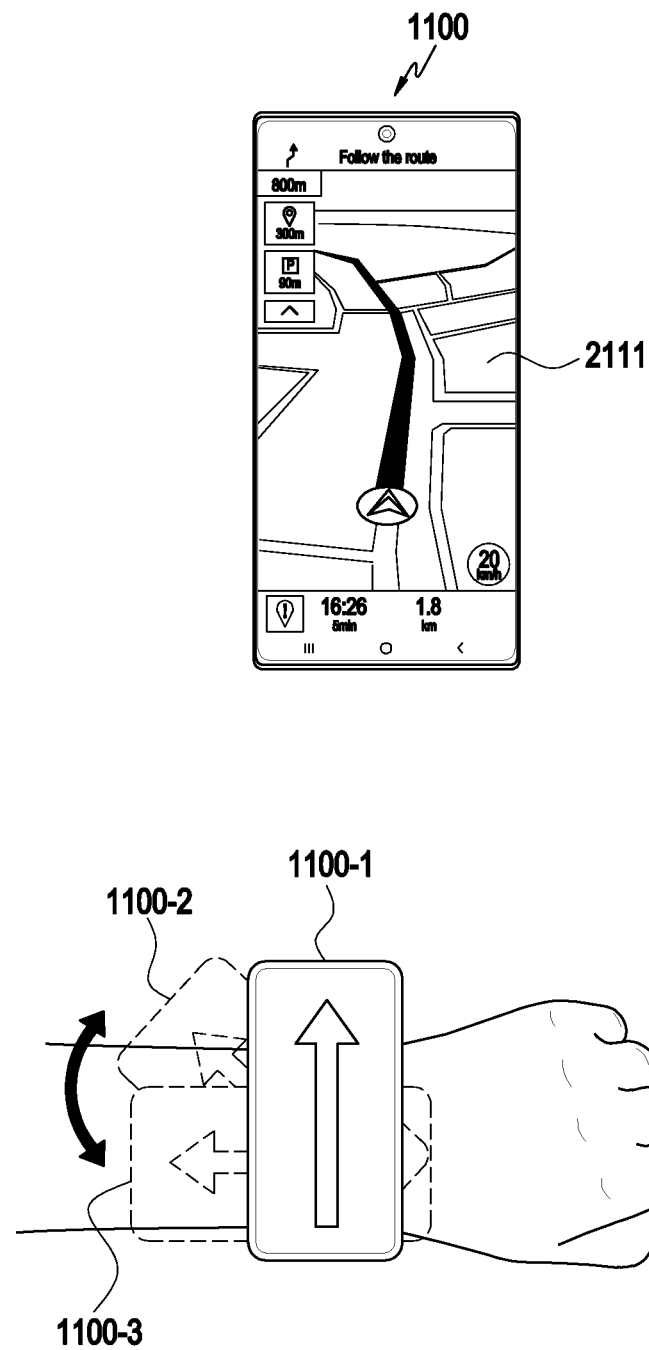
FIG. 47 is a view illustrating an operation of real-time controlling adjustment of an exposed portion of a flexible display and rotation of a housing of an electronic device according to an embodiment of the disclosure.

For example, when the navigation function is running, the flexible display may be rotated in real time based on the moving direction guided, as shown in FIG. 47. In this case, if the layout of the screen is changed, the user may get confused. Thus, if the moving direction guide is running (yes in operation 1740), the electronic device may maintain the current screen in operation 1750.

According to various embodiments, unless the moving direction guide is running (no in operation 1740), the electronic device may switch the direction of the screen in operation 1760. For example, when the flexible display is in a horizontal direction 1800 as shown in FIG. 43, the electronic device may display content 1810 in a layout based on the horizontal direction on the flexible display. According to various embodiments, when the flexible display is rotated by the threshold or more with respect to the mounting member to be positioned in the vertical direction 1820, the electronic device may change the content 1810 in the layout based on the horizontal direction into content 1830 based on in a layout based on the vertical direction and display it.

Referring to FIG. 43, when the content 1810 in the layout based on the horizontal direction is changed into the content 1830 in the layout based on the vertical direction, the electronic device may also display contents 1821, 1822, and 1823 that gradually rotate from the horizontal direction to the vertical direction.

Figure 44:
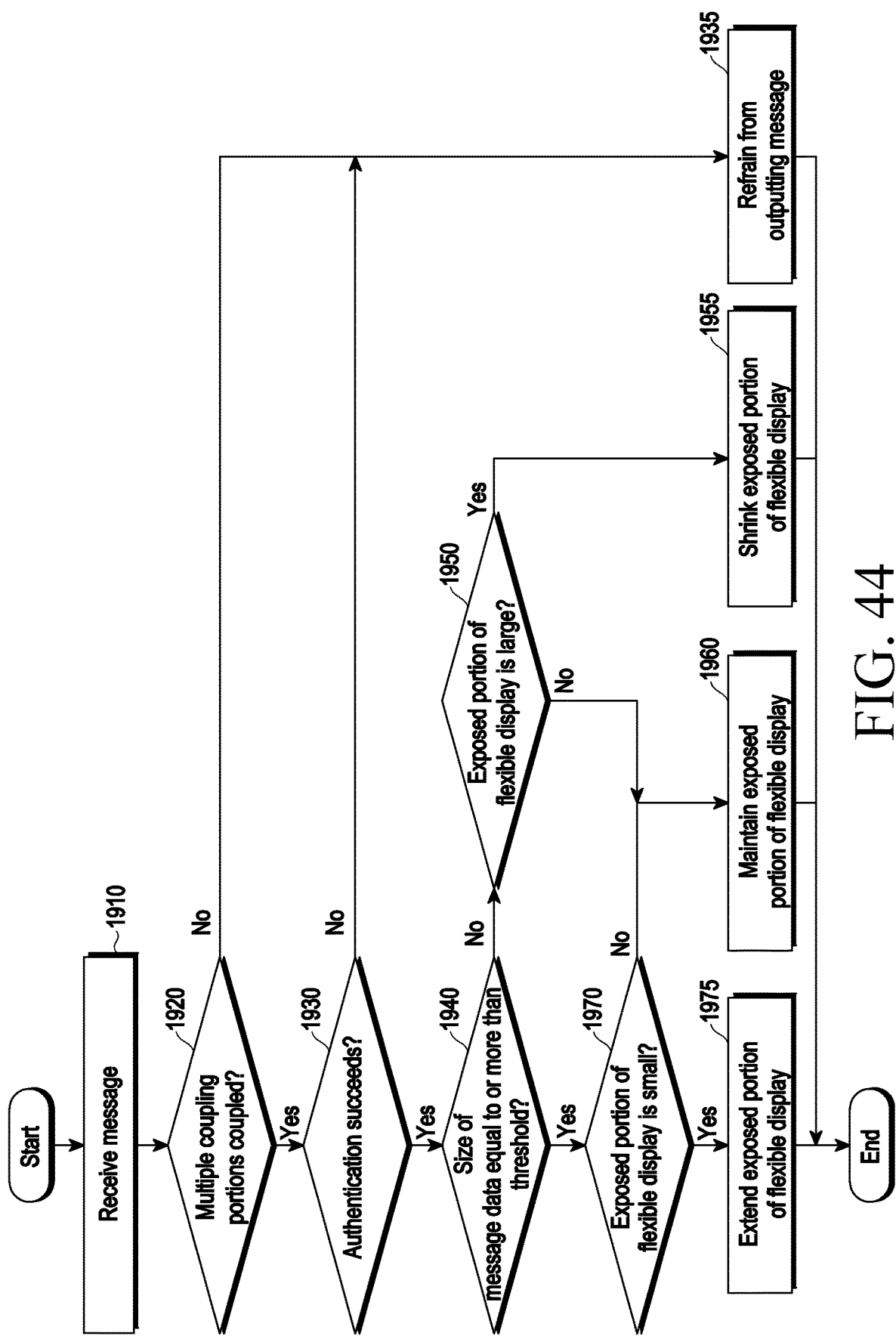
FIG. 44 is a view illustrating an operation of controlling an exposed portion of a flexible display of an electronic device according to an embodiment of the disclosure.

FIG. 44 is a view illustrating an operation of controlling an exposed portion of a flexible display when an electronic device receives a message according to an embodiment of the disclosure.

According to various embodiments, in operation 1910, the electronic device (e.g., the electronic device 101 of FIG. 1, the processor 1130 of FIG. 32, or the processor 1130 of FIG. 33) may receive a message. For example, the electronic device may receive the message through a message application, a chatting application, or an SNS application.

According to various embodiments, in operation 1920, the electronic device may identify whether the plurality of coupling portions (e.g., the plurality of coupling portions 1230 of FIG. 31) are coupled to each other. For example, upon receiving the message, the electronic device may identify whether the plurality of coupling portions are coupled to each other.

According to various embodiments, if it is identified that the plurality of coupling portions are not coupled to each other (no in operation 1920), the electronic device may not output the message in operation 1935.

According to various embodiments, if it is identified that the plurality of coupling portions are coupled to each other (yes in operation 1920), the electronic device may identify whether user authentication succeeds in operation 1930. For example, if it is identified that the plurality of coupling portions are coupled to each other, the electronic device may perform a user authentication operation to identify whether user authentication succeeds. As another embodiment, the electronic device may identify whether user authentication succeeds based on the result of success in user authentication performed before receiving the message. For example, as shown in FIG. 40, if the coupling count at the time of success in user authentication is identical to the current count, the electronic device may identify that user authentication succeeds.

According to various embodiments, if it is identified that user authentication fails (no in operation 1930), the electronic device may not output the message in operation 1935.

According to various embodiments, if it is identified that user authentication succeeds (yes in operation 1930), the electronic device may identify whether the size of the message data is a threshold or more in operation 1940. For example, if the size of the received message data is the threshold or more (no in operation 1940), the electronic device may identify whether the exposed portion of the flexible display (e.g., the display module 160 of FIG. 1 or the flexible display 1120 of FIG. 31) is large in operation 1950. For example, the electronic device may identify whether the exposed portion of the flexible display is large, based on at least one of the size of the received message data, set letter size or the current size, ratio, and direction of the exposed portion of the flexible display.

According to various embodiments, if it is identified that the exposed portion of the flexible display is large (yes in operation 1950), the electronic device may shrink the exposed portion of the flexible display in operation 1955.

According to various embodiments, if it is identified that the exposed portion of the flexible display is not large (no in operation 1950), the electronic device may maintain the exposed portion of the flexible display in operation 1960.

According to various embodiments, if the size of the received message data is less than the threshold (yes in operation 1940), the electronic device may identify whether the exposed portion of the flexible display is small in operation 1970. For example, the electronic device may identify whether the exposed portion of the flexible display is small, based on at least one of the size of the received message data, set letter size or the current size, ratio, and direction of the exposed portion of the flexible display.

According to various embodiments, if it is identified that the exposed portion of the flexible display is small (yes in operation 1970), the electronic device may extend the exposed portion of the flexible display in operation 1975. Although not shown, the electronic device may display at least a portion of the received message after operation 1955, 1960, or 1975.

According to various embodiments, if it is identified that the exposed portion of the flexible display is not small (no in operation 1970), the electronic device may maintain the exposed portion of the flexible display in operation 1960.

Figure 45:
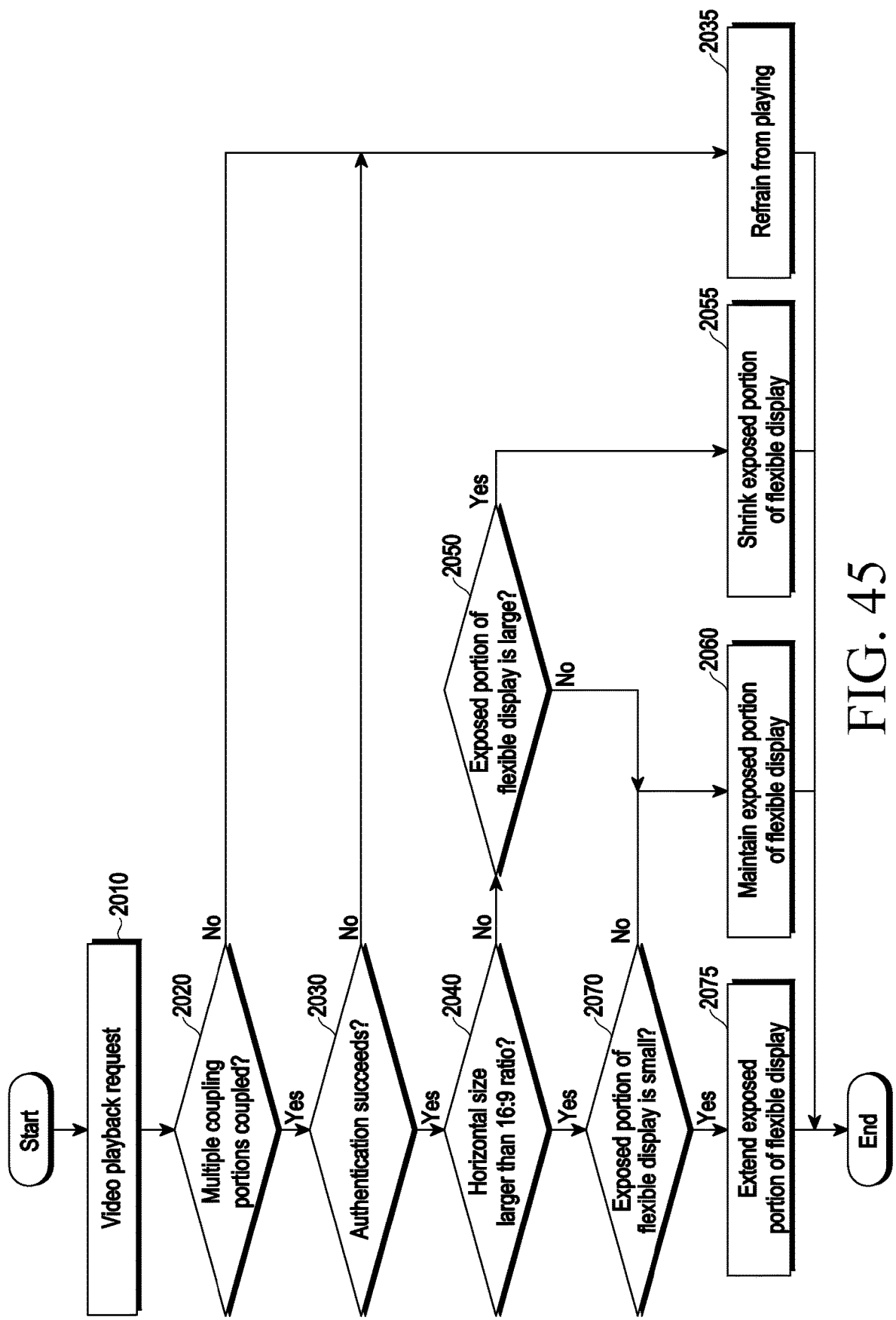
FIG. 45 is a view illustrating an operation of controlling an exposed portion of a flexible display of an electronic device according to an embodiment of the disclosure.

FIG. 45 is a view illustrating an operation of controlling an exposed portion of a flexible display when an electronic device receives a video playback request according to an embodiment of the disclosure.

According to various embodiments, in operation 2010, the electronic device (e.g., the electronic device 101 of FIG. 1, the processor 1130 of FIG. 32, or the processor 1130 of FIG. 33) may receive a request for playing video. For example, the electronic device may receive a request for playing video through the flexible display (e.g., the display module 160 of FIG. 1 or the flexible display 1120 of FIG. 31) or may receive a request for playing video from an external device connected with the electronic device.

According to various embodiments, in operation 2020, the electronic device may identify whether the plurality of coupling portions (e.g., the plurality of coupling portions 1230 of FIG. 31) are coupled to each other. For example, upon receiving the video playback request, the electronic device may identify whether the plurality of coupling portions are coupled to each other.

According to various embodiments, if it is identified that the plurality of coupling portions are not coupled to each other (no in operation 2020), the electronic device may not play video in operation 2035.

According to various embodiments, if it is identified that the plurality of coupling portions are coupled to each other (yes in operation 2020), the electronic device may identify whether user authentication succeeds in operation 2030. For example, if it is identified that the plurality of coupling portions are coupled to each other, the electronic device may perform a user authentication operation to identify whether user authentication succeeds. As another embodiment, the electronic device may identify whether user authentication succeeds based on the result of success in user authentication performed before receiving the video playback request. For example, as shown in FIG. 40, if the coupling count at the time of success in user authentication is identical to the current count, the electronic device may identify that user authentication succeeds.

According to various embodiments, if it is identified that user authentication fails (no in operation 2030), the electronic device may not play video in operation 2035.

According to various embodiments, if it is identified that user authentication succeeds (yes in operation 2030), the electronic device may identify whether the horizontal size of the flexible display is larger than a set horizontal-vertical ratio in operation 2040. For example, the electronic device may identify whether the horizontal size of the flexible display is larger than 16:9 (horizontal:vertical).

For example, if the horizontal size of the flexible display is not larger than the set horizontal-vertical ratio (no in operation 2040), the electronic device may identify whether the exposed portion of the flexible display is large in operation 2050. For example, the electronic device may identify whether the exposed portion of the flexible display is large, based on at least one of the size of the video, the resolution of the video, or the current size, ratio, and direction of the exposed portion of the flexible display.

According to various embodiments, if it is identified that the exposed portion of the flexible display is large (yes in operation 2050), the electronic device may shrink the exposed portion of the flexible display in operation 2055.

According to various embodiments, if it is identified that the exposed portion of the flexible display is not large (no in operation 2050), the electronic device may maintain the exposed portion of the flexible display in operation 2060.

According to various embodiments, if the horizontal size of the flexible display is larger than the set horizontal-vertical ratio (yes in operation 2040), the electronic device may identify whether the exposed portion of the flexible display is small in operation 2070. For example, the electronic device may identify whether the exposed portion of the flexible display is small, based on at least one of the size of the video, the resolution of the video, or the current size, ratio, and direction of the exposed portion of the flexible display.

According to various embodiments, if it is identified that the exposed portion of the flexible display is small (yes in operation 2070), the electronic device may extend the exposed portion of the flexible display in operation 2075. Although not shown, the electronic device may display at least a portion of the video after operation 2055, 2060, or 2075.

According to various embodiments, if it is identified that the exposed portion of the flexible display is not small (no in operation 2070), the electronic device may maintain the exposed portion of the flexible display in operation 2060.

Figure 46:
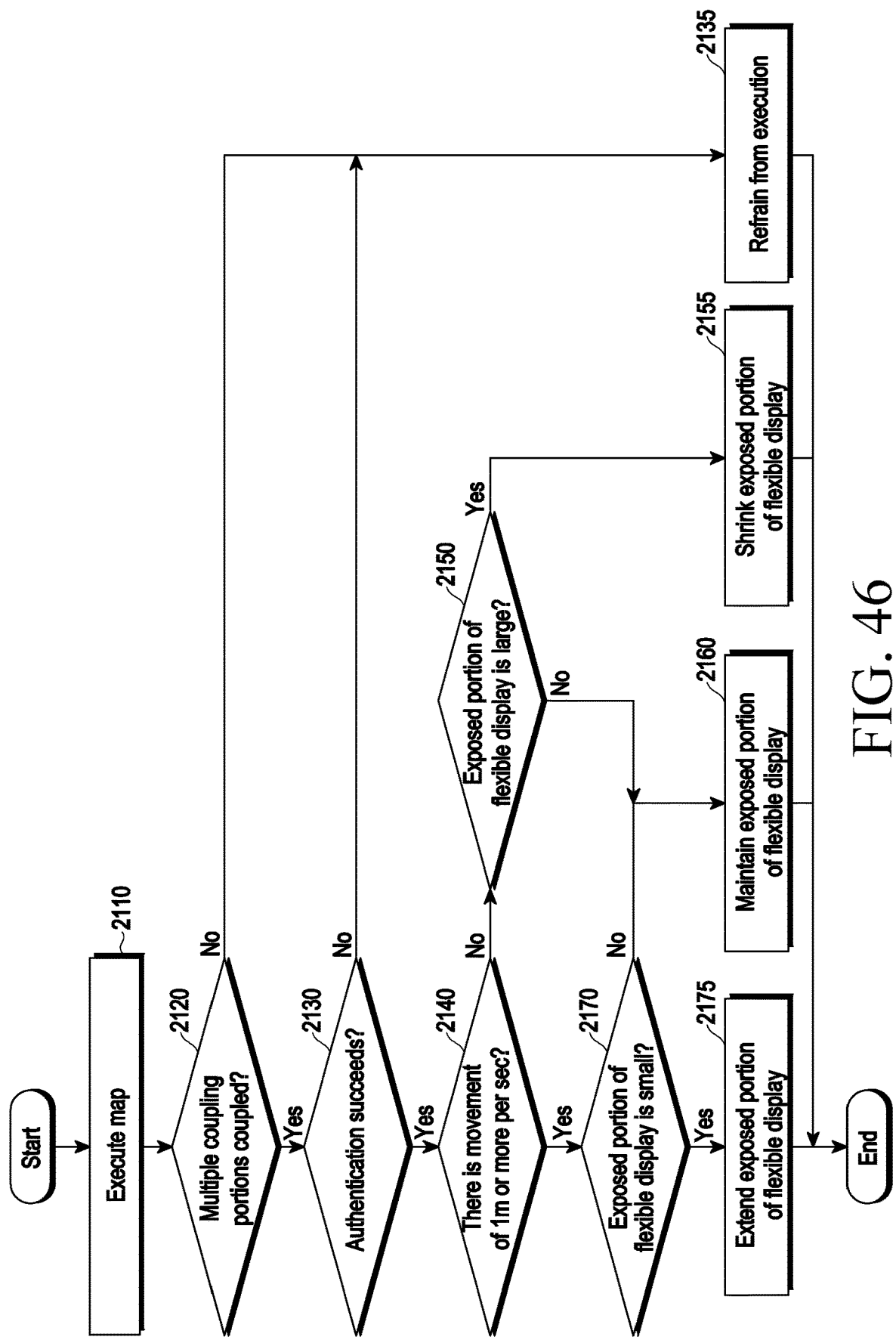
FIG. 46 is a view illustrating an operation of controlling an exposed portion of a flexible display of an electronic device according to an embodiment of the disclosure.

FIG. 46 is a view illustrating an operation of controlling an exposed portion of a flexible display when an electronic device executes a map application according to an embodiment of the disclosure.

According to various embodiments, in operation 2110, the electronic device (e.g., the electronic device 101 of FIG. 1, the processor 1130 of FIG. 32, or the processor 1130 of FIG. 33) may execute a map application. For example, the electronic device may display the execution screen of the map application through the flexible display (e.g., the display module 160 of FIG. 1 or the flexible display 1120 of FIG. 31).

According to various embodiments, in operation 2120, the electronic device may identify whether the plurality of coupling portions (e.g., the plurality of coupling portions 1230 of FIG. 31) are coupled to each other. For example, if the map application is executed, the electronic device may identify whether the plurality of coupling portions are coupled to each other.

According to various embodiments, if it is identified that the plurality of coupling portions are not coupled to each other (no in operation 2120), the electronic device may not execute the map application in operation 2135.

According to various embodiments, if it is identified that the plurality of coupling portions are coupled to each other (yes in operation 2120), the electronic device may identify whether user authentication succeeds in operation 2130. For example, if it is identified that the plurality of coupling portions are coupled to each other, the electronic device may perform a user authentication operation to identify whether user authentication succeeds. As another embodiment, the electronic device may identify whether user authentication succeeds based on the result of success in user authentication performed before executing the map application. For example, as shown in FIG. 40, if the coupling count at the time of success in user authentication is identical to the current count, the electronic device may identify that user authentication succeeds.

According to various embodiments, if it is identified that user authentication fails (no in operation 2130), the electronic device may not execute the map application in operation 2135.

According to various embodiments, if it is identified that user authentication succeeds (yes in operation 2130), the electronic device may identify whether there is a movement at a set speed or more in operation 2140. For example, the electronic device may identify whether there is a movement at one meter or more per second using the speed sensor or acceleration sensor.

For example, if the movement of the electronic device is a movement at less than a set speed (no in operation 2140), the electronic device may identify whether the exposed portion of the flexible display is large in operation 2150. For example, the electronic device may identify whether the exposed portion of the flexible display is large, based on at least one of the speed of the electronic device, the size of the map to be displayed or the current size, ratio, and direction of the exposed portion of the flexible display.

According to various embodiments, if it is identified that the exposed portion of the flexible display is large (yes in operation 2150), the electronic device may shrink the exposed portion of the flexible display in operation 2155.

According to various embodiments, if it is identified that the exposed portion of the flexible display is not large (no in operation 2150), the electronic device may maintain the exposed portion of the flexible display in operation 2160.

According to various embodiments, if the movement of the electronic device is a movement at the set speed or more (yes in operation 2140), the electronic device may identify whether the exposed portion of the flexible display is small in operation 2170. For example, the electronic device may identify whether the exposed portion of the flexible display is small, based on at least one of the speed of the electronic device, the size of the map to be displayed or the current size, ratio, and direction of the exposed portion of the flexible display.

According to various embodiments, if it is identified that the exposed portion of the flexible display is small (yes in operation 2170), the electronic device may extend the exposed portion of the flexible display in operation 2175. Although not shown, the electronic device may display at least a portion of the execution screen of the map application after operation 2155, 2160, or 2175.

According to various embodiments, if it is identified that the exposed portion of the flexible display is not small (no in operation 2170), the electronic device may maintain the exposed portion of the flexible display in operation 2160.

FIG. 47 is a view illustrating an operation of real-time controlling adjustment of an exposed portion of a flexible display and rotation of a housing of an electronic device according to an embodiment of the disclosure.

According to various embodiments, the electronic device (e.g., the electronic device 101 of FIG. 1, the processor 1130 of FIG. 32, or the processor 1130 of FIG. 33) may display an execution screen 2111 of a map application on the flexible display (e.g., the display module 160 of FIG. 1 or the flexible display 1120 of FIG. 31) of the main body 1100 (e.g., the main body 1100 of FIG. 31).

According to various embodiments, the electronic device may rotate the flexible display according to the execution screen of the map application. For example, the electronic device may rotate the housing (e.g., the housing 1110 of FIG. 31) according to the execution screen of the map application, rotating the flexible display.

For example, the electronic device may rotate the main body 1100 based on the guide direction provided from the map application. For example, if the guide direction is a straight direction, the electronic device may display the execution screen of the map application on the flexible display in a state 1100-1 in which the main body 1100 is in the same direction as the mounting member (e.g., the mounting member 1200 of FIG. 31).

As another embodiment, if the guide direction is a diagonal direction, the electronic device may display the execution screen of the map application on the flexible display in a state 1100-2 in which the main body 1100 is rotated about 45 degrees counterclockwise with respect to the mounting member.

As another embodiment, if the guide direction is a left turn direction, the electronic device may display the execution screen of the map application on the flexible display in a state 1100-3 in which the main body 1100 is rotated about 90 degrees counterclockwise with respect to the mounting member.

According to various embodiments, the electronic device may rotate the main body 1100 clockwise based on the guide direction.

According to various embodiments, if the moving distance is long until next direction information is provided, the electronic device may extend the exposed portion of the flexible display and, as the moving distance reduces until the direction information is provided, gradually shrink the exposed portion of the flexible display.

As described above, the electronic device may perform, in real time, at least one of rotation of the main body 1100 or change of the exposed portion of the flexible display based on the guide direction, thereby providing moving direction and distance information to the user more intuitively.

Referring to FIGS. 44 to 47 disclose operations of the electronic device according to reception of a message, reception of a video playback request, or execution of the map application, embodiments of the disclosure are not limited thereto, and the operations shown in at least one of FIGS. 44 to 47 may be performed according to settings even when a different function included in the electronic device is executed.

FIGS. 48A, 48B, 48C, and 48D are views illustrating an operation of displaying content according to an exposed portion of a flexible display according to various embodiments of the disclosure. For example, FIGS. 48A to 48D illustrate various embodiments of the screen of executing the clock function.

Figure 48A:
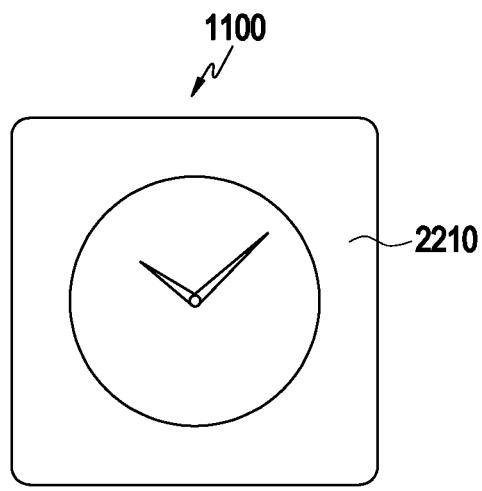
FIG. 48A is a view illustrating an operation of displaying content according to an exposed portion of a flexible display according to an embodiment of the disclosure.

Referring to FIG. 48A, when the flexible display (e.g., the display module 160 of FIG. 1 or the flexible display 1120 of FIG. 31) of the main body 1100 (e.g., the main body 1100 of FIG. 31) is in a non-extended, normal state (e.g., the normal state 1101 of FIG. 35), the electronic device (e.g., the electronic device 101 of FIG. 1, the processor 1130 of FIG. 32, or the processor 1130 of FIG. 33) may display an analog clock screen 2210 according to the settings.

Figure 48B:
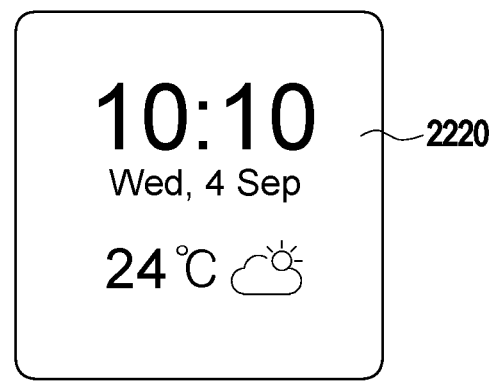
FIG. 48B is a view illustrating an operation of displaying content according to an exposed portion of a flexible display according to an embodiment of the disclosure.

Referring to FIG. 48B, the electronic device may display a digital clock screen 2220 according to the settings. According to various embodiments, the digital clock screen 2220 may further include at least one of date information or weather information.

Figure 48C:
FIG. 48C is a view illustrating an operation of displaying content according to an exposed portion of a flexible display according to an embodiment of the disclosure.

Referring to FIG. 48C, when the flexible display of the main body 1100 is in a horizontally extended state (e.g., the extended state 1102 of FIG. 35), the electronic device may display a screen 2230 in which screens where a plurality of functions are performed are arranged left and right. According to various embodiments, the flexible display of the main body 1100 may be automatically or manually extended. For example, when the flexible display is in a horizontally extended state, the electronic device may display a screen in which the analog clock screen and the digital clock screen are arranged left and right according to the settings.

Figure 48D:
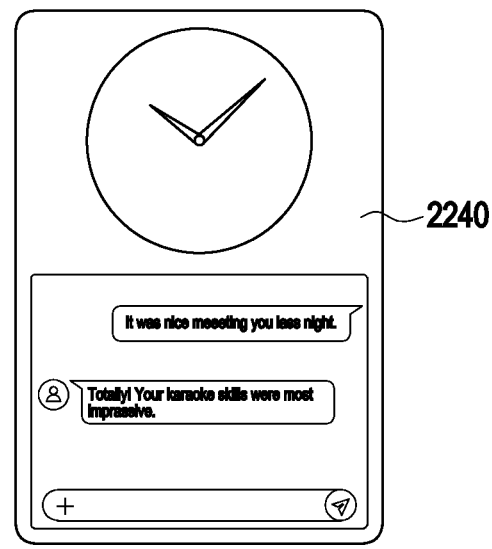
FIG. 48D is a view illustrating an operation of displaying content according to an exposed portion of a flexible display according to an embodiment of the disclosure.

Referring to FIG. 48D, when the flexible display of the main body 1100 is in a vertically extended state (e.g., the extended and rotated state 1104 of FIG. 35), the electronic device may display a screen 2240 in which screens where a plurality of functions are performed are arranged up and down. According to various embodiments, the flexible display of the main body 1100 may be automatically or manually extended. For example, when the flexible display is in a vertically extended state, the electronic device may display a screen in which an analog watch screen and a messenger application execution screen are arranged up and down according to a setting. FIGS. 48A to 48D illustrate two functions as the plurality of functions, but the plurality of functions may be three or more functions.

FIGS. 48A to 48D illustrate layouts of an execution screen of a function (e.g., content) according to the extended or rotated state of the main body 1100 of the electronic device. According to various embodiments, the executed function is not limited thereto, and at least one of a calendar function, a messenger application execution function, a health information display function, or an application shortcut function may be included.

Figure 49A:
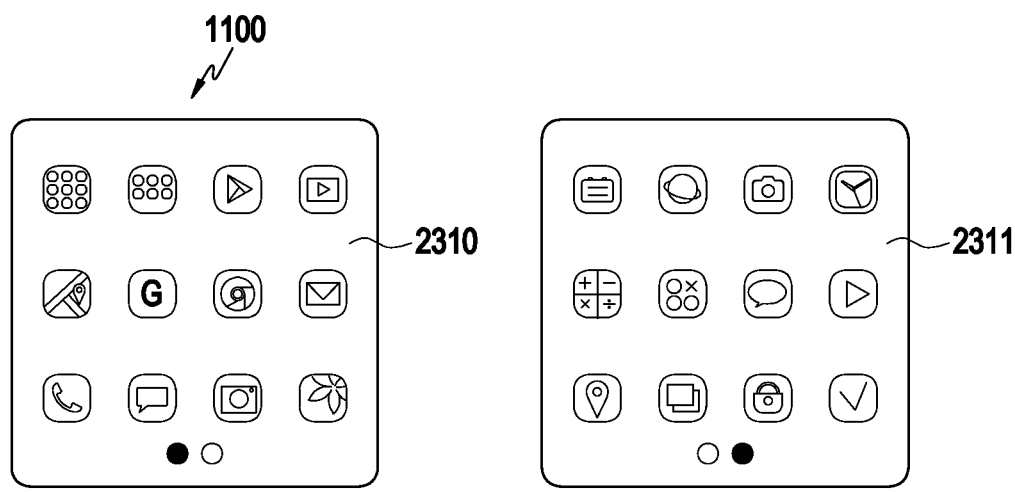
FIG. 49A is a view illustrating an operation of displaying content according to an exposed portion of a flexible display according to an embodiment of the disclosure.
Figure 49B:
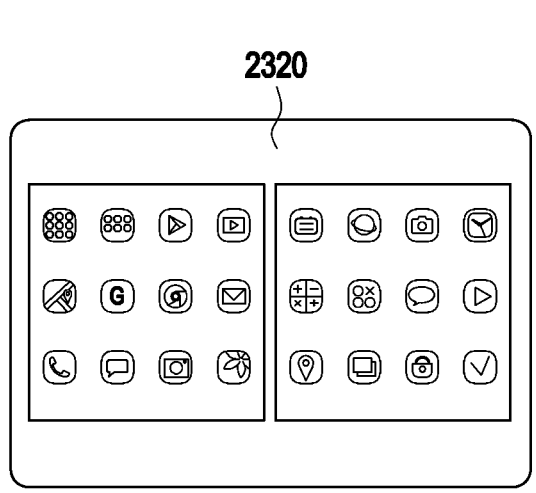
FIG. 49B is a view illustrating an operation of displaying content according to an exposed portion of a flexible display according to an embodiment of the disclosure.
Figure 49C:
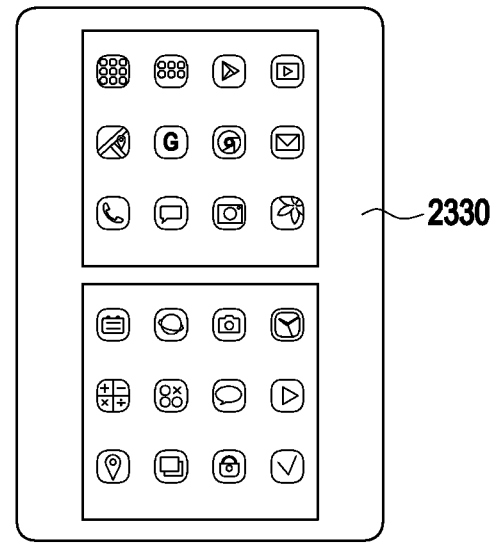
FIG. 49C is a view illustrating an operation of displaying content according to an exposed portion of a flexible display according to an embodiment of the disclosure.

FIGS. 49A, 49B, and 49C are views illustrating an operation of displaying content according to an exposed portion of a flexible display according to various embodiments of the disclosure. For example, various embodiments of a screen for displaying a plurality of applications installed on the electronic device are illustrated.

Referring to FIG. 49A, when the flexible display (e.g., the display module 160 of FIG. 1 or the flexible display 1120 of FIG. 31) of the main body 1100 (e.g., the main body 1100 of FIG. 31) is in a non-extended, default state (e.g., the normal state 1101 of FIG. 35), the electronic device (e.g., the electronic device 101 of FIG. 1, the processor 1130 of FIG. 32, or the processor 1130 of FIG. 33) may display installed applications through a plurality of pages if the applications are not displayed on one screen. For example, the electronic device may display a first screen 2310 which displays some of the plurality of applications or a second screen 2311 which displays remaining some of the plurality of applications. According to various embodiments, a switch between the first screen 2310 or the second screen 2311 may be performed through selection of an object for page switch, a drag input, or a flick input.

Referring to FIG. 49B, when the flexible display of the main body 1100 is in a horizontally extended state (e.g., the extended state 1102 of FIG. 35), the electronic device may display a screen 2320 in which some of the plurality of pages are arranged left and right. According to various embodiments, the flexible display of the main body 1100 may be automatically or manually extended. For example, when the flexible display is in a horizontally extended state, the electronic device may display a screen in which the first screen 2310 and the second screen 2311 shown in FIG. 49A are arranged left and right.

Referring to FIG. 49C, when the flexible display of the main body 1100 is in a vertically extended state (e.g., the extended and rotated state 1104 of FIG. 35), the electronic device may display a screen 2330 in which some of the plurality of pages are arranged up and down. According to various embodiments, the flexible display of the main body 1100 may be automatically or manually extended. For example, when the flexible display is in a vertically extended state, the electronic device may display a screen in which the first screen 2310 and the second screen 2311 shown in FIG. 49A are arranged up and down.

FIGS. 49A to 49C illustrate two pages as the plurality of pages, but the plurality of pages may be three or more pages according to various embodiments of the disclosure.

FIGS. 49A to 49C illustrate a layout of an execution screen of a function (e.g., content) according to the extended or rotated state of the main body 1100 of the electronic device and, according to various embodiments, the executed function is not limited thereto.

FIGS. 50A, 50B, 50C, and 50D are views illustrating an operation of displaying content according to an exposed portion of a flexible display according to various embodiments of the disclosure. For example, FIGS. 50A to 50D illustrate various embodiments of a screen where a video playback function is performed.

Figure 50A:
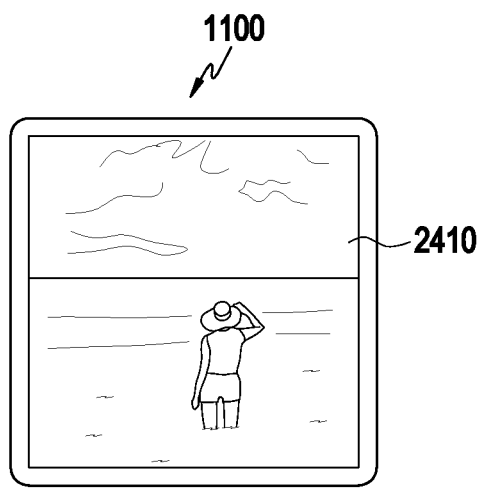
FIG. 50A is a view illustrating an operation of displaying content according to an exposed portion of a flexible display according to an embodiment of the disclosure.

Referring to FIG. 50A, when the flexible display (e.g., the display module 160 of FIG. 1 or the flexible display 1120 of FIG. 31) of the main body 1100 (e.g., the main body 1100 of FIG. 31) is in a non-extended, default state (e.g., the normal state 1101 of FIG. 35), the electronic device (e.g., the electronic device 101 of FIG. 1, the processor 1130 of FIG. 32, or the processor 1130 of FIG. 33) may display a video playback screen 2410.

Figure 50B:
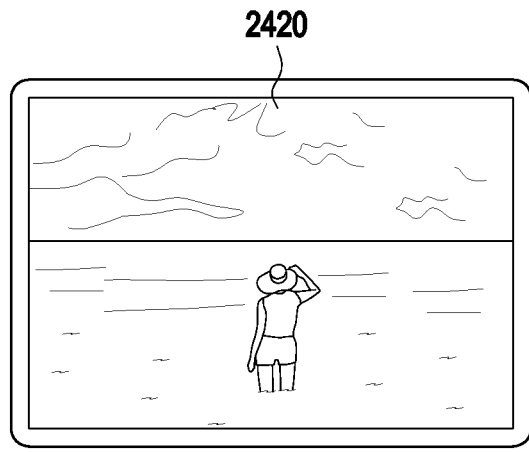
FIG. 50B is a view illustrating an operation of displaying content according to an exposed portion of a flexible display according to an embodiment of the disclosure.

Referring to FIG. 50B, when the flexible display of the main body 1100 is in a horizontally extended state (e.g., the extended state 1102 of FIG. 35), the electronic device may display a video playback screen 2420 enlarged to fit the exposed portion of the extended flexible display. According to various embodiments, the flexible display of the main body 1100 may be automatically or manually extended.

Figure 50C:
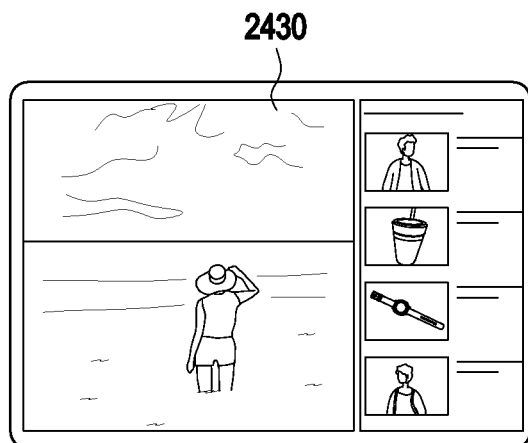
FIG. 50C is a view illustrating an operation of displaying content according to an exposed portion of a flexible display according to an embodiment of the disclosure.

Referring to FIG. 50C, when the flexible display of the main body 1100 is in a horizontally extended state (e.g., the extended state 1102 of FIG. 35), the electronic device may display a screen 2430 in which screens where a plurality of functions are performed are arranged left and right. According to various embodiments, the flexible display of the main body 1100 may be automatically or manually extended. For example, when the flexible display is in a horizontally extended state, the electronic device may arrange and display a video playback screen and a screen where a function different from video playback is performed, left and right, according to a setting. According to various embodiments, the function different from video playback may be a video-related list display function, a video-related comment display function, or a function irrelevant to video.

According to various embodiments, if the flexible display is automatically or manually extended horizontally (or vertically extended and rotated) while displaying a video playback screen 2410 in the default state shown in FIG. 50A, the electronic device may display an enlarged video playback screen 2420 as shown in FIG. 50B and, upon receiving a request for performing the different function from video playback, display a screen 2430 in which screens where a plurality of functions are performed are arranged left and right as shown in FIG. 50C.

As another embodiment, if the flexible display is automatically or manually extended horizontally while displaying a video playback screen 2410 in the default state shown in FIG. 50A, the electronic device may display a screen 2430 in which screens where a plurality of functions are performed are arranged left and right as shown in FIG. 50C according to a setting.

Figure 50D:
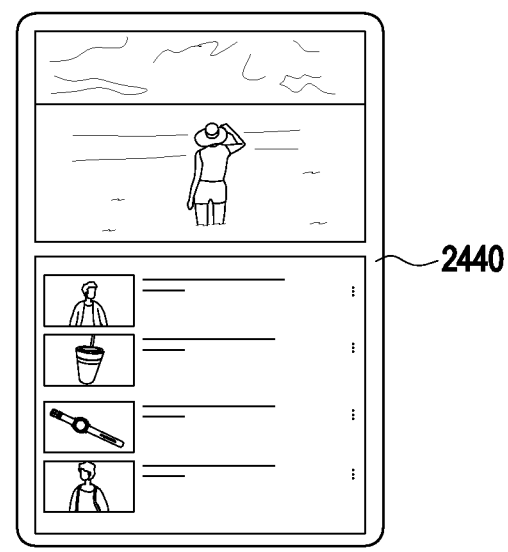
FIG. 50D is a view illustrating an operation of displaying content according to an exposed portion of a flexible display according to an embodiment of the disclosure.

Referring to FIG. 50D, when the flexible display of the main body 1100 is in a vertically extended state (e.g., the extended and rotated state 1104 of FIG. 35), the electronic device may display a screen 2440 in which screens where a plurality of functions are performed are arranged up and down. According to various embodiments, the flexible display of the main body 1100 may be automatically or manually extended. For example, when the flexible display is in a vertically extended state, the electronic device may arrange and display a video playback screen and a screen where a function different from video playback is performed, up and down, according to a setting. According to various embodiments, the function different from video playback may be a video-related list display function, a video-related comment display function, or a function irrelevant to video.

According to various embodiments, if the flexible display is automatically or manually extended horizontally while displaying a video playback screen 2410 in the default state shown in FIG. 50A, the electronic device may display an enlarged video playback screen 2420 as shown in FIG. 50B and, if the flexible display is automatically or manually rotated, display a screen 2440 in which screens where a plurality of functions are performed are arranged up and down as shown in FIG. 50D.

As another embodiment, if the flexible display is automatically or manually extended vertically while displaying a video playback screen 2410 in the default state shown in FIG. 50A, the electronic device may display a screen 2440 in which screens where a plurality of functions are performed are arranged up and down as shown in FIG. 50D according to a setting. FIGS. 50A to 50D illustrate two functions as the plurality of functions, but the plurality of functions may be three or more functions.

FIGS. 50A to 50D illustrate layouts of an execution screen of a function (e.g., content) according to the extended or rotated state of the main body 1100 of the electronic device and, according to various embodiments, the executed function is not limited thereto.

Figure 51C:
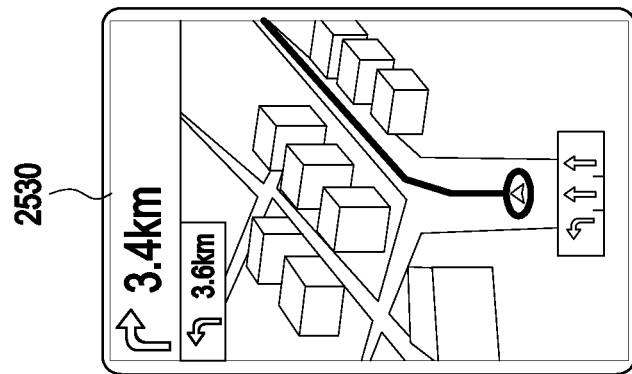
FIG. 51C is a view illustrating an operation of displaying content according to an exposed portion of a flexible display according to an embodiment of the disclosure.
Figure 51B:
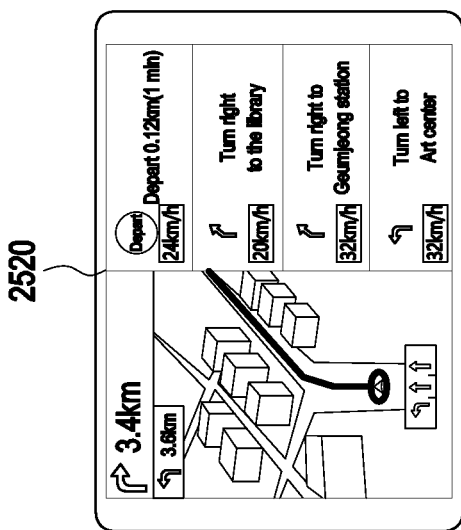
FIG. 51B is a view illustrating an operation of displaying content according to an exposed portion of a flexible display according to an embodiment of the disclosure.
Figure 51A:
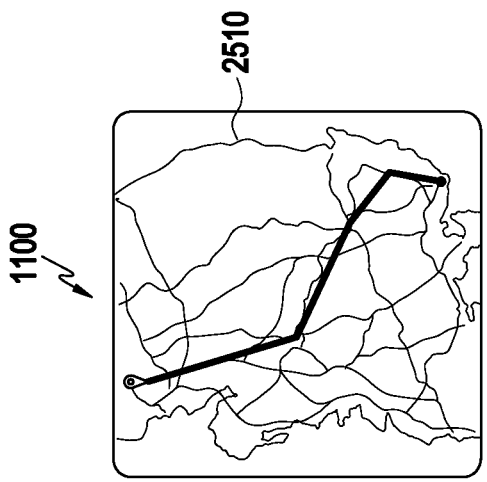
FIG. 51A is a view illustrating an operation of displaying content according to an exposed portion of a flexible display according to an embodiment of the disclosure.

FIGS. 51A to 51C are views illustrating an operation of displaying content according to an exposed portion of a flexible display according to various embodiments of the disclosure. For example, FIGS. 51A to 51C illustrate various embodiments of an execution screen of a map application.

Referring to FIG. 51A, when the flexible display (e.g., the display module 160 of FIG. 1 or the flexible display 1120 of FIG. 31) of the main body 1100 (e.g., the main body 1100 of FIG. 31) is in a non-extended, default state (e.g., the normal state 1101 of FIG. 35), the electronic device (e.g., the electronic device 101 of FIG. 1, the processor 1130 of FIG. 32, or the processor 1130 of FIG. 33) may display a route summary display screen 2510 of the map application. For example, the route summary display screen 2510 may summarize and display a route from the departure point to the destination on the map. According to various embodiments, the route summary display screen 2510 may further include information about alternative routes and required time for each route.

Referring to FIG. 51B, if the flexible display is automatically or manually extended horizontally while displaying the route summary display screen 2510 in the default state shown in FIG. 51A, the electronic device may display a route directing screen 2520 as shown in FIG. 51B. According to various embodiments, the route directing screen 2520 may include a travel guide display screen and a screen describing information about the route in the form of a table of contents. For example, the travel guide display screen may include information about the ambient environment, travel guide information, or information about the straight distance to the next turn.

Referring to FIG. 51C, if the flexible display is automatically or manually extended vertically while displaying the route summary display screen 2510 in the default state shown in FIG. 51A, the electronic device may display a travel guide display screen 2530 as shown in FIG. 51C.

According to various embodiments, if the flexible display is automatically or manually rotated while displaying the route directing screen 2520 in the horizontally extended state shown in FIG. 51B, the electronic device may display a travel guide display screen 2530 as shown in FIG. 51C.

According to various embodiments of the disclosure, an electronic device (e.g., the electronic device 400 of FIG. 5) with a flexible display (e.g., the flexible display 440 of FIG. 5) may comprise a first housing (e.g., the first housing 410 of FIG. 5), a second housing (e.g., the second housing 420 of FIG. 5) slidably coupled to a side surface of the first housing, a flexible display including a first area disposed on the first housing and a second area (e.g., the second area 442 of FIG. 6) extending from the first area (e.g., the first area 441 of FIG. 6), a gear structure disposed in the first housing, and a mounting member rotatably coupled to the first housing and configured to be separated from or mounted on at least a portion of a human body. The flexible display may be configured to be rotated and rolled as the gear structure is rotated in a state in which the first area is exposed to an outside to expose at least a portion of the second area to the outside.

According to various embodiments of the disclosure, an electronic device (e.g., the electronic device 400 of FIG. 5) with a flexible display (e.g., the flexible display 440 of FIG. 5) may comprise a first housing (e.g., the first housing 410 of FIG. 5) including a first surface, a second surface facing in a direction opposite to the first surface, and a side surface surrounding a space between the first and second surfaces, a second housing (e.g., the second housing 420 of FIG. 5) detachably coupled to the side surface of the first housing and configured to be rotated along with the first housing, or slid away from or closer to the side surface of the first housing, a plurality of guide rails disposed in the first housing to guide the slide of the second housing, a flexible display (e.g., the flexible display 440 of FIG. 5) including a first area (e.g., the first area 441 of FIG. 6) disposed to face the first surface of the first housing and a second area (e.g., the second area 442 of FIG. 6) extending from the first area, a gear structure (e.g., the gear structure 450 of FIG. 5) including a rotation shaft (e.g., the rotation shaft 450a of FIG. 5) disposed in the first housing, connected with a driving motor, and rotated according to rotation of the driving motor, a first gear portion (e.g., the first gear portion 451 of FIG. 5) disposed on the rotation shaft and rotated according to the rotation of the rotation shaft, and a plurality of second gear portions (e.g., the second gear portions 452 of FIG. 5) spaced apart from the first gear portion, and a mounting member (e.g., the mounting member 460 of FIG. 5) including a third gear portion (e.g., the third gear portion 453 of FIG. 5) rotatably coupled with the first gear portion and configured to be separated from or mounted on at least a portion of a human body. The flexible display may be formed to rotate about the mounting member according to the rotation of the first gear portion in a state in which the first area is exposed to an outside. At least a portion of the flexible display may be formed to be rolled by rotation of the plurality of second gear portions to be drawn in or out from the second housing.

According to various embodiments of the disclosure, a plurality of sliding recesses slidably coupled with the plurality of guide rails may be formed in the first housing. A plurality of coupling recesses coupled with the plurality of guide rails may be formed in the second housing.

According to various embodiments of the disclosure, the first area may include a first front surface exposed to the outside and a first rear surface opposite to the first front surface. The second area may extend from the first area and include a second front surface having at least a portion exposed to the outside and a second rear surface opposite to the second front surface.

According to various embodiments of the disclosure, the electronic device may further comprise a display supporting structure facing the first rear surface of the first area and configured to be the second rear surface of the second area and deformed in a curved shape according to the rotation of the plurality of second gear portions to support rolling of the flexible display.

According to various embodiments of the disclosure, the display supporting structure may include a first hinge area facing at least a portion of the first rear surface of the first area, a second hinge area extending from the first hinge area and configured to be deformed in a curved shape to allow the second area to be drawn in or out from the second housing according to the slide of the second housing, and a third hinge area extending from the second hinge area and including a hinge gear engaged with the plurality of second gear portions included in the gear structure.

According to various embodiments of the disclosure, the gear structure may include a rotation shaft connected with a driving motor, the first gear portion disposed on the rotation shaft and including a first rotational axis, the plurality of second gear portions disposed on the rotation shaft, including the second rotational axis, and engaged with the hinge gear of the display supporting structure, the third gear portion disposed in the mounting member, rotatably engaged with the first gear portion, and supporting rotation of the first gear portion, and a rotation knob connected to the rotation shaft. When the rotation shaft is rotated according to driving of the driving motor, the first gear portion may be configured to rotate the first and second housings and the flexible display about the first rotational axis according to the rotation, and when the rotation shaft is rotated about the second rotational axis according to the driving of the driving motor, the plurality of second gear portions may be configured to roll and deform in a curved shape the display supporting structure according to the rotation to draw in or out at least a portion of the second area from the second housing.

According to various embodiments of the disclosure, an end of the rotation shaft may be connected with the driving motor, and another end of the rotation shaft may be connected with the rotation knob exposed to the outside of the first and second housings.

According to various embodiments of the disclosure, when rotated about the second rotational axis, the rotation knob may be configured to rotate the rotation shaft and the first and second gear portions.

According to various embodiments of the disclosure, the first gear portion may include a first bevel gear, and the third gear portion may include a second bevel gear engaged with the first bevel gear.

According to various embodiments of the disclosure, the plurality of second gear portions may include a spur gear.

According to various embodiments of the disclosure, a supporting member facing the mounting member and supporting rotation of the first and second housings may be disposed on the second surface of the first housing. A through hole through which the third gear portion is coupled may be formed in a center of the supporting member.

According to various embodiments of the disclosure, the mounting member may include a mounting body portion where the third gear portion is disposed and first and second binding members disposed on at least a portion of an outer circumference of the mounting body portion.

According to various embodiments of the disclosure, the first binding member may include a band guide member including a fixing member, and the second binding member may include a plurality of coupling holes coupled to and separated from the fixing member.

According to various embodiments of the disclosure, the electronic device may include a watch-type wearable device wearable on a human wrist.

According to various embodiments of the disclosure, an electronic device may comprise a first housing including a first surface, a second surface facing in a direction opposite to the first surface, and a side surface surrounding a space between the first and second surfaces, a second housing detachably coupled to the side surface of the first housing, rotated along with the first housing, or slid away from or closer to the side surface of the first housing, a plurality of guide rails disposed in the first housing to guide the slide of the second housing, a flexible display including a first area disposed to face the first surface of the first housing and a second area extending from the first area, a gear structure disposed in the first housing and including a rotation shaft, a first gear portion disposed on the rotation shaft, a second gear portion spaced apart from the first gear portion, and a plurality of third gear portions spaced apart from the first and second gear portions, and a mounting member including a fourth gear portion disposed between the first and second gear portions and rotatably coupled with the first gear portion or the second gear portion according to a slide of the rotation shaft, and separated from or mounted on at least a portion of a human body. An end of the rotation shaft may be connected with a driving motor, and another end of the rotation shaft may be connected with a rotation knob to slide or rotate the rotation shaft by an external force. A plurality of stopper members to restrict a slide of the rotation knob are formed on the rotation shaft. At least a portion of the second area of the flexible display may restrict the slide of the rotation shaft by the plurality of stopper members or, when rotating the rotation shaft by the rotation knob or the driving motor, be rolled by the rotation of the plurality of third gear portions to be drawn in or out from the second housing. When restricting the slide of the rotation shaft by the plurality of stopper members or rotating the rotation shaft by the rotation knob or the driving motor, the flexible display may be formed to rotate about the mounting member according to the rotation of the first gear portion. When restricting the slide of the rotation shaft by the plurality of stopper members or rotating the rotation shaft by the rotation knob or the driving motor, the flexible display may be formed to rotate about the mounting member according to the rotation of the second gear portion. At least a portion of the second area of the flexible display may be formed to be rolled by the rotation of the plurality of third gear portions to be drawn in or out from the second housing.

According to various embodiments of the disclosure, the gear structure may include the rotation knob slid or rotated by an external force, the rotation shaft slid or rotated by the rotation knob and rotated according to driving of the driving motor, the first and second gear portions including a first rotational axis and slid or rotated by the rotation shaft, the plurality of third gear portions disposed on the rotation shaft, including the second rotational axis, slid or rotated by the rotation shaft, and engaged with a hinge gear of the display supporting structure, and the fourth gear portion disposed in the mounting member, spaced apart between the first and second gear portions, and rotatably engaged with the first gear portion or second gear portion according to the slide of the rotation shaft. The plurality of third gear portions are engaged or disengaged with/from the hinge gear of the display supporting structure according to the slide of the rotation shaft. When the rotation shaft slides so that the first, second and fourth gear portions are disengaged from each other and are engaged with the hinge gear, the plurality of third gear portions may roll and curve the display supporting structure according to the rotation to draw in or out at least a portion of the second area from the second housing. The first gear portion may be engaged or disengaged to/from the fourth gear portion according to the slide of the rotation shaft. When the rotation shaft may slide to disengage the plurality of third gear portions from the hinge gear and to engage with the fourth gear portion, the first gear portion may rotate the first and second housings and the flexible display about the first rotational axis according to the rotation, and the second gear portion may be engaged or disengaged to/from the fourth gear portion according to the slide of the rotation shaft, and the plurality of third gear portions and the hinge gear may be engaged to or disengaged from each other. When the rotation shaft slides to allow the plurality of third gear portions to be engaged with the hinge gear and engaged with the fourth gear portion, the second gear portion may rotate the first and second housings and the flexible display about the first rotational axis according to the rotation, and the rotation shaft may rotate the plurality of third gear portions and roll and curve the display supporting structure according to the rotation, drawing in or out at least a portion of the second area from the second housing.

According to various embodiments of the disclosure, the plurality of stopper members may include first, second, and third stopper members. The first stopper member may be engaged or disengaged to/from the stopper protrusion disposed in the first housing by elastic force while sliding along with the rotation shaft when sliding the rotation knob outward of the housing by external force. The plurality of third gear portions and the hinge gear of the display supporting structure may be engaged with each other, and the first and second gear portions may be disengaged from the fourth gear portion. The second stopper member may be formed in a position adjacent to the first stopper member and, when sliding the rotation knob outward of the housing by external force, slide along with the rotation shaft while being engaged or disengaged to/from the stopper protrusion by elastic force, and the plurality of third gear portions and the hinge gear of the display supporting structure may be disengaged, and the first and fourth gear portions may be engaged with each other. The third stopper member may be formed in a position adjacent to the first stopper member and, when sliding the rotation knob inward of the housing by external force, slide along with the rotation shaft while being engaged or disengaged to/from the stopper protrusion by external force, and the plurality of third gear portions and the hinge gear of the display supporting structure may be engaged with each other, and the second and fourth gear portions may be engaged with each other.

According to various embodiments of the disclosure, the plurality of stopper members may include a plurality of stopper recesses.

According to various embodiments, the stopper protrusion may include a leaf spring including a protrusion.

According to various embodiments, an electronic device (e.g., the electronic device 101 of FIG. 1 or the electronic device 1000 of FIG. 31) may comprise a housing (e.g., the housing 1110 of FIG. 31), a flexible display (e.g., the display module 160 of FIG. 1 or the flexible display 1120 of FIG. 31) having at least a portion exposed to an outside through the housing, a processor (e.g., the processor 120 of FIG. 1, the processor 1130 of FIG. 32, the sub processor 1240 of FIG. 32, or the processor 1130 of FIG. 33) disposed in the housing and operatively connected with the flexible display, a mounting member (e.g., the mounting member 1200 of FIG. 31) to be coupled to or separated from the housing 1110, a driving structure (e.g., the gear structure 450 of FIG. 8 or the gear structure 550 of FIG. 14) disposed in the housing and configured to adjust the exposed portion of the flexible display and/or rotation of the housing about the mounting member, a plurality of coupling portions (e.g., the plurality of coupling portions 1230 (i.e., first coupling portion 1231 and second coupling portion 1232) of FIG. 31) disposed on two opposite ends of a strap (e.g., the strap 1210 of FIG. 31) of the mounting member to be coupled to or separated from each other, a sensor (e.g., the sensor module 176 of FIG. 1) disposed on at least some of the plurality of coupling portions or at least a portion of the strap, and a sub processor (e.g., the processor 120 of FIG. 1 or the sub processor 1240 of FIG. 32) disposed in the mounting member and operatively connected with the plurality of coupling portions and the sensor. Upon detecting the mutual coupling of the plurality of coupling portions, the sub processor may perform user authentication based on a sensing value detected through the sensor and transmit a result of the user authentication to the processor. The processor may control the driving structure based on the user authentication result received from the sub processor.

According to various embodiments, the processor may control the driving structure to perform at least one of rotation of the housing or adjustment of the exposed portion of the flexible display based on the executed function if user authentication succeeds.

According to various embodiments, the processor may control the driving structure to real-time perform at least one of rotation of the housing or adjustment of the exposed portion of the flexible display further considering at least one of the position of the electronic device or the direction of the electronic device.

According to various embodiments, the processor may perform a function requiring user authentication without an additional authentication operation upon executing the function if the mutual coupling of the plurality of coupling portions is maintained after user authentication succeeds.

According to various embodiments, the electronic device may further comprise a first battery (e.g., the battery 189 of FIG. 1 or the battery 1140 of FIG. 32) disposed in the housing and a second battery (e.g., the battery 189 of FIG. 1 or the battery 1270 of FIG. 32) disposed in the mounting member. The sub processor may determine whether to supply the power of the second battery to the first battery based on the user authentication result.

According to various embodiments, the sub processor may provide a feedback for the user authentication result.

According to various embodiments, the driving structure may include a rotation shaft (e.g., the rotation shaft 550a of FIG. 14) where a plurality of first gear portions (e.g., the second gear portion 452 of FIG. 8 or the third gear portion 553 of FIG. 16A) related to adjusting the exposed portion of the flexible display and a plurality of second gear portions (e.g., the first and second gear portions 551 and 552 of FIG. 16A) related to rotation of the housing are disposed. The processor may identify one of a first mode to rotate the housing based on the executed function if the user authentication succeeds, a second mode to adjust the exposed portion of the flexible display, or a third mode to adjust the exposed portion of the flexible display and the rotation of the housing and adjust the position of the rotation shaft to operate in the identified mode.

According to various embodiments, the driving structure may further include a rotation shaft where a plurality of first gear portions related to adjustment of the exposed portion of the flexible display and a plurality of second gear portions related to rotation of the housing are disposed and a crown (e.g., the rotation knob 555 of FIG. 14) connected with an end of the rotation shaft and disposed outside the housing, and a second sensor (e.g., the sensor module 176 of FIG. 1) to detect the position of the crown. The processor may identify the mode corresponding to the position of the crown based on a sensing value of the second sensor among the first mode to rotate the housing, the second mode to adjust the exposed portion of the flexible display, or the third mode to adjust the exposed portion of the flexible display and rotation of the housing, if the user authentication succeeds, compare the identified mode with the mode corresponding to the executed function, and if the identified mode differs from the mode corresponding to the executed function, display, on the exposed portion of the flexible display, a message requesting to adjust the position of the crown to become the mode corresponding to the executed function.

According to various embodiments, the processor may activate only set functions if the user authentication fails.

According to various embodiments, upon detecting separation of the plurality of coupling portions, the sub processor may transmit information indicating that the plurality of coupling portions are separated to the processor. Upon receiving the information indicating that the plurality of coupling portions are separated, the processor may switch into a non-authenticated state.

According to various embodiments, the processor may identify the direction of the housing and the exposed portion of the flexible display according to the control of the driving structure, identify at least one content and layout to be displayed on the flexible display based on the identified direction of the housing and exposed portion of the flexible display, and display the identified at least one content, as the identified layout, on the exposed portion of the flexible display.

According to various embodiments, a method for controlling an electronic device may comprise performing user authentication based on a sensing value detected through a sensor disposed on at least some of the plurality of coupling portions or at least a portion of the strap upon detecting a coupling of the plurality of coupling portions disposed on two opposite ends of the strap of the mounting member, by a sub processor disposed in the mounting member to be coupled to or separated from the housing of the electronic device, transmitting the user authentication result to the processor disposed in the housing by the sub processor, and controlling the driving structure configured to adjust the exposed portion of the flexible display having at least a portion exposed to the outside through the housing and/or rotation of the housing about the mounting member based on the user authentication result received, by the processor.

According to various embodiments, the control operation may control the driving structure to perform at least one of rotation of the housing or adjustment of the exposed portion of the flexible display based on the executed function if user authentication succeeds.

According to various embodiments, the method may further comprise performing a function requiring user authentication without an additional authentication operation upon executing the function if the mutual coupling of the plurality of coupling portions is maintained after user authentication succeeds.

According to various embodiments, the method may further comprise determining whether to supply power of a battery disposed in the mounting member to the first battery disposed in the housing based on the user authentication result by the sub processor.

According to various embodiments, the driving structure may include a rotation shaft where a plurality of first gear portions related to adjusting the exposed portion of the flexible display and a plurality of second gear portions related to rotation of the housing are disposed. The method may further comprise identifying one of a first mode to rotate the housing, a second mode to adjust the exposed portion of the flexible display, or a third mode to adjust the exposed portion of the flexible display and rotation of the housing, based on the executed function if the user authentication succeeds and adjusting the position of the rotation shaft to allow the electronic device to operate in the identified mode.

According to various embodiments, the driving structure may further include a rotation shaft where a plurality of first gear portions related to adjustment of the exposed portion of the flexible display and a plurality of second gear portions related to rotation of the housing are disposed. The method may further comprise identifying, by the processor, the mode corresponding to the position of a crown based on a sensing value of the second sensor for detecting the position of the crown connected with an end of the rotation shaft and disposed outside the housing among the first mode to rotate the housing, a second mode to adjust the exposed portion of the flexible display, or a third mode to adjust the exposed portion of the flexible display and rotation of the housing, if the user authentication succeeds, comparing the identified mode with the mode corresponding to the executed function, and if the identified mode differs from the mode corresponding to the executed function, displaying, on the exposed portion of the flexible display, a message requesting to adjust the position of the crown to become the mode corresponding to the executed function.

According to various embodiments, the method may further comprise activating only set functions if the user authentication fails.

According to various embodiments, the method may further comprise, upon detecting separation of the plurality of coupling portions, transmitting, by the sub processor, information indicating that the plurality of coupling portions are separated to the processor and, upon receiving the information indicating that the plurality of coupling portions are separated, switching into a non-authenticated state, by the processor.

According to various embodiments, the method may further comprise identifying the direction of the housing and the exposed portion of the flexible display according to the control of the driving structure, identifying at least one content and layout to be displayed on the flexible display based on the identified direction of the housing and exposed portion of the flexible display, and displaying the identified at least one content, as the identified layout, on the exposed portion of the flexible display.

While the disclosure has been shown and described with reference to various embodiments thereof, it is will be understood by those skilled in the art that various changes in form and details may be made therein without departing from the spirit and scope of the disclosure as defined by the appended claims and their equivalents.

What is claimed is:

1. An electronic device, comprising:
   a housing including a first housing and a second housing, wherein the second housing is configured to movably engaged with the first housing between a retracted position and an extended position;
   a flexible display coupled to the first housing and the second housing such that a size of a visible area of the flexible display changes as the second housing is moved between the retracted position and the extended position;
   a gear structure including a rotation shaft disposed in the first housing, at least one first gear portion on the rotation shaft, the at least one first gear portion rotating the housing, and at least one second gear portion, on the rotation shaft, spaced apart from the first gear portion, the at least one second gear portion moving the second housing with respect to the first housing; and
   a wearing member rotatably coupled to the first housing and configured to be separated from or worn on a portion of a human body,
   wherein, as the gear structure rotates, the rotation of the gear structure changes the size of the visible area of the flexible display and the rotation of the gear structure rotates the housing with respect to the wearing member.

2. The electronic device of claim 1, wherein a central axis of the wearing member is different from a central axis of the rotation shaft.

3. The electronic device of claim 1, further comprising:
   a rotation knob connected to the rotation shaft, the rotation knob on an outside of the first housing, wherein the rotation knob is configured to allow rotation of the rotation shaft by a user via turning the rotation knob.

4. An electronic device, comprising:
   a first housing including a first surface, a second surface facing in a direction opposite to the first surface, and a side surface surrounding a space between the first and second surfaces;
   a second housing detachably coupled to the side surface of the first housing and configured to be rotated along with the first housing or slid away from or closer to the side surface of the first housing;
   a plurality of guide rails disposed in the first housing to guide the slide of the second housing;
   a flexible display including a first area disposed to face the first surface of the first housing and a second area extending from the first area;
   a gear structure including a rotation shaft disposed in the first housing, connected with a driving motor, and rotated according to rotation of the driving motor, a first gear portion disposed on the rotation shaft and rotated according to the rotation of the rotation shaft, and a plurality of second gear portions disposed on the rotation shaft, spaced apart from the first gear portion and coupled with the plurality of guide rails; and a wearing member including a third gear portion rotatably coupled with the first gear portion and configured to be separated from or worn on a portion of a human body, wherein the flexible display is formed to rotate about the wearing member according to the rotation of the first gear portion in a state in which the first area is exposed to an outside, and wherein at least a portion of the flexible display is formed to be rolled by rotation of the plurality of second gear portions to be drawn in or out from the second housing.

5. The electronic device of claim 4, wherein a plurality of sliding recesses slidably coupled with the plurality of guide rails are formed in the first housing, and wherein a plurality of coupling recesses coupled with the plurality of guide rails are formed in the second housing.

6. The electronic device of claim 4, wherein the first area includes a first front surface exposed to the outside and a first rear surface opposite to the first front surface, and wherein the second area extends from the first area and includes a second front surface having at least a portion exposed to the outside and a second rear surface opposite to the second front surface.

7. The electronic device of claim 6, further comprising:

a display supporting structure facing the first rear surface of the first area and the second rear surface of the second area and configured to be deformed in a curved shape according to the rotation of the plurality of second gear portions to support rolling of the flexible display.

8. The electronic device of claim 7, wherein the display supporting structure includes:

a first hinge area facing at least a portion of the first rear surface of the first area;

a second hinge area extending from the first hinge area and configured to be deformed in a curved shape to allow the second area to be drawn in or out from the second housing according to the slide of the second housing; and a third hinge area extending from the second hinge area and including a hinge gear engaged with the plurality of second gear portions included in the gear structure.

9. The electronic device of claim 8, wherein the gear structure includes:

a rotation shaft connected with a driving motor;

the first gear portion disposed on the rotation shaft and including a first rotational axis;

the plurality of second gear portions disposed on the rotation shaft, including a second rotational axis, and engaged with the hinge gear of the display supporting structure;

the third gear portion disposed in the wearing member, rotatably engaged with the first gear portion, and supporting rotation of the first gear portion; and a rotation knob connected to the rotation shaft, wherein when the rotation shaft is rotated according to driving of the driving motor, the first gear portion is configured to rotate the first and second housings and the flexible display about the first rotational axis according to the rotation, and wherein when the rotation shaft is rotated about the second rotational axis according to the driving of the driving motor, the plurality of second gear portions are configured to roll and deform in a curved shape the display supporting structure according to the rotation to draw in or out at least a portion of the second area from the second housing.

10. The electronic device of claim 9, wherein an end of the rotation shaft is connected with the driving motor, and wherein another end of the rotation shaft is connected with the rotation knob exposed to the outside of the first and second housings.

11. The electronic device of claim 10, wherein, when rotated about the second rotational axis, the rotation knob is configured to rotate the rotation shaft and the first and second gear portions.

12. The electronic device of claim 11, wherein the first gear portion includes a first bevel gear, and wherein the third gear portion includes a second bevel gear engaged with the first bevel gear.

13. The electronic device of claim 9, wherein the plurality of second gear portions include a spur gear.

14. The electronic device of claim 13, wherein a supporting member facing the wearing member and supporting rotation of the first and second housings is disposed on the second surface of the first housing, and wherein a through hole through which the third gear portion is coupled is formed in a center of the supporting member.

15. The electronic device of claim 13, wherein the wearing member includes:

a wearing body portion where the third gear portion is disposed; and first and second binding members disposed on at least a portion of an outer circumference of the wearing body portion.

16. The electronic device of claim 15, wherein the first binding member includes a band guide member including a fixing member, and wherein the second binding member includes a plurality of coupling holes coupled to and separated from the fixing member.

17. The electronic device of claim 4, wherein the electronic device includes a watch-type wearable device wearable on a human wrist.

18. The electronic device of claim 4, wherein a central axis of the wearing member is different from a central axis of the rotation shaft.

* * * * *